(12) United States Patent
Smith

(10) Patent No.: US 12,718,201 B2
(45) Date of Patent: Aug. 25, 2026

(54) SYSTEMS AND METHODS FOR MANAGING ABSENTEE DATA

(71) Applicant: Matrix Absence Management, Inc., Phoenix, AZ (US)

(72) Inventor: Gordon Smith, Phoenix, AZ (US)

(73) Assignee: Matrix Absence Management, Inc., Phoenix, AZ (US)

( * ) Notice: Subject to any disclaimer, the term of this patent is extended or adjusted under 35 U.S.C. 154(b) by 5 days.

(21) Appl. No.: 18/637,015

(22) Filed: Apr. 16, 2024

(65) Prior Publication Data

US 2024/0354707 A1 Oct. 24, 2024

Related U.S. Application Data

(60) Provisional application No. 63/514,736, filed on Jul. 20, 2023, provisional application No. 63/497,351, filed on Apr. 20, 2023.

(51) Int. Cl.

| | |
|---|---|
| ***G06Q 10/1057*** | (2023.01) |
| ***G06Q 40/08*** | (2012.01) |
| ***G06Q 40/12*** | (2023.01) |

(52) U.S. Cl.

CPC ......... *G06Q 10/1057* (2013.01); *G06Q 40/08* (2013.01); *G06Q 40/125* (2013.12)

(58) Field of Classification Search

None

See application file for complete search history.

(56) References Cited

U.S. PATENT DOCUMENTS

| | | | |
|---|---|---|---|
| 7,729,257 | B2 | 6/2010 | Kodialam et al. |
| 8,869,053 | B2 | 10/2014 | Ehrler |
| D727,336 | S | 4/2015 | Allison |
| D727,928 | S | 4/2015 | Allison |
| D740,300 | S | 10/2015 | Lee |
| D749,634 | S | 2/2016 | Cho |

(Continued)

FOREIGN PATENT DOCUMENTS

| | | |
|---|---|---|
| CN | 101416451 A | 4/2009 |

OTHER PUBLICATIONS

Armenia A.B., et al., 2014, "Workplace compliance with the law: The case of the family and medical leave act," Work and Occupations, (41.3), p. 277.

(Continued)

*Primary Examiner* — George Chen

(57) ABSTRACT

The various implementations described herein include methods and systems for managing employee, absentee, and insurability data. In one aspect, a method is performed at a server system that includes one or more processors and memory. The method includes receiving an absence request from a first device corresponding to a first employee of a first entity, the absence request corresponding to a leave of absence for the first employee; and, responsive to receiving the absence request, sending an employee query to a second device. The method further includes, responsive to sending the employee query, obtaining employee information for one or more employees of the first entity from the second device; and generating an absence entry based on the absence request and the employee information. The method also includes sending the absence entry to an absence database.

28 Claims, 30 Drawing Sheets

(56) References Cited

U.S. PATENT DOCUMENTS

D765,718 S 9/2016 Vinna
D783,672 S 4/2017 Rajasankar
D788,165 S 5/2017 Bunyard
D808,986 S 1/2018 Dudey
9,881,279 B2 1/2018 Cooper
D837,807 S 1/2019 Baber
D870,771 S 12/2019 Butcher
D871,422 S 12/2019 Vonnegut
10,496,678 B1 12/2019 Tang
D873,281 S 1/2020 Van Gerbig
D875,742 S 2/2020 Kang
D877,171 S 3/2020 Poindexter
D881,214 S 4/2020 Zimmerman
D914,704 S 3/2021 Sahu
D921,655 S 6/2021 Giffels
D924,253 S 7/2021 Sahu
D924,254 S 7/2021 Sahu
D932,511 S 10/2021 Alt
11,256,747 B1 2/2022 Eksombatchai et al.
D946,613 S 3/2022 Zimmerman
D958,802 S 7/2022 McCann
D962,968 S 9/2022 Plaskow
D967,137 S 10/2022 Bahatyrevich
D973,096 S 12/2022 Bahatyrevich
D986,269 S 5/2023 Bahatyrevich
11,679,044 B2 6/2023 Coulter
D1,015,363 S 2/2024 Imanirad
D1,023,027 S 4/2024 Slettnes
D1,025,117 S 4/2024 Zimerman
12,047,343 B2 7/2024 Chinnalagu
D1,038,148 S 8/2024 Ko
D1,045,924 S 10/2024 Bhatia
12,107,813 B2 10/2024 Chinnalagu et al.
D1,053,895 S 12/2024 King
D1,053,899 S 12/2024 Atherley
D1,054,442 S 12/2024 Atherley
D1,054,443 S 12/2024 Atherley
D1,062,759 S 2/2025 Chuang
D1,065,225 S 3/2025 Li
D1,079,709 S 6/2025 Giffels
D1,083,984 S 7/2025 Smith
D1,104,027 S 12/2025 Slettnes
D1,105,132 S 12/2025 Yu
D1,105,133 S 12/2025 Yu
D1,107,058 S 12/2025 Zimmerman
D1,112,352 S 2/2026 Xie
D1,112,360 S 2/2026 Milden
2004/0064567 A1 4/2004 Doss
2004/0220838 A1 11/2004 Bonissone
2005/0060174 A1* 3/2005 Heyward ............... G06Q 10/10 705/322
2006/0224478 A1* 10/2006 Harbison ............... G06Q 10/06 705/32
2008/0195512 A1 8/2008 Klebanoff
2009/0119133 A1 5/2009 Yeransian
2009/0271210 A1 10/2009 Lange
2010/0036671 A1 2/2010 Chu
2010/0100561 A1 4/2010 Cooper
2012/0030128 A1 2/2012 Nelson
2012/0089493 A1 4/2012 Podgurny
2012/0278107 A1 11/2012 Cunningham
2013/0031184 A1 1/2013 Avitabile
2013/0041952 A1* 2/2013 Silas ..................... G06Q 10/10 709/204
2013/0110736 A1 5/2013 Savage
2013/0275279 A1 10/2013 Raymond
2014/0114873 A1 4/2014 Contacos
2014/0236849 A1 8/2014 Flammer
2015/0106726 A1 4/2015 Nagasaki
2016/0171421 A1 6/2016 Baeck
2016/0217429 A1 7/2016 Lau
2016/0378932 A1 12/2016 Sperling
2017/0178077 A1 6/2017 Inaba
2017/0180284 A1 6/2017 Smullen
2017/0236081 A1* 8/2017 Grady Smith ..... G06Q 10/0637 705/7.36
2017/0262813 A1 9/2017 Steffeney et al.
2017/0316382 A1 11/2017 Colner et al.
2018/0025309 A1 1/2018 Absher
2018/0025327 A1 1/2018 Runstedler
2018/0275846 A1 9/2018 Perret
2018/0308065 A1 10/2018 Pal
2018/0324120 A1 11/2018 Smullen
2019/0065625 A1 2/2019 Shinn et al.
2019/0073197 A1 3/2019 Collins
2019/0268288 A1 8/2019 Chandra et al.
2019/0327199 A1 10/2019 Havaldar
2019/0361910 A1 11/2019 Rogynskyy et al.
2020/0342414 A1* 10/2020 Smith .................. G06Q 30/018
2020/0387976 A1 12/2020 Bull
2021/0150451 A1 5/2021 Jeong et al.
2023/0089572 A1 3/2023 Sain
2023/0368214 A1 11/2023 Suryanarayana
2024/0354709 A1 10/2024 Smith

OTHER PUBLICATIONS

Kelly, E., 2010, "Failure to update: an institutional perspective on noncompliance with the Family and Medical Leave Act," Law and Society Review, (44.1), p. 33.

Williamson, 2019, "The Meaning of Leave: Understanding Workplace Leave Rights," NYUJ Legis. & Pub. Pol'y, 22, p. 197.

Unum Group, "Unum Total Leave Digital Brochure," print, Mar. 2022.

"Donut Chart Tutorial File Sketch Resource", posted date unavailable [online], [retrieved Jan. 9, 2026]. Retrieved from internet, https ://www.sketchappsources.com/free-sou rce/4062-how-to-desi g n-donut-chart-sketch-tutorial. html (Year: 2026).

"Donut chart", posted date unavailable [online], [retrieved Jan. 9, 2026]. Retrieved from internet, https://www.figma.com/community/tile/1368568320352304600/donut-chart (Year: 2026).

U.S. Appl. No. 18/637,038, filed Apr. 16, 2024, 2024-0354708-A1, Oct. 24, 2024.

U.S. Appl. No. 18/637,225, filed Apr. 16, 2024, 2024-0354709-A1, Oct. 24, 2024.

Stern, L., "Flex Plans on the Rise," Business & Health, Data Watch, Mar. 1991;9(3):8-9. PMID: 10109420.

* cited by examiner

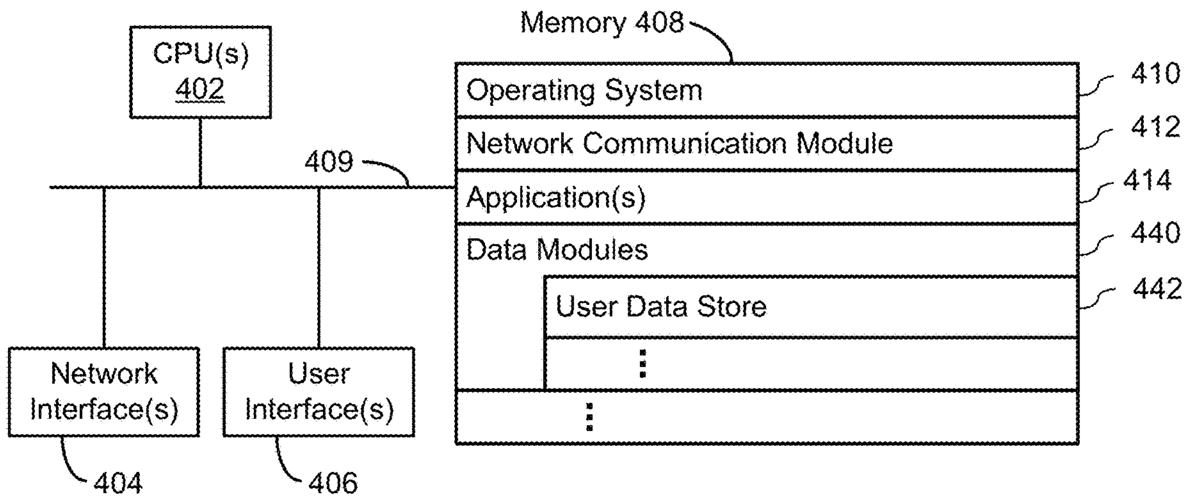
Figure 4

Status Notification 702

Continuous Absences 704

710-1 710-2 710-3 710-4 710-5 710-6

| Name | Absence Start | Return to Work | Status | Reason | Claims Examiner |
|---|---|---|---|---|---|
| Reede John | 05/20/2016 ~~04/15/2018~~ | 05/30/2018 | Approved | Own | Jane.Doe@martixcos.com |
| Watson Jeremy | 04/06/2018 | Returned on 06/26/2016 | Approved | Own | Jane.Doe@martixcos.com |
| Swanson Tiffany | 04/21/2016 | 05/30/2016 | Pending | Family Member | Jane.Doe@martixcos.com |
| Jackson John | 05/20/2018 | 06/10/2016 ~~05/30/2018~~ | Approved ~~Pending~~ | 720 Own | Jane.Doe@martixcos.com |
| Patterson Paula | 06/28/2018 | Confirmed Returning on 09/05/2016 | Approved | Pregnancy | Jane.Doe@martixcos.com |
| Riley Jasmine | 06/05/2018 | Unable to confirm 09/06/2016 RTW* | Approved | Own | Jane.Doe@martixcos.com |
| Abrams Laura | 02/17/2018 | 09/04/2018 | Approved | Family Member | Jane.Doe@martixcos.com |
| Franklin George | 04/20/2018 | Returned on 06/27/2018 | Approved ~~Pending~~ | Own | Jane.Doe@martixcos.com |

*During our return to work process , we were unable to reach your employee

Restriction Change in Restriction

Figure 7A

Figure 7B:
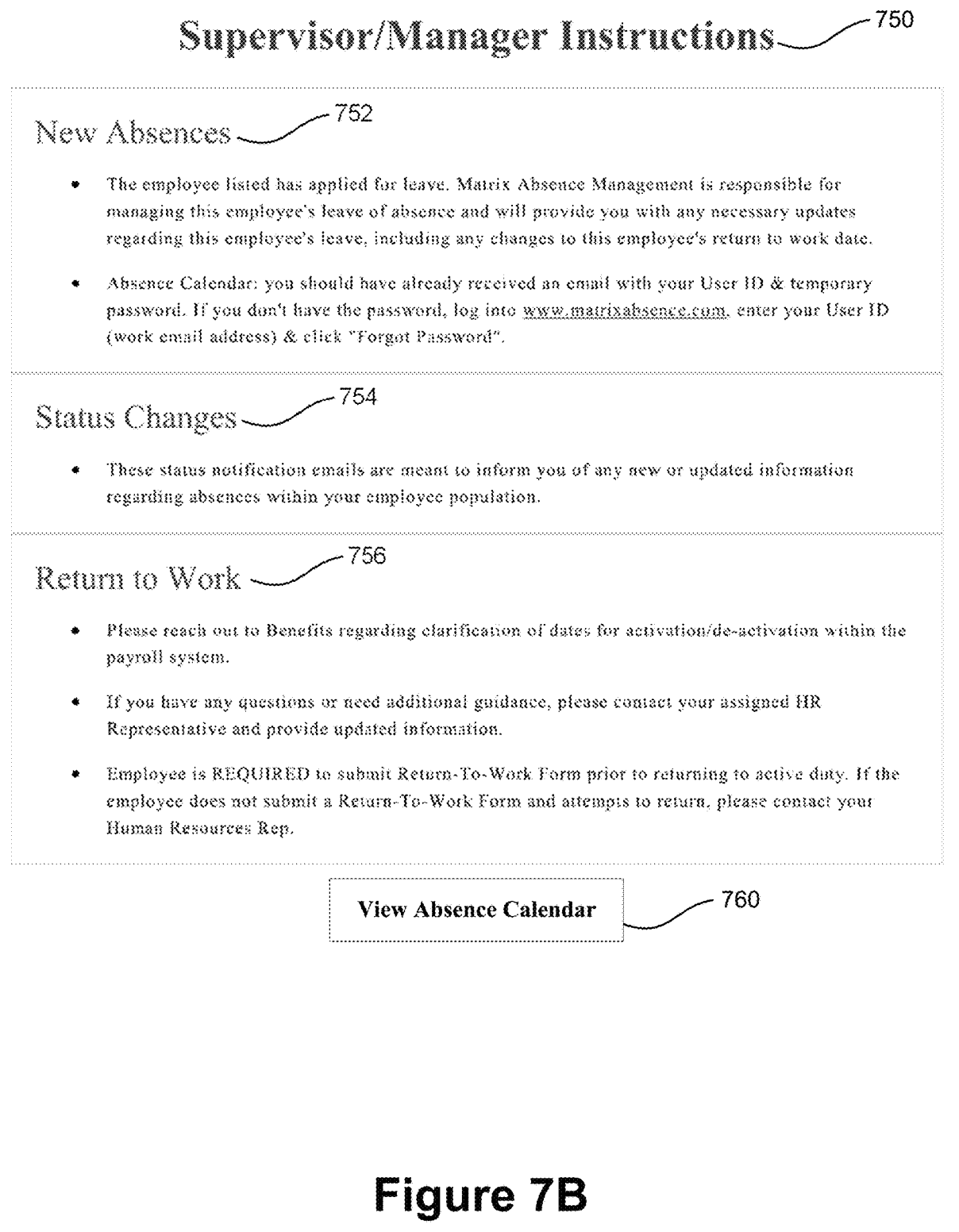

Supervisor/Manager Instructions

750

New Absences

752

- The employee listed has applied for leave. Matrix Absence Management is responsible for managing this employee's leave of absence and will provide you with any necessary updates regarding this employee's leave, including any changes to this employee's return to work date.
- Absence Calendar: you should have already received an email with your User ID & temporary password. If you don't have the password, log into www.matrixabsence.com, enter your User ID (work email address) & click "Forgot Password".

Status Changes

754

- These status notification emails are meant to inform you of any new or updated information regarding absences within your employee population.

Return to Work

756

- Please reach out to Benefits regarding clarification of dates for activation/de-activation within the payroll system.
- If you have any questions or need additional guidance, please contact your assigned HR Representative and provide updated information.
- Employee is REQUIRED to submit Return-To-Work Form prior to returning to active duty. If the employee does not submit a Return-To-Work Form and attempts to return, please contact your Human Resources Rep.

View Absence Calendar

| | A | B | C | D | E | F | G | H | I | J | K | L | M | N | O | P | Q |
|---|---|---|---|---|---|---|---|---|---|---|---|---|---|---|---|---|---|
| 1 | | | | | | | | | | | | | | | | | |
| 2 | Your Company Name: | | | | | | | | | | | | | | | | |
| 3 | ABSENCE RADAR HR MANAGER STATUS NOTIFICATION | | | | | | | | | | | | | | | | |
| 4 | PERIOD | 09/28/2018 - 09/29/2018 | | | | | | | | | | | | | | | |
| 5 | RUN DATE | 09/29/2018 | | | | | | | | | | | | | | | |
| 6 | Employee Name | Employee ID | Job Title | Former Absence Type | Absence Type | What Changed | Radar Update | Last Day Worked | Former Start | Start | Disability Benefit Start Date | Disability Benefit End Date | Former Return to Work | Return to Work | Former Status | Status | Former Reason |
| 7 | Reede Tiffany | 1234 | Administrative Assistant | | Short Term Disability | Start Date, Status | | 09/13/2018 | 09/17/2018 | 09/14/2018 | 09/21/2018 | 10/26/2018 | | 12/9/2018 | Pending | Approved | |
| 8 | Watson Jeremy | 5678 | Sales Representative | Short Term Disability | Leave Of Absence | Return to Work Date, Reason, Transition from STD To LOA | | 07/29/2018 | | 07/30/2018 | | | 10/31/2018 | Returned on 09/13/2018 | | Approved | Family |
| 9 | Smith Jane | 9123 | Marketing Specialist | | Paid Family Leave | New Claim | | 09/23/2018 | | 09/24/2018 | 10/01/2018 | | | 10/08/2018 | | Pending | |
| 10 | Swanson John | 3456 | Sr. Sales Representative | Leave Of Absence | Paid Family Leave | Reason, Transition from LOA To STD | Here is some key information that we wanted you to know... | 06/03/2018 | | 08/10/2018 | 08/13/2018 | | | 10/20/2018 | | Pending | Parent |
| 11 | Jones Jackson | 7891 | Incident Manager | | Leave Of Absence | Return to Work Date, Status, Reason | | 09/30/2018 | | 10/01/2018 | | | | Unable to confirm 10/25/2018 RTW | Pending | Denied | Family |
| 12 | Patterson Paula | XXXX | Human Resources | | Short Term Disability | Return to Work Date | | 06/03/2018 | | 06/06/2018 | 06/13/2018 | 09/29/2018 | | Confirmed Returning on 10/26/2018 | | Approved | |
| 13 | | | | | | | | | | | | | | | | | |

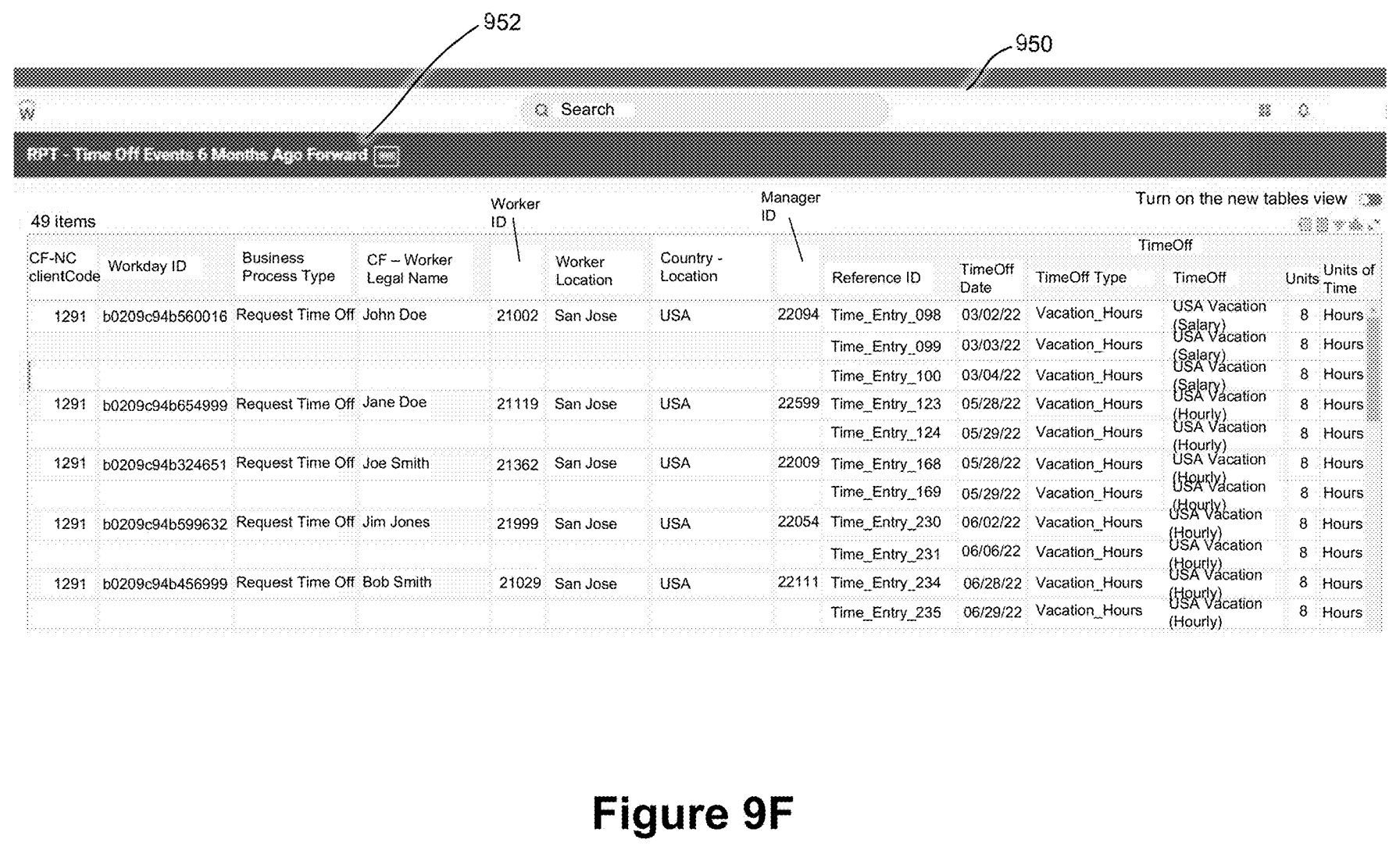

Search

RPT - Time Off Events 6 Months Ago Forward

Turn on the new tables view 49 items

| CF-NC clientCode | Workday ID | Business Process Type | CF – Worker Legal Name | Worker ID | Worker Location | Country - Location | Manager ID | TimeOff | | | | | |
|---|---|---|---|---|---|---|---|---|---|---|---|---|---|
| | | | | | | | | Reference ID | TimeOff Date | TimeOff Type | TimeOff | Units | Units of Time |
| 1291 | b0209c94b560016 | Request Time Off | John Doe | 21002 | San Jose | USA | 22094 | Time_Entry_098 | 03/02/22 | Vacation_Hours | USA Vacation (Salary) | 8 | Hours |
| | | | | | | | | Time_Entry_099 | 03/03/22 | Vacation_Hours | USA Vacation (Salary) | 8 | Hours |
| | | | | | | | | Time_Entry_100 | 03/04/22 | Vacation_Hours | USA Vacation (Salary) | 8 | Hours |
| 1291 | b0209c94b654999 | Request Time Off | Jane Doe | 21119 | San Jose | USA | 22599 | Time_Entry_123 | 05/28/22 | Vacation_Hours | USA Vacation (Hourly) | 8 | Hours |
| | | | | | | | | Time_Entry_124 | 05/29/22 | Vacation_Hours | USA Vacation (Hourly) | 8 | Hours |
| 1291 | b0209c94b324651 | Request Time Off | Joe Smith | 21362 | San Jose | USA | 22009 | Time_Entry_168 | 05/28/22 | Vacation_Hours | USA Vacation (Hourly) | 8 | Hours |
| | | | | | | | | Time_Entry_169 | 05/29/22 | Vacation_Hours | USA Vacation (Hourly) | 8 | Hours |
| 1291 | b0209c94b599632 | Request Time Off | Jim Jones | 21999 | San Jose | USA | 22054 | Time_Entry_230 | 06/02/22 | Vacation_Hours | USA Vacation (Hourly) | 8 | Hours |
| | | | | | | | | Time_Entry_231 | 06/06/22 | Vacation_Hours | USA Vacation (Hourly) | 8 | Hours |
| 1291 | b0209c94b456999 | Request Time Off | Bob Smith | 21029 | San Jose | USA | 22111 | Time_Entry_234 | 06/28/22 | Vacation_Hours | USA Vacation (Hourly) | 8 | Hours |
| | | | | | | | | Time_Entry_235 | 06/29/22 | Vacation_Hours | USA Vacation (Hourly) | 8 | Hours |

Figure 9F

1122 Receive a request for information for a first workforce status in the enumerated plurality of workforce statuses from a second device in the plurality of devices, the second device associated with a first employee of the first entity, the first workforce status associated with a second employee at the first entity 1124 The enumerated plurality of workforce statuses comprises one or more of: one or more administrative statuses, one or more benefit statuses, one or more stock purchase plan statuses, one or more digital security statuses, one or more physical security statuses, one or more facility statuses, one or more performance review statuses, one or more absentee statuses, one or more payroll statuses, and one or more invoice statuses 1126 The first workforce status is a performance status, a maternity leave status, a short-term disability status, a longer-term disability status, a sick leave status, a fostering or adopting status, an employer program status, a surrogacy status, a parental status, a pre-natal leave status, a newborn baby bonding leave status, a caregiver leave status, a military service leave status, a paid time off (PTO) leave status, a vacation status, or a combination thereof The eligibility of the first workforce status is at least a total number of days entitled to be absent from work within a period of time 1128 The first entity is a federal government entity, a state government entity, a county government entity, a municipal government entity, or an insurance entity 1130 The request for information comprises personal identifiable information for the first employee 1132 The request for information is received from a federal government entity, a state government entity, a county government entity, a municipal government entity, or the first entity 1134 Receiving the request for information includes authenticating the request for information in accordance with a login operation protocol

Figure 11B

1136 In response to the request for information, receive a workforce status feed from a third device in the plurality of devices, the third device associated with a second entity distinct from the first entity, the workforce status feed comprising a plurality of data elements associated with at least a subset of workforce statuses in the enumerated plurality of workforce statuses 1138 The workforce status feed comprises a plurality of employee records, each respective employee record in the plurality of employee records corresponding to an employee in a plurality of employees for the first entity, where each respective record in the plurality of employee records includes (i) a name of the corresponding employee and (ii) a name of a least one other employee in the plurality of employees to which the corresponding employee shares a reporting relationship 1140 In response to receiving the workforce status feed, generate a report comprising a notification of the first workforce status, where the report is configured for displaying at a display of a respective device in the plurality of devices 1142 The report comprises a calendarization of the period of time 1144 The report comprises a name of the second employee, an address associated with the second employee, a date of birth of the second employee, a group number associated with the second employee, a plan classification associated with the second employee, a policy, an event type, an event date, a respective workforce status, an approval status, a document associated with the second employee, an application identifier associated with the second employee, a period of time associated with the second employee, an application date associated with the second employee, a queue number, a last update date, or a combination thereof 1148 Generate an organizational tree of the first entity based on the workforce status feed, the organizational tree comprising a plurality of nodes, where each respective node in the plurality of nodes corresponds to an employee in the plurality of employees

Figure 11C

Bill Group Name : ABC Corp Bill Group# : 1000001 Due Date : 06/01/2023 Sales Office : XXXX

| Policy Number | Coverage | Class | Age Bracket | In Force From Last Statement | Additions and Increases | Deletions and Decreases | Current in Force | Net Adjustment | Adjusted in Force | Rate per Dollar/ Unit of Coverage | Premium Due |
|---|---|---|---|---|---|---|---|---|---|---|---|
| L77777 | Basic Life | 1 | NA | Lives:<br>Volume: | | | | | | | |
| L77777 | Basic Life | 2 | NA | Lives:<br>Volume: | | | | | | | |
| L77777 | Basic Life | 3 | NA | Lives:<br>Volume: | | | | | | | |
| STD 78787 | Weekly Disability | 1 | NA | Lives:<br>Volume: | | | | | | | |
| LTD 65656 | Long Term Disability | 1 | NA | Lives:<br>Volume: | | | | | | | |
| LTD 65656 | Long Term Disability | 2 | NA | Lives:<br>Volume: | | | | | | | |
| LTD 65656 | Supplemental Life | 1 | NA | Lives:<br>Volume: | | | | | | | |

Figure 14A
View Custom Report
CR Reliance Evidence of Insurability

| | |
|---|---|
| Report Name: | Evidence of Insurability |
| Report Type: | Advanced |
| Data Source: | Active Evidence of Insurability |
| Data Source Type: | Standard |
| Primary Business Object: | Evidence of Insurability |

Additional Info

Columns Sort Filter Prompts Output Share

31 Items

| Business Object | Field | Column Heading Override | Column Heading Override XML Alias | Format | Options |
|---|---|---|---|---|---|
| Evidence of Insurability | Worker | | Worker | | |
| Evidence of Insurability | Database ID | | eoiWID | | |

Filter on Instances

Turn on new tables view

Filter conditions for filtering on instances: 5 items

| And/Or | ( | Field | Operator | Comparison Type | Comparison Value | ) | Indexed |
|---|---|---|---|---|---|---|---|
| And | | Event Date | greater than or equal to | Prompt the user for the value and ignore the filter condition if the value is blank | Starting Prompt | | |
| And | | Event Date | less than or equal to | Prompt the user for the value and ignore the filter condition if the value is blank | Ending Prompt | | |
| And | | Benefit Plan | any in the selection list | Value specified in this filter | Critical Illness -- Reliance Standard (Employee)<br>Critical Illness -- Reliance Standard (Spouse) | | |
| And | | Status | in the selection list | Value specified in this filter | Pending | | |
| And | | Worker | any in the selection list | Value specified in this filter | John Smith | | |

Field Name: CF EOI Default Coverage Amount

Business Object: Evidence of Insurability

Calculation Additional Info Where Used

Looks up the value of a field associated with a single instance of a related business object Lookup Field: Default Coverage Related Business Object: Insurance Coverage Master Amount Return Value: Coverage Level

SYSTEMS AND METHODS FOR MANAGING ABSENTEE DATA

PRIORITY AND RELATED APPLICATIONS

This application claims priority to U.S. Provisional Application No. 63/497,351, filed Apr. 20, 2023, entitled "Systems and Methods for Absentee Management," and to U.S. Provisional Application No. 63/514,736, filed Jul. 20, 2023, entitled "Systems and Methods for Absentee and Insurability Data Management," each of which is hereby incorporated by reference in its entirety.

TECHNICAL FIELD

The present disclosure relates generally to systems and methods for absentee and insurability data management, including but not limited to, systems and methods for generating and managing absence entries in accordance with requests and data from employment databases.

BACKGROUND

The rights for employees to be absent from work have greatly improved over recent years due to changes in employment policies. These changes in employment policies include improved internal business practices as well as government mandated regulations, such as the signing of the Family and Medical Leave Act (FMLA) of 1993, which provides employees with job-protected and unpaid leave for qualified medical and family reasons. While these regulations and policies were created to improve workplace conditions for employees, compliance with these regulations and policies has proven difficult for businesses and organizations. For instance, approximately half of the workforce in the United States is covered by FMLA yet a majority of workers are unable to take advantage of the benefits provided by this regulation due to non-compliance from their employer (Armenia et al., 2014, "Workplace compliance with the law: The case of the family and medical leave act," Work and Occupations, (41.3), pg. 277). One source of non-compliance with these regulations and policies is an overload of information. This overload of information includes an inability to properly navigate the exact limitations and requirements for specific types of leave set forth by company policies and government regulations, which are particularly difficult for small business, ill-equipped human resource departments, and individual employees to adhere to and enforce in a cost effective manner (E. Kelly, 2010, "Failure to update: an institutional perspective on noncompliance with the Family and Medical Leave Act," Law and Society Review, (44.1), pg. 33). Further, this overload of information also stems from the sheer volume of reviewing and communicating absence claims within a respective company.

One approach to solve this issue of non-compliance and information overload is to create an online portal that is accessible to employees. Each employee is capable of requesting a claim for absence, which is then reviewable by a supervisor through the portal. While the portal provides a system to manage absences from a single point of access, the portal does not adequately address the above-described issues, and particularly in consideration of the human aspect of managing absences. For instance, supervisors must log into the portal and actively seek desired information, such as navigating through the portal to find a listing of employees absent for a particular period of time. Supervisors quickly become flooded with absence claims and communications that are received from their numerous supervisees over prolonged periods of time, such as individual employees communicating their respective absence claims. Furthermore, if a hierarchy within a company shifts, such as termination or transfer of a supervisor, the portal does not account for this shift unless a human manually updates the system.

Thus, the difficulty of managing absenteeism and insurability data within an evolving company, and in coordination with ensuring compliance to company policies and government regulations, particularly at a level of an individual supervisor, presents many challenges for human resource departments.

The information disclosed in this Background section is only for enhancement of understanding of the general background of the invention and should not be taken as an acknowledgement or any form of suggestion that this information forms the prior art already known to a person skilled in the art.

SUMMARY

Given the above-background, what is needed in the art are improved systems and methods for managing absenteeism, insurability, and claims for absences while maintaining compliance with various federal and state regulations as well as employer policies.

The present disclosure addresses, among others, the above-identified needs in the art by providing systems and methods for absentee management. For example, an employee can submit an absence request and the system can retrieve additional employee information and generate an absence entry for the absence request. The absence entry can be used to populate an absentee report and/or calendar. During the absence request operation, the systems and methods of the present disclosure can provide assistance to a user by obtaining information pertaining to the user, evaluating the obtained information, and displaying a result of the evaluation of the obtained information for review by the user. After obtaining the absence entry, a supervisor status notification can be generated for a corresponding supervisor in a set of supervisors at an organization, e.g., without further human intervention by the corresponding supervisor. The supervisor status notification can provide an aggregated listing of each supervisee in a set of supervisees that directly or indirectly reports to the supervisor (e.g., having a particular absentee status category). An organizational tree can be generated using employee information (e.g., in real-time in response to the absence request) and the organizational tree can be used to identify the appropriate persons (e.g., supervisors and/or HR representatives) to notify about the absence request. An absentee calendar can be displayed and configured to present a representation of a number of supervisees that directly or indirectly report to the corresponding supervisor that are absent some or all of a period of time. This ensures that the hierarchy within the company is properly defined as the company continues to grow and evolve, while also providing the most up to date information related to each employee. This can also be advantageous because the systems and methods account for the human aspect of being a supervisor by reducing man-machine interaction while providing relevant and accurate information and ensuring compliance with company policies and government regulations.

In one aspect, some embodiments include a method for absentee management is performed at a computing system (e.g., a server system) having memory and one or more processors. The method includes (i) receiving an absence request from a first device corresponding to a first employee of a first entity, the absence request corresponding to a leave of absence for the first employee; (ii) responsive to receiving the absence request, sending an employee query to a second device; (iii) responsive to sending the employee query, obtaining employee information for one or more employees of the first entity from the second device; (iv) generating an absence entry based on the absence request and the employee information; and (v) sending the absence entry to an absence database.

In another aspect, some embodiments include a method for absentee management is performed at a computing system (e.g., a server system) having memory and one or more processors. The method includes (i) storing a plurality of rules in electronic form for a first entity of a plurality of entities, the first entity associated with a first device in a plurality of devices, where: (a) each rule in the plurality of rules is defined, at least in part, by an administrator associated with the first entity, (b) each rule in the plurality of rules includes conditional logic for a respective workforce status in an enumerated plurality of workforce statuses for a respective employee at the first entity, (c) a corresponding task in a plurality of tasks is performed by the server system in accordance with the conditional logic being satisfied, and (d) the corresponding task in the plurality of tasks is not performed by the server system in accordance with the conditional logic not being satisfied; (ii) receiving a request for information for a first workforce status in the enumerated plurality of workforce statuses from a second device in the plurality of devices, the second device associated with a first employee of the first entity, the first workforce status associated with a second employee at the first entity; (iii) in response to the request for information, receiving a workforce status feed from a third device in the plurality of devices, the third device associated with a second entity distinct from the first entity, the workforce status feed comprising a plurality of data elements associated with at least a subset of workforce statuses in the enumerated plurality of workforce statuses; and, (iv) in response to receiving the workforce status feed, generating a report comprising a notification of the first workforce status, wherein the report is configured for displaying at a display of a respective device in the plurality of devices.

In another aspect, some embodiments include a method for absentee management is performed at a computing system (e.g., a server system) having memory and one or more processors. The method includes (i) obtaining an evidence of insurability (EOI) request from a first tenant of a plurality of tenants, where the first tenant comprises an employment database, and where the EOI request corresponds to a first employee; (ii) generating an EOI application based on the EOI request; (iii) transmitting the EOI application to an EOI engine; (iv) obtaining, from the EOI engine, a response to the EOI application; and (v) updating the employment database of the first tenant based on the response to the EOI application. For example, the employment database is updated automatically, without further user interaction, in response to obtaining the response to the EOI application.

In another aspect of the present disclosure, some embodiments include a non-transitory computer-readable storage medium storing one or more programs in a computing system. The computing system includes one or more processors and memory storing the one or more programs for execution by the one or more processors. The one or more programs singularly or collectively include instructions for executing any of the methods described herein.

In yet another aspect of the present disclosure, some embodiments include a computing system. The computing system includes one or more processors and memory coupled to the one or more processors. The memory stores one or more programs configured to be executed by the one or more processors. The one or more programs singularly or collectively include instructions for executing any of the methods described herein.

Thus, methods, systems, and computer-readable storage media are disclosed for absentee and insurability management. Such methods and systems may complement or replace conventional methods for absentee and insurability management.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not to necessarily be considered limiting, for the description can admit to other effective features as the person of skill in this art will appreciate upon reading this disclosure.

FIG. 4 illustrates an example electronic device in accordance with some embodiments.

FIG. 7A illustrates an example absentee report in accordance with some embodiments.

FIG. 7B illustrates example supervisor instructions in accordance with some embodiments.

FIG. 7C illustrates an example absentee notification in accordance with some embodiments.

FIGS. 9A-9F illustrate example user interfaces for absentee reports in accordance with some embodiments.

FIGS. 11A-11C are a flow diagram illustrating another example method for absentee management in accordance with some embodiments.

FIG. 12 illustrates an example billing worksheet in accordance with some embodiments.

FIGS. 14A-14D illustrate example user interfaces for EOI management in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 1:
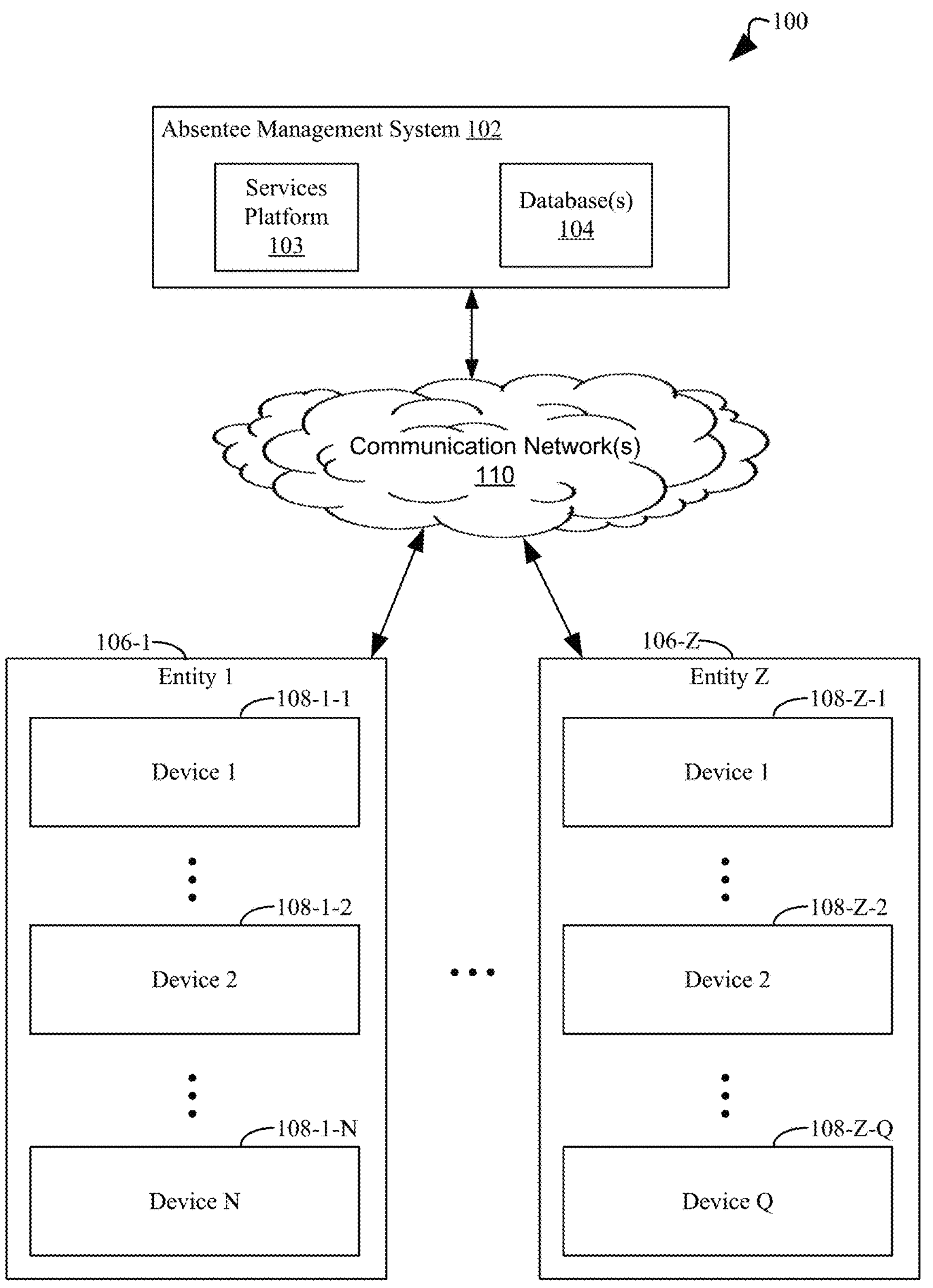
FIG. 1 illustrates an example distributed computing system for providing absentee management in accordance with some embodiments.

The present disclosure provides systems and methods for managing absenteeism and insurability in one or more organizations. Management of absenteeism is essential in order for a respective organization to comply with various government regulations and company policies, such as federal regulations and insurance policies. In particular, the present disclosure describes systems and methods that manage absences requests, insurability information, employment information, and absentee entries and provide clarity regarding absenteeism of employees for responsible supervisor(s) and/or human resources representative(s), e.g., through timely and accurate communications. For example, information from an absentee request can be matched (in real time) to employee data within an employment database for a particular organization to identify the employee making the request and/or determine absentee benefits/options available to the employee. This process simplifies the man-machine interface for creating an absence request and reduces the cognitive burden on the employee.

Additionally, an evidence of insurability application can be generated in response to an employee request, the EOI application can be sent to an EOI engine (e.g., corresponding to an underwriter) and, in response to a decision, the employer database can be updated automatically and the employee can be informed of the decision. This process simplifies the man-machine interface for EOI management. For example, pending EOI data may extracted from an employee database and pushed to a document service (e.g., a document procurement and signature service). The document service may create a personalized EOI application based on the received data and send the personalized EOI application to the applicant (e.g., to review, complete, and/or sign). Once the application is approved by the applicant (e.g., completed and signed), the document service may send the EOI application to a medical underwriter for a determination. The medical underwriting system may adjudicate for a decision on each coverage request contained within the EOI application. A decision service may pull a decision from the medical underwriting system for each coverage request in the EOI application. The decision service may push the decision information back to the employee database. The employee database may adjust coverage and/or payroll values based on the decision information.

The communications described herein can be self-standing, in that a recipient (e.g., a supervisor or human resources representative) only needs to view a most-recently received communication to view absentee information, and the communications are only provided to supervisors that are responsible for the absent, or soon to be absent, employees. These limitations in terms of who receives notification communications, and what these notification communications contain, simplifies the man-machine interface and reduces the amount of information processed by each respective recipient, while also preventing the recipient from having to review and/or extract information from multiple sources (e.g., multiple emails, spreadsheets, and/or web pages) to receive the most relevant and recent information. Furthermore, these communications provide a view of absenteeism that is based on a security model provided by each entity, which prevents supervisors/managers from accessing information related to employees for which they are not directly or indirectly responsible.

Providing absentee management as described herein may include obtaining employee information (also sometimes called employment information) from an employee database. The employee information may include a plurality of employee records, with each record corresponding to an employee of an organization. Each record optionally includes a name of the corresponding employee and a name of a least one other employee which the corresponding employee shares a reporting relationship. In some embodiments, the employee information is utilized to construct a hierarchy of the respective organization, which may be represented through an organizational tree with various nodes, each node representing an employee of the organization. Providing absentee management as described herein may include obtaining absentee status information that includes absentee statuses for one or more employees. Each absentee status corresponds to an employee of the organization and optionally includes an absentee status category. In some embodiments, from the organizational tree and the employee information, a set of supervisors is determined at the organization. For example, each respective supervisor in the set of supervisors supervises at least one supervisee having an absentee status category. In some embodiments, a different supervisor status notification is communicated to each supervisor that has supervisees that are presently absent or are planning to be absent. In some embodiments, the supervisor status notification provides a listing of each supervisee that reports to the respective supervisor having an absentee status that falls within a set of absentee status categories.

As used herein, a "compliance standard" is a right conferred by an existing law, regulation, or policy to ensure a subject gets a protected right in the form of a corresponding benefit of the compliance standard. In some embodiments, the corresponding benefit is a generic right to leave, a right to reinstatement, a right to pay, a right to continuation of health insurance, a right of job protection, a right against retaliation, or a right against interference. In some embodiments, the right to leave is a right to be absent from work under specific conditions, which are realized as a corresponding plurality of requirements of the compliance standard. Additional details and information regarding a compliance standard and a corresponding benefit of the compliance standard can be found at Williamson, 2019, "The Meaning of Leave: Understanding Workplace Leave Rights," NYUJ Legis. & Pub. Pol'y, 22, pg. 197, which is hereby incorporated by reference in its entirety.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

FIG. 1 is a block diagram illustrating a distributed computing system 100 in accordance with some embodiments of the present disclosure. In accordance with some embodiments, the distributed computing system 100 includes an absentee management system 102 that is associated with one or more entities 106. The absentee management system 102 facilitates management of one or more absentees for various entities of the system (e.g., various organizations and/or companies), e.g., by providing absence claim compliance and status notifications of absenteeism. The absentee management system 102 provides one or more absentee services (e.g., via services platform component 103), such as an absentee calendar, as discussed in more detail later in this disclosure. The absentee management system 102 includes one or more databases 104, such as an employee database, an absentee database, and/or a compliance standard database. In some embodiments, one or more of the database(s) 104 are maintained by a different entity than an entity that provides the services platform component 103. In some embodiments, a first entity provides and maintains the services platform component 103 for assisting users with managing absentee data that is stored in the database(s) 104, which are maintained by a second entity and communicatively linked to the services platform component 103.

The absentee management system 102 is communicatively coupled to entities 106 (e.g., a first entity system 106-1 through a $Z^{th}$ entity system 106-Z) via one or more communication networks 110. In some embodiments, the absentee management system 102 facilitates various actions, tasks, and communications between a variety of entities and employees and/or supervisors of these entities (e.g., electronic devices 108-1-1 through 108-1-N associated with the entity 106-1 and electronic devices 108-Z-1 through 108-Z-Q associated with the entity 106-Z), and optionally one or more external servers and/or devices, such as a server and/or device associated with an insurance provider or a medical provider.

In some embodiments, the communications network(s) 110 interconnects the absentee management system 102 and the various entities 106 including their corresponding devices with one another, as well as optional external systems and devices. In some embodiments, the communication network(s) 110 include the Internet, one or more local area networks (LANs), one or more wide area networks (WANs), other types of networks, or a combination of such networks. Examples of networks include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Other topologies of the distributed computing system 100 are considered. For instance, in some embodiments, any of the illustrated devices and systems can constitute several computer systems that are linked together in a network, or can be a virtual machine or a container in a cloud computing environment. As such, the exemplary topology shown in FIG. 1 merely serves to describe the features of an embodiment of the present disclosure in a manner that will be readily understood to one of skill in the art.

Figure 2:
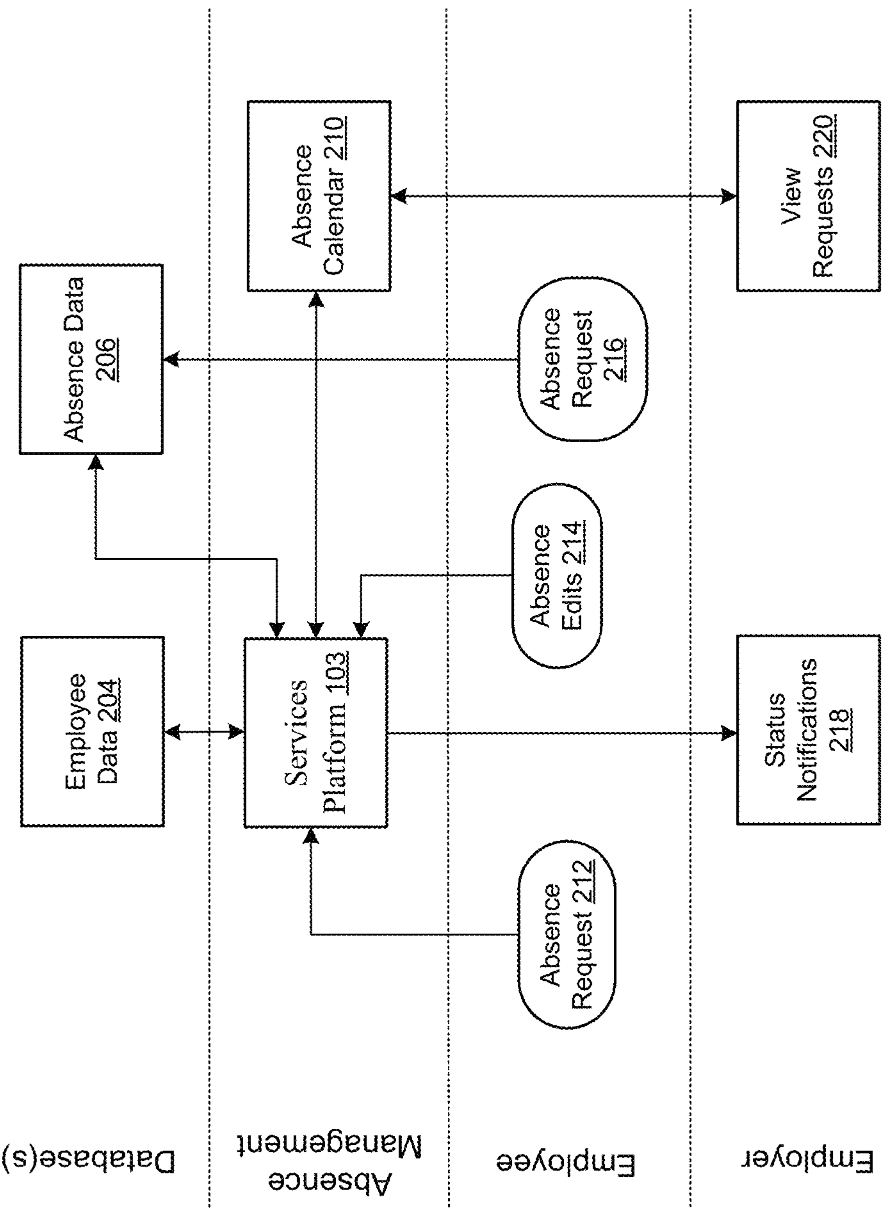
FIG. 2 illustrates an example absentee management flow in accordance with some embodiments.

FIG. 2 illustrates an example absentee management flow in accordance with some embodiments. As shown in FIG. 2, an employee submits an absence request 212 to the services platform component 103. In some embodiments, the services platform component 103 assists the employee with generating the absence request 212, e.g., by providing form(s), input field(s), instruction(s), and/or information via a human interface module (e.g., a chatbot). The services platform component 103 obtains employee data 204 from one or more databases (e.g., in real time) in response to the absence request 212. In some embodiments, the services platform component 103 is configured to use data from the absence request 212 (e.g., an employee name and/or identifier) to query the one or more databases. In some embodiments, the services platform component 103 supplements data from the absence request 212 with additional employee data from the employee data 204. In some embodiments, the services platform component 103 pulls the employee data 204 (e.g., in real-time) from the database(s) in response to receiving the absence request 212. In some embodiments, the services platform component 103 determines an absence type for the requested absence based on information from the absence request 212 and/or the employee data 204. The services platform component 103 generates an absence entry based on the absence request 212 and the employee data 204, and sends the absence entry to one or more database(s) for storage (e.g., as absence data 206).

The services platform component 103 generates one or more status notifications 218 based on the absence request 212, the employee data, and/or the absence data 206 and provides the status notifications 218 to an employer of the employee (e.g., a supervisor, manager, and/or human resources representative). In some embodiments, the services platform component 103 generates the status notification(s) 218 in response to receiving the absence request 212 (e.g., to obtain approval for the absence request). In some embodiments, the services platform component 103 generates the status notification(s) 218 in response to an update to the employee data 204 and/or the absence data 206. In some embodiments, the services platform component 103 generates the status notification(s) 218 on a periodic basis, such as daily, weekly, or monthly. In some embodiments, the status notification(s) 218 are generated in response to one or more requests from the employer.

The employee may submit one or more absence edits 214 to the services platform component 103. For example, the employee may need to change or cancel a planned absence. In some embodiments, the services platform component 103 obtains at least a portion of the employee data 204 in response to the absence edits 214. In some embodiments, the services platform component 103 obtains a corresponding absence entry from the absence data 206 in response to the absence edits 214. In some embodiments, the services platform component 103 updates, deletes, or overwrites an absence entry in response to the absence edits 214. In some embodiments, the services platform component 103 sends an updated absence entry to the one or more database(s) (e.g., to be stored as a portion of the absence data 206).

In accordance with some embodiments, the employee may submit an absence request 216 to the database(s) directly. For example, depending on an absence type, an employee may be directed to submit the absence request to the services platform component or to the one or more databases. In some embodiments, the one or more databases include an absence module for managing the absence data 206 and/or the absence request 216.

The services platform component 103 generates one or more absentee calendars 210. In some embodiments, the services platform component 103 maintains the absentee calendar(s) 210 using the absence data 206. FIGS. 7A and 7B, discussed later, illustrate example absentee calendar user interfaces in accordance with some embodiments. In some embodiments, the absentee calendar(s) 210 are generated in response to view request(s) 220 from the employer and/or a view request from the employee. In some embodiments, the status notification(s) 218 include a snapshot of a corresponding absentee calendar 210 and/or a link to view/interact with the corresponding absentee calendar 210. In some embodiments, the view request(s) 220 pull organizational structure data (e.g., supervisor(s) and/or HR representative(s) for various employees), termination data, and/or absence data (e.g., absence categorization data).

Figure 3A:
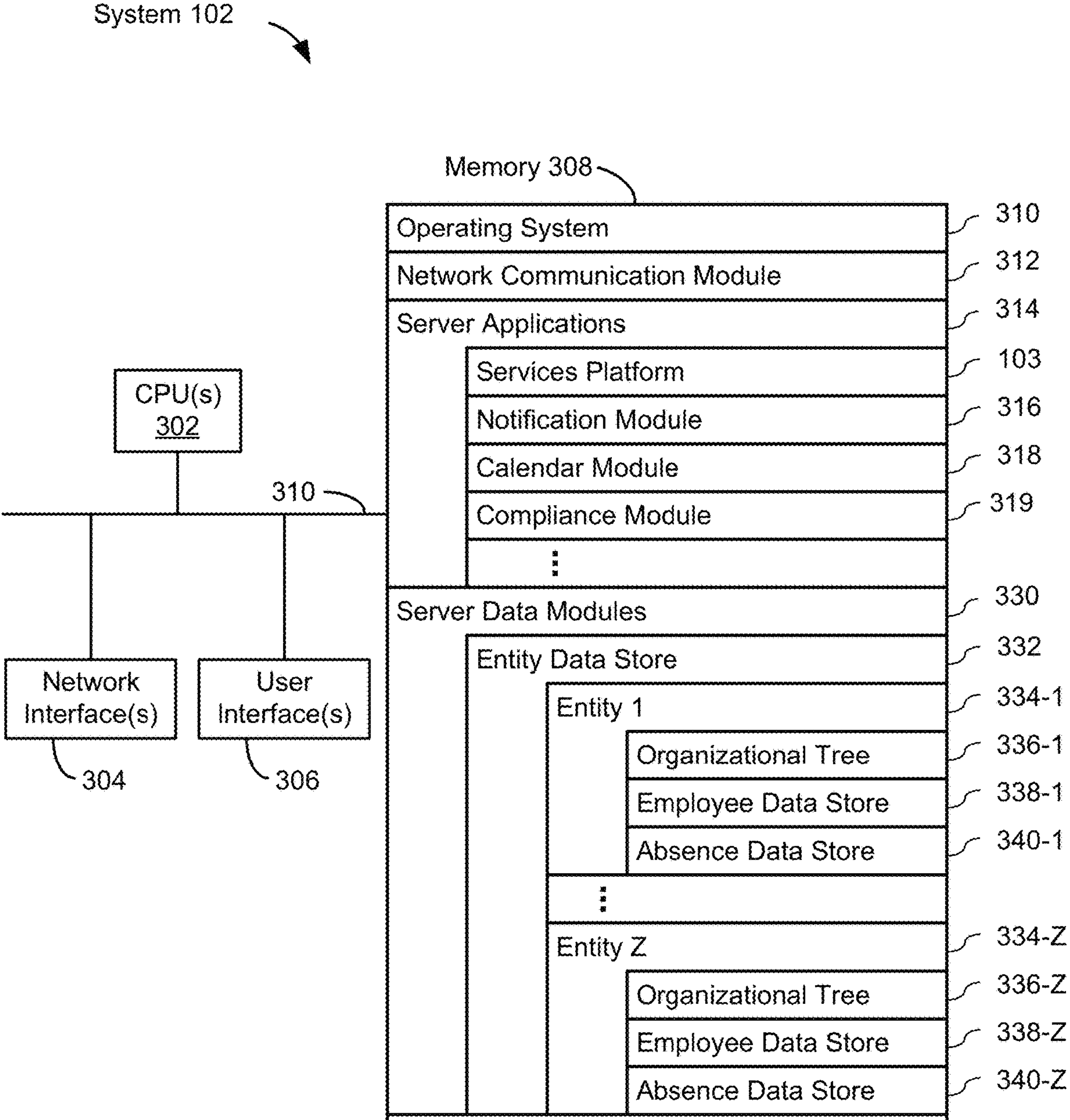
FIG. 3A illustrates an example absentee management system in accordance with some embodiments.

FIG. 3A illustrates components of the absentee management system 102 in accordance with some embodiments. The absentee management system 102 includes one or more processors (e.g., CPUs) 302, a network or other communications interface 304, user interface(s) 306, a memory 308 (e.g., volatile and/or non-volatile memory), one or more communication busses 310 for interconnecting the aforementioned components, and a power supply for powering the aforementioned components. The user interface(s) 306 enable a user to interact with the absentee management system 102. In some embodiments, the user interface(s) 306 include a display and an input device (e.g., a keyboard or a mouse) for use by the user. In some embodiments, the memory 308 includes one or more storage devices hosted on computers that are external to the absentee management system 102 but that can be electronically accessed by the absentee management system 102, e.g., via an Internet, intranet, or other form of network or electronic cable using the network interface(s) 304.

The memory 308, or alternately, the non-volatile memory solid-state storage devices within the memory 308, includes a non-transitory computer-readable storage medium. In some embodiments, the memory 308 or the non-transitory computer-readable storage medium of the memory 308 stores the following programs, modules, and data structures, or a subset or superset thereof:

- an operating system 310 (e.g., ANDROID, IOS, DARWIN, RTXC, LINUX, UNIX, OS X, WINDOWS, or an embedded operating system such as VxWorks) that includes procedures for handling various basic system services and/or for performing hardware-dependent tasks;
- a network communication module 312 for connecting the absentee management system 102 to other computing devices (e.g., the devices of entities 106) via the communication interface(s) 304 (wired or wireless) connected to the one or more communication network(s) 110;
- server applications 314 for providing various services and functions to users and remote devices, including:
  - the services platform component 103 that facilitates management of absentee information and requests;
  - a notification module 316 that facilitates generating one or more notifications to provide to the entities 106 and/or devices of the respective entities;
  - a calendar module 318 that facilitates generating one or more calendars to provide to the entities 106 and/or devices of the respective entities; and
  - a compliance module 319 that facilitates determining compliance with one or more polices and/or compliance standards; and
- one or more server data module(s) 330 for handling the storage of and/or access to employee and/or absence data, including:
  - entity data store 332 that stores data and information related to one or more entities 334 (e.g., the entity 106-1 of FIG. 1), each entity 334 having associated data and information that includes:
    - an organizational tree 336 that represents a hierarchy of the corresponding entity 334;
    - an employee data store 338 that stores data and information related to each employee (e.g., the employee data 204) associated with the corresponding entity 334; and
    - an absence data store 340 that stores data and information related to leaves of absence, absence requests, and/or absence types (e.g., the absence data 206) associated with the corresponding entity 334.

As described above, the entity data store 332 includes data and information related to each respective entity 334. In some embodiments, each entity 334 corresponds to an entity system 106 of FIG. 1 for (e.g., the entity 334-1 of FIG. 3A corresponds to the entity 106-1 of FIG. 1 and the entity 334-Z of FIG. 3A corresponds to the entity 106-Z of FIG. 1). However, the present disclosure is not limited thereto. For instance, in some embodiments, each entity 334 includes one or more entities that have one or more shared aspects, such as a shared insurance policy, and/or are subsidiaries of a same parent entity (e.g., a shared board of directors). The entities 106 of the present disclosure include business organizations such as small business and international corporations, government agencies such regional government departments and/or educational institutions, and/or non-profit organizations such as charities in various embodiments.

In some embodiments, each entity 334 stored by the absentee management system 102 includes a corresponding organizational tree 336. The organizational tree 336 assists in determining a hierarchy of the employees and supervisors of the corresponding entity 106. In some embodiments, the organizational tree 336 is continuously updated as the hierarchy changes within the corresponding entity 106. In some embodiments, the organizational tree 336 is generated from data and information supplied by each entity 106 (e.g., the employee data 204). This data and information may be supplied from a demographic feed that is communicated by each entity 106. For instance, in some embodiments, the demographic feed is provided by an entity 106 via an application (e.g., human resource management software) associated with the entity 106. Example applications include PeopleSoft, Automated Data Processing (ADP), Systems Applications and Products in Data Processing: Human Capital Management (SAP: HCM), Workday, and the like. However, the present disclosure is not limited thereto. For instance, in some embodiments, the organizational tree 336 is generated by analyzing employee records provided by the entity 106 (e.g., supervisor identifying information, supervisee information, and/or employee records). In some embodiments, data and information received from each entity 106 through the demographic feed includes one or more incomplete, or deficient, employee records. Incomplete employee records include records that do not include and/or indicate supervisor information (e.g., a missing supervisor name and/or address data field), which creates one or more gaps or voids in the organizational tree 336 (e.g., a node uncoupled from other nodes). For instance, in accordance with a determination that an entity 106 communicates 10,000 employee records in a demographic feed yet only 9998 records are recognized by the absentee management system 102, the absentee management system 102 provides the results of this determination in a subsequent notification.

In some embodiments, each organizational tree 336 includes one or more nodes that are interconnected to other nodes through linking branches. Each linking branch represents a reporting relationship within the hierarchy of the corresponding entity 334. For instance, in some embodiments, an organizational tree 336 includes a corresponding node for each employee of the corresponding entity 334. Moreover, each parent node may be a child node to a higher parent node in the hierarchy of the entity 334. For instance, a chief technical officer (CTO) may represent a first parent node with project managers representing children nodes linked to the first parent node of the CTO. Accordingly, each of these project manager child nodes may also act as parent nodes to various employee child nodes that are assigned to the corresponding project of the project manager. This parent-child to parent-child relation may propagate throughout the organizational tree 336 depending on a structure and a number of employees of each entity 334. Furthermore, in some embodiments, a top node of the organizational tree 336 (e.g., a node that represents a CEO of the respective entity 334) is excluded from the organizational tree, and optionally stored in a separate organizational tree or configuration table. Excluding the top node (e.g., the CEO or owner) from the organizational tree reduces a reliability on the CEO to have a blank supervisor or be set to their own email address within the demographic feed (e.g., the CEO only reports to themselves). In some embodiments, the top node is included in the organizational tree 336 and includes information related to a board of the respective entity 334, which supervises the CEO. The organizational tree 336 associated with each entity 334 provides a representation of which employees report to which supervisor, which supervisor reports to which manager, which manager reports to which director, and etcetera.

In some embodiments, the memory 308 stores additional modules and data structures not described above. In some embodiments, the server data modules 330 include a supervisor data store that includes data and information related to each respective supervisor, such as a name, an address, and account information. In some embodiments, the server data modules 330 include a supervisee data store that stores data and information related to each respective supervisee of the corresponding supervisor. In some embodiments, the server data modules 330 include a compliance information store that stores data and information related to various entity, government, and regional compliance protocols and practices. In some embodiments, the server data modules 330 include a human resources information store that stores data and information related to human resources (HR) and various benefits of a corresponding entity.

In some embodiments, the supervisor data associated with each entity 334 stores information related to one or more supervisors of the respective entity. This information includes identifying information of the corresponding supervisor. For instance, in some embodiments, the identifying information that is stored includes a name of the supervisor, an email address associated with the supervisor, a name of at least one other employee that shares a reporting relationship with the supervisee (e.g., the at least one other employee is a supervisor, the at least one other employee is a supervisee), an email address of the at least one other employee that shares the reporting relation, account information of the respective supervisor such as a username and/or a password, absentee status information, or a combination thereof. Furthermore, in some embodiments, the identifying information includes an account creation date of the respective supervisor, an account deletion date of the respective supervisor, a hire date of the respective supervisor, a termination date of the respective supervisor, or a combination thereof.

In some embodiments, the information related to the at least one other employee that shares the reporting relationship may be stored in, or determined from, each supervisee information. This supervisee information provides identifying information of the corresponding employee that is a supervisee to the respective supervisor. In some embodiments, the supervisee information includes the information as described above in relation to the identifying information of the supervisor. For instance, in some embodiments, the identifying information of each supervisor includes identical data fields as each supervisee information. In some embodiments, each employee record includes contact information (e.g., a name, an email address, and/or a physical address) associated with an HR representative of the corresponding entity instead of a supervisor. In some embodiments, an HR representative is included in combination with the supervisor information. This combination allows for an HR representative of the respective entity 334 to oversee various aspects of the present disclosure, such as reviewing a corresponding calendar for a respective supervisor, since the HR representative will also be provided a notification for each employee record that the HR representative is included in.

In some embodiments, one or more of the supervisee information for a particular supervisor includes an absence status. This absence status includes information related to a past absence, a current (e.g., ongoing) absence, a future (e.g., a scheduled and/or requested) absence, or a combination thereof. In some embodiments, the absence status includes various information pertaining to one or more absentee status categories that are associated with a respective employee. For instance, in some embodiments, the absentee status categories include a leave of absence for an accommodation (e.g., a medical appointment, a funeral, a personal day, a vacation, or a wedding), an absence to care for a child of the supervisee, a maternity leave, a paternity leave, an absence related to a pregnancy of the supervisee, or an absence to care for a spouse and/or significant other of the supervisee. One skilled in the art will appreciate that other absentee status categories may be included that are not described in the present disclosure, but are within the scope of the present disclosure. These other absentee status categories may relate to regional practices and laws (e.g., a required jury duty or a regional holiday), as well as a type of each entity. For instance, in some embodiments, an absentee status category is included for required military and/or civil service, such as an entity located in Singapore.

In some embodiments, each employee associated with an entity 334 has an employee record communicated in a demographic feed. However, the present disclosure is not limited thereto. For instance, in some embodiments, only employee records that include an absentee status associated with the employee are communicated through the demographic feed. This selective communication yields a lightweight system (e.g., less time and/or resources required to process data and information of the demographic feed) that is not weighted down by unnecessary information that is not pertinent to each supervisor. For instance, if a supervisor has a team of associated supervisees but only one of these has an absence status, then the supervisor does not need information pertaining to the other supervisees who are presently at work when managing absenteeism of their respective team.

In some embodiments, a compliance information store is associated with each entity 334 of the absentee management system 102. In some embodiments, the absentee management system 102 stores a single compliance information store that is utilized by multiple entities. The compliance information store facilitates storing data and information related to various compliance protocols and guidelines associated with the entit(ies). For instance, if the entity has an insurance policy that must be adhered to, this policy is incorporated within the compliance information store. In some embodiments, local and/or regional laws and guidelines are stored in the compliance information store. In some embodiments, the compliance information store includes, and optionally updates on a recurring basis, guidelines for managing employees with disabilities or workplace restrictions, such as the Americans with Disabilities Act "Americans with Disabilities Act Title II Regulations-Nondiscrimination on the Basis of Disability in State and Local Government Services," 28 Code of Federal Regulations Part 35, as well as the Americans with Disabilities Act "Americans with Disabilities Act Title III Regulations-Nondiscrimination on the Basis of Disability by Public Accommodations and in Commercial Facilities," 28 Code of Federal Regulations Part 36, each of which is hereby incorporated by reference in its entirety. In some embodiments, the compliance information store includes, and optionally updates on a recurring basis, guidelines for family and medical leave, such as the Wage and Hour Division of the United States Department of Labor, "The Employer's Guide to the Family and Medical Leave Act," WH 1421, print, which is hereby incorporated by reference in its entirety. The compliance information store allows for entities to adhere to local guidelines without having to actively police these guidelines since they are automatically enforced through the absentee management system 102. The absentee management system 102 may enforce these guidelines by reviewing past, present, and future absence claims of each respective employee and comparing this information to, at least, the various eligibility required for the respective claim. In some embodiments, a national entity includes compliance information that pertains to each state and/or territory the entity operates in order to simplify compliance with these states and/or territories. In some embodiments, a local entity includes compliance information that pertains to a local area. In some embodiments, when an employee is returning to work from an absence, the employee is required to adhere to one or more workplace restrictions related to their absence. For instance, an employee returning from work after a head injury may be required to take an hour break for every three hours of work. Accordingly, this hour break compliance information is stored in the compliance information store and/or in the employee record.

In some embodiments, a human resources (HR) information store, hereinafter "HR store," is associated with each entity of the absentee management system 102. The HR store facilitates storing data and information related to various HR protocols and practices, as well as any benefits that are associated with the respective entity. In some embodiments, the absentee management system 102 utilizes this information of the HR store in order to ensure that each absence claim of a respective employee adheres to HR policies of the respective entity.

As described above, the notification module 316 facilitates generating notifications for one or more supervisors, managers, and/or HR representatives and communicating these notifications to their respective recipients. In some embodiments, a notification is generated for each supervisor that has a supervisee having a corresponding absence status. In some embodiments, a notification includes information pertaining to each supervisee which has a corresponding absence status, and excludes supervisees that do not have a corresponding absence status. In some embodiments, the notification module 316 provides a listing that includes each supervisee that directly, or indirectly, reports to the respective supervisor and has an absentee status category.

In some embodiments, one or more of the above identified data elements or modules of the absentee management system 102 are stored in one or more of the previously described memory devices and correspond to a set of instructions for performing a function as described above. The above-identified data, modules, and programs (e.g., sets of instructions) need not be implemented as separate software programs, procedures, or modules, and thus various subsets of these modules may be combined or otherwise re-arranged in various embodiments. In some embodiments, the memory 308 optionally stores a subset of modules and data structures identified above. For instance, in some embodiments, the notification module 316 and the calendar module 318 are subsumed as one module.

Figure 3B:
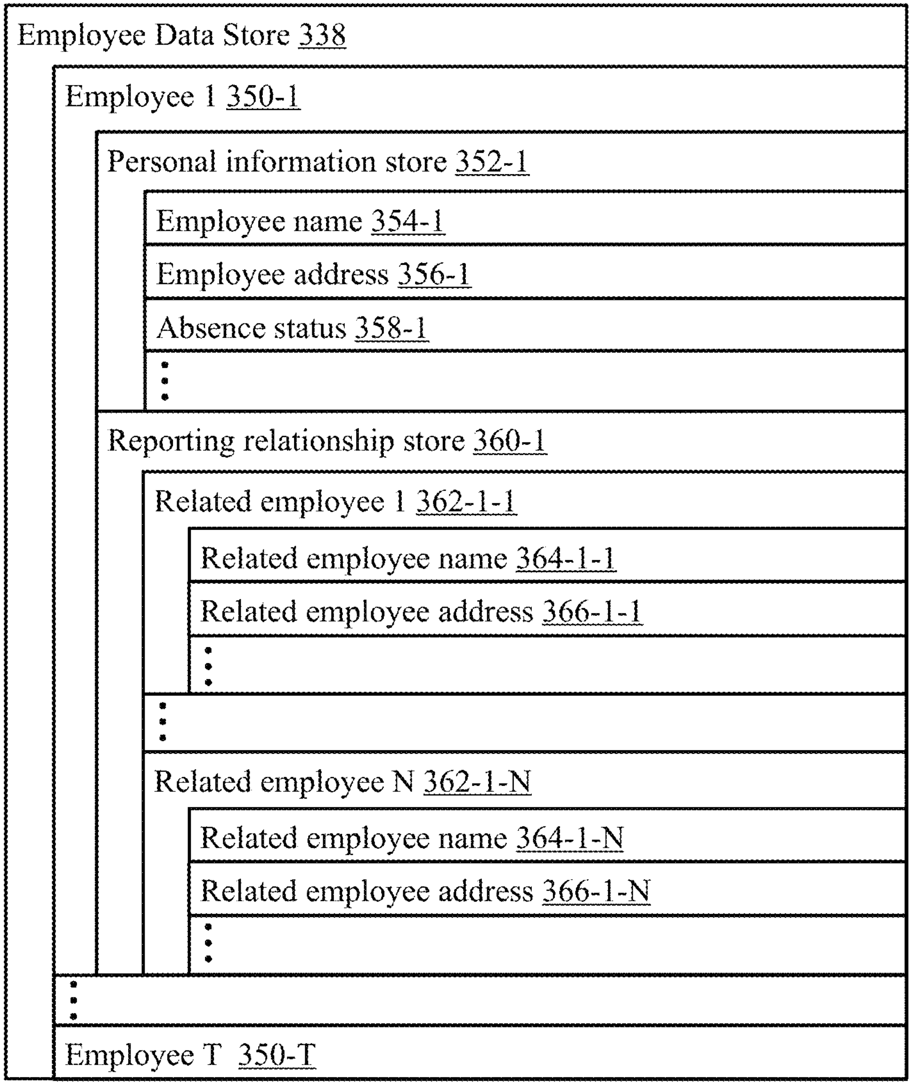
FIG. 3B illustrates an example employee data structure in accordance with some embodiments.

FIG. 3B illustrates an employee data store 338 in accordance with some embodiments. The employee data store 338 includes information regarding employees 350 (e.g., employee 350-1 through employee 350-T). In accordance with some embodiments, the information for each employee 350 includes a corresponding personal information store 352 and a corresponding reporting relationship store 360. The personal information store 352 includes an employee name 354, an employee address 356, and an absence status 358. In some embodiments, the personal information store 352 includes a phone number, an email address, and/or other contact information for the employee 350. The reporting relationship store 360 includes information on a set of related employees 362 (e.g., related employee 362-1-1 through related employee 362-1-N). In accordance with some embodiments, the information for each related employee 362 includes a related employee name 364 and a related employee address 366. In some embodiments, the information for a related employee 362 includes a relationship indicator for the relationship between the employee and the related employee. In some embodiments, the information for a related employee 362 includes contact information for the related employee. In some embodiments, the employee data store 338 includes the employee data 204.

FIG. 4 illustrates an electronic device 108 in accordance with some embodiments. In some embodiments, the electronic device 108 is configured for receiving, reviewing, and/or managing absence information. The electronic device 108 includes one or more processors (CPUs) 402, a network or other communications interface 404, a memory 408 (e.g., volatile and/or non-volatile memory), one or more communication busses 409 for interconnecting the aforementioned components, and a power supply for powering the aforementioned components. The electronic device 108 further includes a user interface 406 that enables a user to interact with the electronic device. In some embodiments, the user interface 406 includes a display and an input device (e.g., a keyboard or a mouse) for use by the user. In some embodiments, the memory 408 includes one or more storage devices hosted on computers that are external to the electronic device 108 but that can be electronically accessed by the electronic device 108, e.g., via an Internet, intranet, or other form of network or electronic cable using the network interface(s) 404.

The memory 408, or alternately, the non-volatile memory solid-state storage devices within the memory 408, includes a non-transitory computer-readable storage medium. In some embodiments, the memory 408 or the non-transitory computer-readable storage medium of the memory 408 stores the following programs, modules, and data structures, or a subset or superset thereof:

- an operating system 410 (e.g., ANDROID, IOS, DARWIN, RTXC, LINUX, UNIX, OS X, WINDOWS, or an embedded operating system such as VxWorks) that includes procedures for handling various basic system services;
- a network communication module 412 for connecting the electronic device 108 to other computing devices (e.g., the absentee management system 102) via the communication interface(s) 404 (wired or wireless) connected to the one or more communication network(s) 110;
- applications 414 for providing various services and functions to users and remote devices; and
- data modules 440 for handling the storage of and/or access to data, including
  - a user data store 442 that stores pertaining information related to the respective user associated with the electronic device 108, such as user access information including usernames, user passwords, and access tokens.

In some embodiments, one or more of the above identified data elements or modules of the electronic device 108 are stored in one or more of the previously described memory devices (e.g., the memory 408) and correspond to a set of instructions for performing a function as described above. The above-identified data, modules, and programs (e.g., sets of instructions) need not be implemented as separate software programs, procedures, or modules, and thus various subsets of these modules may be combined or otherwise re-arranged in various embodiments. In some embodiments, the memory 408 optionally stores a subset of modules and data structures identified above. In some embodiments, the memory 408 stores additional modules and data structures not described above.

Figure 5:
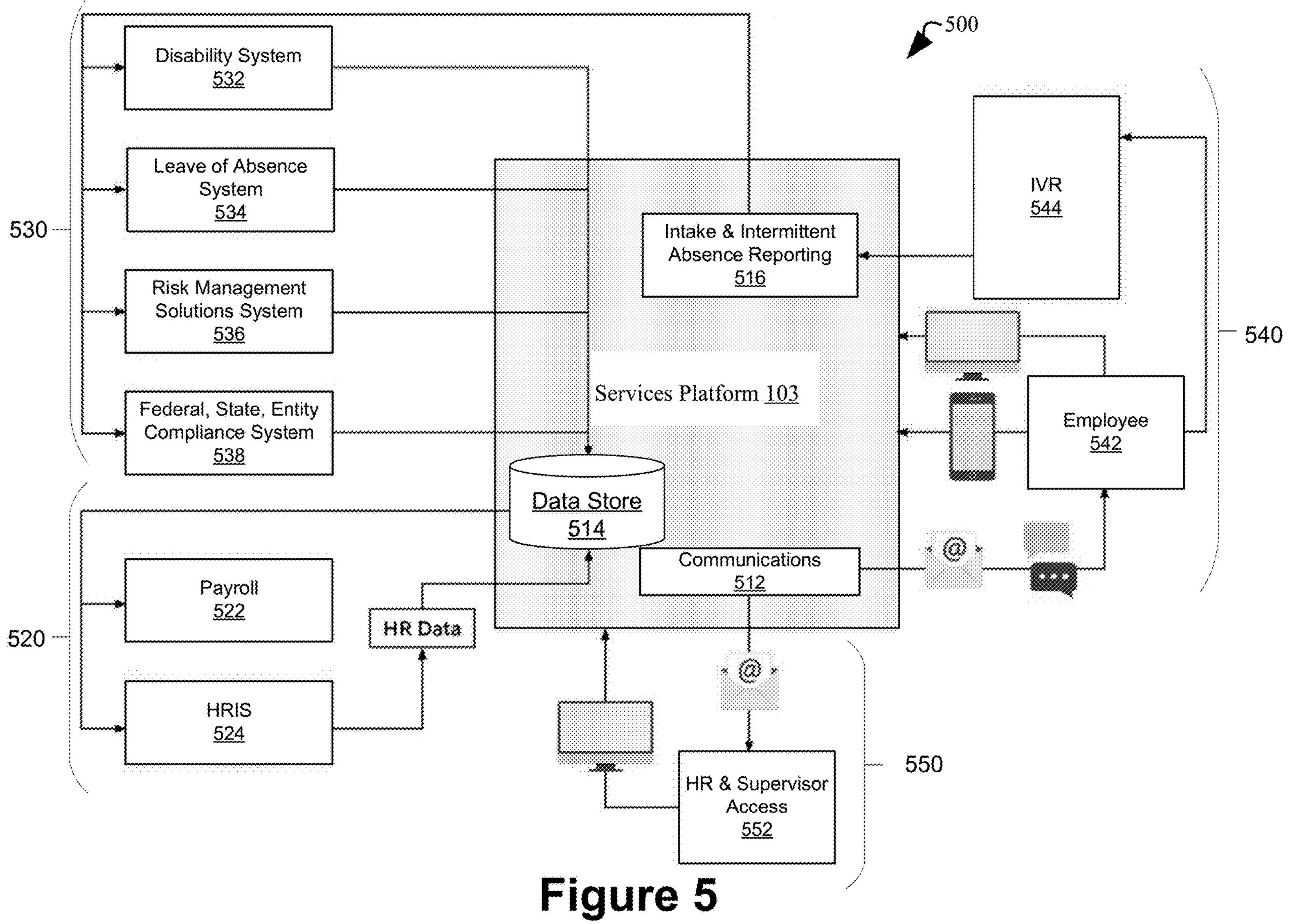
FIG. 5 illustrates an example service system for providing absentee management in accordance with some embodiments.

FIG. 5 illustrates a service system 500 (e.g., the absentee management system 102) for providing absentee management in accordance with some embodiments. As depicted in FIG. 5, the service system 500 includes a communications platform 512 (e.g., the network interface 304 of FIG. 3A), that provides various services, such as status notifications and calendars (e.g., the notification module 316 and/or the calendar module 318 of FIG. 3A), for respective employees of each entity 106 (e.g., a supervisor platform 540 and/or an employee platform 550) through a communications network (e.g., the communication network(s) 110 of FIG. 1). Furthermore, the service system 500 includes a data store platform 514 (e.g., the memory 308 of FIG. 3A) for storing data received from each entity 106, each electronic device 108, and/or an external server and/or device (e.g., data communicated through an absentee status feed and/or a demographic feed).

In some embodiments, each entity 106 communicates various information 520 to the service system 500 through the above-described communication network(s) 110. In some embodiments, the information 520 is communicated through a feed of information that is provided on a recurring basis. In some embodiments, the information 520 includes payroll information 522 and/or human resource information system 524 (HRIS), which constitute the demographic feed and/or the absentee status feed. For instance, in some embodiments, the HRIS 524 stores each employee record associated with each respective employee of the entity 106. Accordingly, data and information is communicated by the HRIS 524 for each employee record that has an absence status associated with the respective employee. Communicating data and information related only to employees that have an associated absence status, instead of all employee records, reduces an amount of data and information that is parsed by the service system 500 which assists in reducing the overload of information presented to each supervisor.

In some embodiments, from the information 520 provided to the service system 500, various services 530 are provided to each entity 106 through the intake and intermittent absence reporting platform 516, hereinafter "absence reporting platform 516." In some embodiments, the services 530 provided by the service system 500 for a respective entity 106 include a disability system 532. In accordance with some embodiments, the disability system 532 helps ensure that each respective entity 106 complies with various disability regulations and requirements, such as the Americans with Disabilities Act with sets forth exact design requirements to suite persons with disabilities. For instance, in accordance with a determination that an absence claim is associated with a disability, this claim subjected to the disability system 532 in order to ensure that the claim adheres to proper compliance regulations. In some embodiments, the services 530 provided by the service system 500 for a respective entity 106 include a leave of absence system 534. The leave of absence system 534 helps ensure that each respective entity 106 complies with various absence regulations and requirements, such as FLMA. For instance, in accordance with a determination that an absence claim is associated with a leave specified by FLMA, this absence claim is subjected to the leave of absence system 534 in order to ensure that the claim adheres to proper compliance regulations. In some embodiments, the services 530 provided by the service system 500 for a respective entity 106 include a risk management solutions system 536. The risk management solutions system 536 ensures that each respective entity 106 is taking appropriate risks with respect to human resource policy and employee management. In some embodiments, the services 530 provided by the service system 500 for a respective entity 106 include a federal, state, and/or entity compliance system 538, hereinafter "compliance system," which helps ensure that an employee and/or entity 106 follows various regulation procedures and protocols. For instance, in some embodiments, the compliance system 538 processes each absence claim in order to either approve, deny, or cancel the claim depending on if the claim complies with various regulations, such as FLMA.

In some embodiments, the above identified services 530 provided by the service system 500 need not be implemented as separate services, and thus various subsets of these services may be combined or otherwise decoupled from one another in various embodiments. For instance, in some embodiments, the risk management solution system 536 and the compliance system 538 are subsumed as one system. Similarly, in some embodiments, the disability system 532, the leave of absence system 534, the risk management solutions system 536, the compliance system 538, or a combination thereof are subsumed as one service.

In some embodiments, an employee 542 communicates pertinent information related to an absence request and/or claim, such as an employee calling in sick for a day or an employee reporting an intermittent absence for a temporary migraine. In some embodiments, the employee 542 communicates directly to their respective entity 106, their respective supervisor and/or, as depicted in FIG. 5, communitates directly to the service system 500. In some embodiments, (e.g., where the employee 542 communicates directly to the service system 500) an interactive voice response (IVR) system 544 is utilized to facilitate communication between the employee 542 and the service system 500 without further human interaction aside from the employee 542. In accordance with some embodiments, the IVR system 544 allows each respective employee to communicate pertinent information without interaction with another human, and without consuming valuable time of a supervisor or HR representative.

In some embodiments, in accordance with a determination that information (e.g., a status notification) needs to be communicated to and accessed 552 by a respective employee of an entity 106 (e.g., a supervisor and/or HR representative), the communication platform 512 provides such information to a respective application and/or an electronic device 108. In some embodiments, the information is provided through an application accessible through the Internet. This application includes, but is not limited to, a mobile phone application and/or a web portal application. However, the present disclosure is not limited thereto. For instance, in some embodiments, the information is provided through an email communicated to respective supervisors. Moreover, in some embodiments, the information is provided through a push notification communicated to a respective electronic device 108.

Figure 6:
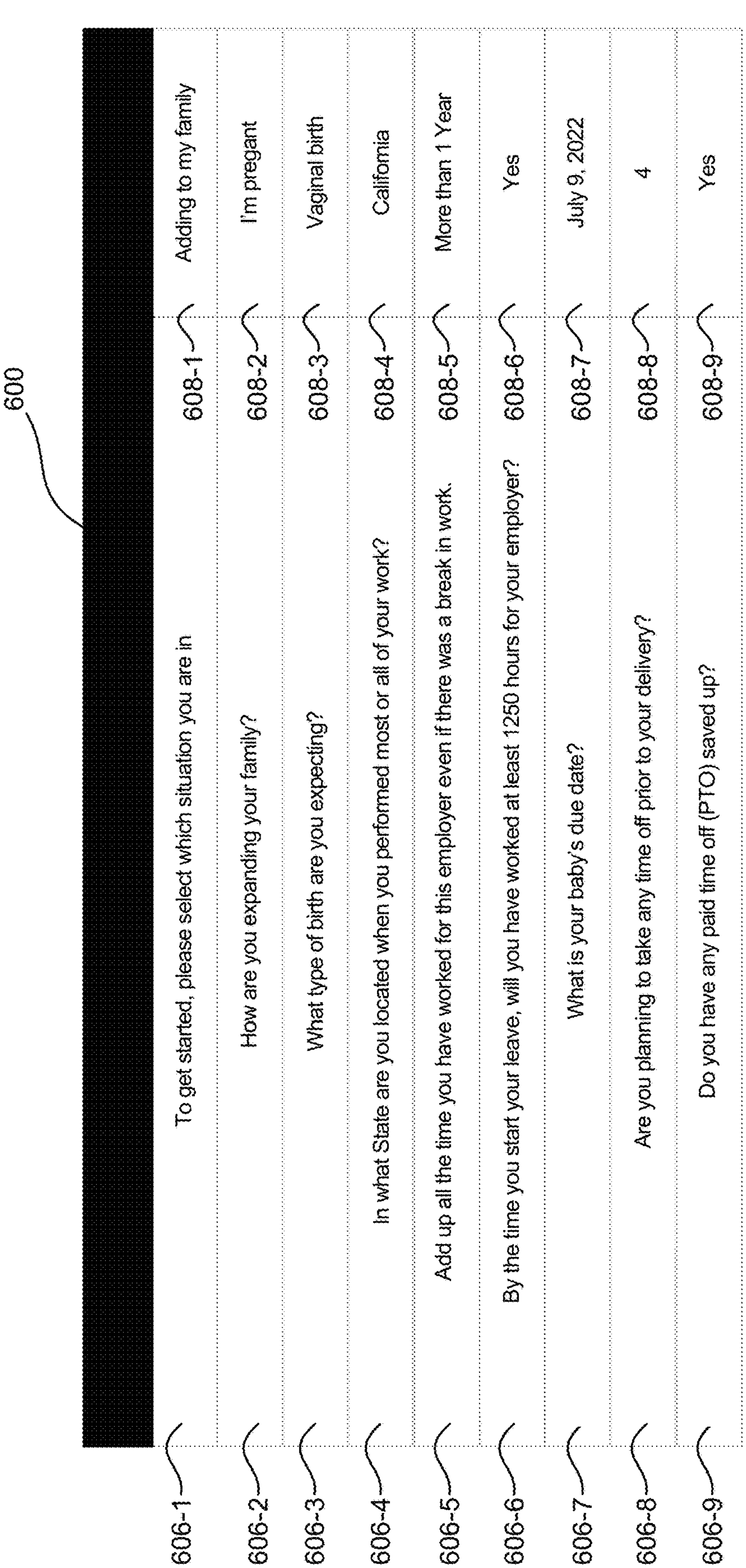
FIG. 6 illustrates an example user interface for creating an absence request in accordance with some embodiments.

FIG. 6 illustrates a user interface 600 for creating an absence request in accordance with some embodiments. The user interface 600 includes a plurality of questions 606 and corresponding answers 608. In some embodiments, the user interface 600 is a form fillable by a user (e.g., a user is able to select an answer 608 for each question 606). In some embodiments, the user interface 600 represents a summary provided to a user upon completion of an absence request. In some embodiments, the user interface 600 represents a summary of an automated absence request process (e.g., a chatbot-based process). In some embodiments, the questions 606 are dynamically-selected based on a user's answer to the previous question(s) (e.g., the absence request process traverses a series of nodes to identify an absence type for the request).

In some embodiments, the absentee management system 102 provides assistance to a user (employee) by obtaining information pertaining to the user, evaluating the obtained information, and displaying a result of the evaluation of the obtained information for review by the user. In some embodiments, the assistance and obtaining of information is facilitated through a conversation between the user and an automated human interface module that is configured to conversationally engage with the user. In some embodiments, the automated human interface module conversationally engages the user by communicating a message that includes a predetermined compliance question configured to elicit a response from the user. Responsive to this, the automated human interface module evaluates whether the message from the user satisfies a respective requirement in a corresponding plurality of requirements associated with a relevant compliance standard. This conversational engagement drives progression in a node graph of the automated human interface. When the automated human interface module determines that the user satisfies at least a subset of the requirements in order to receive a corresponding benefit of the relevant compliance standard, the systems and methods of the present disclosure generate a corresponding report for review by the user. From this, the systems and methods of the present disclosure allow for displaying user-specific information related to the compliance standard conveniently through the corresponding report.

In some embodiments, for each user in a plurality of users, in which the plurality of users includes more than 50,100, 150, 200, or 250 users, a first message is received, in electronic form, from the user to engage in a respective text-based conversation through a respective communication channel in a plurality of communication channels. In some embodiments, the first message includes a first application programming interface token that uniquely identifies the respective text-based conversation. In some embodiments, in response to the first message, an automated human interface module is engaged with the user through the text-based conversation in the respective communication channel. In some embodiments, the automated human interface module includes a node graph which includes a plurality of nodes, where each node in the plurality of nodes is connected to at least one other node in the plurality of nodes. In some embodiments, each respective node in at least a first subset of the plurality of nodes is associated with at least one predetermined compliance question. In some embodiments, each respective node in at least a second subset of the plurality of nodes is associated with a respective compliance standard in a plurality of compliance standards. The respective compliance standard includes a corresponding plurality of requirements for compliance with the respective compliance standard.

FIG. 7A illustrates an absentee report 702 in accordance with some embodiments. The absentee report 702 in FIG. 7A includes a list of continuous absences 704. In some embodiments, the absentee report 702 includes partial and/or new absences. In some embodiments, the absentee report 702 is generated for a particular supervisor and includes a listing of supervisees that report to the supervisor and have a continuous absence status. The absentee report 702 includes an employee name column 710-1, an absence start column 710-2, a return-to-work column 710-3, a status column 710-4, a reason column 710-5, and a claims examiner column 710-6. In some embodiments, the absentee report 702 includes a subset or superset of the above columns. In some embodiments, the absentee report 702 has a different format/layout than shown in the example of FIG. 7A.

As an example, each different absence report 702 provides a listing (e.g., the listing 704) of each supervisee that directly or indirectly reports to the respective supervisor having an absentee status category that is in the enumerated list of absentee status categories together with a current absentee status of the supervisee. In some embodiments, the absence report 702 includes a first notification of each supervisee that directly reports to the respective supervisor and a second notification of each supervisee that indirectly reports to the respective supervisor. In some embodiments, this first notification and second notification are included in the absence report 702, and optionally separated into different notifications.

In some embodiments, each supervisor receives a notification (e.g., the report 702) only in accordance with determination that at least one supervisee has a recent absent status change (e.g., a new absence request or a status change such as a change in return-to-work date). For example, an absence status change 720 occurs, e.g., changing a previously pending status to a current approved status for a corresponding employee absence. The above determination prevents each supervisor from receiving unnecessary notifications with duplicative information. Thus, each supervisor is enabled to review the most recent information by viewing the most recently received notification, which is provided by a single source of information. This reviewing of only the most recently received notification further enables each respective supervisor to view pertinent information from a single point of contact, instead of combing through individual communications provided by each supervisee.

FIG. 7B illustrates supervisor instructions 750 in accordance with some embodiments. The supervisor instructions 750 include new absences information 752, status change information 754, return to work information 756, and a button 760 (e.g., a link) to view an absentee calendar. In some embodiments, the supervisor instructions 750 is provided as part of the absence report 702. The instructions 750 include instructions on how to handle new absences, instructions to handle status changes, instructions on how to handle a return to work (RTW), or a combination thereof. In some embodiments, the new absences information 752 provide instructions for approving, denying, and/or cancelling an absence request. In some embodiments, the status change information 754 include instructions for handling various absence status changes (e.g., a change in date for an expected return to work). In some embodiments, the return-to-work information 756 includes an instruction that an employee is required to fill a RTW form before resuming work, an instruction related to a working limitation of an employee (e.g., an instruction of "John cannot lift over 30 pounds and cannot walk up more than 2 flights of stairs."), and/or a similar instruction for complying with a return to work for a respective employee.

FIG. 7C illustrates an absentee notification 770 in accordance with some embodiments. The absentee notification 770 includes absentee information (e.g., the same or similar information as shown in FIG. 7A) in matrix format. In some embodiments, the report 702 and/or listing(s) 704 are provided via a spreadsheet of information. For instance, in some embodiments, a first portion of the report 702 includes a listing of employees with continuous absences, including all new continuous absences and/or changes to previously presented continuous absences. In some embodiments, a second portion of the report 702 includes a listing of employees with intermittent absences, including all new intermittent absences and/or changes to previously presented intermittent absences. In some embodiments, a third portion of the report 702 includes a listing of employees with new absence claims (e.g., pending claims, partially processed claims, unprocessed claims, and claims inputted at a previous date). In some embodiments, a fourth portion of the report 702 includes a listing of employees with a continuous leave of absence (e.g., prolonged absences). In some embodiments, a fifth portion of the report 702 includes an appendix or legend of terminology used by the report 702. In some embodiments, the report 702 illustrated by FIG. 7C is provided to an HR representative.

Figure 8A:
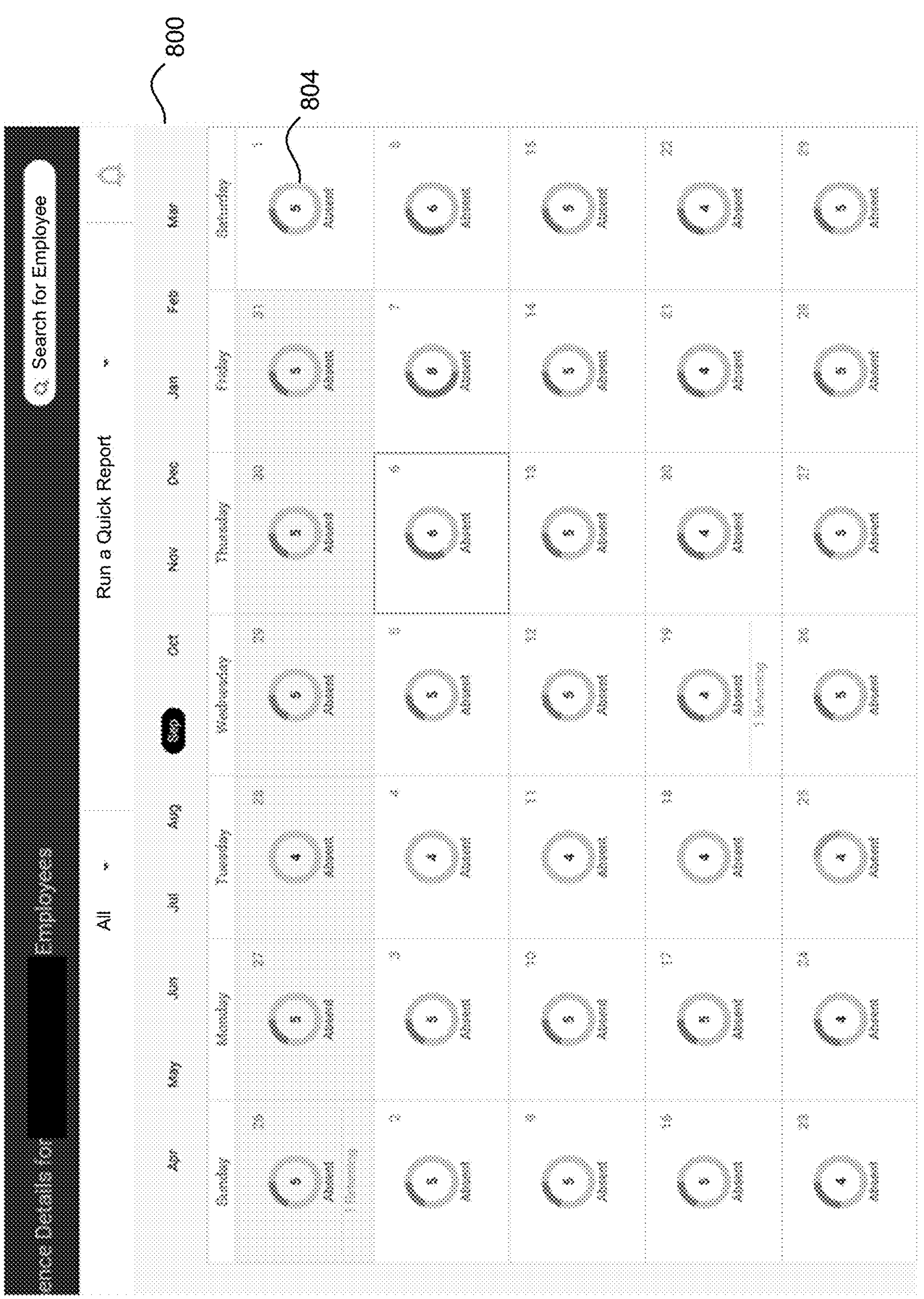
FIG. 8A illustrates an example user interface for displaying absentee information in accordance with some embodiments.

FIG. 8A illustrates a user interface 800 for displaying absentee information in accordance with some embodiments. The user interface 800 includes an absentee calendar with absentee information presented for each day in the calendar. The user interface 800 in FIG. 8A is depicted for a particular supervisor. The absentee calendar includes each day of the given period of time. In some embodiments, each day includes a graphic 804 that illustrates ratios of absence categories for the respective day. For instance, a first graphic for a first day includes a first portion for continuous absences and a second portion for partial absences that is less than the first portion, while a second graphic for a second day includes only a first portion for continuous absences, indicating there are no partial absences for the second day. Thus, the supervisor can readily digest information related to types of absences and number of employees for each type of absence from the graphic 804 associated with a respective day.

In some embodiments, a different absentee calendar is provided to each respective supervisor in the set of supervisors. The different absentee calendars provide, for each respective day depicted in the calendar, a representation of a number of supervisees that directly or indirectly report to the respective supervisor that are absent that day. Unless two or more respective supervisors share identical supervisees, no two absentee calendars will be the same. In some embodiments, each supervisor is provided an option to share their respective absentee calendar with another supervisor of the respective entity 106.

In some embodiments, the absentee calendar provided to each respective supervisor displays a default report. In some embodiments, the default report is selected by each respective supervisor or the respective entity 106. In some embodiments, each supervisor is provided with an option to view different reports from the default report. For example, in some embodiments, each supervisor is provided with an option to select a calendar view of direct reports (e.g., a report that includes supervisees that directly report to the respective supervisor). In some embodiments, each supervisor is provided with an option to select a calendar view of all employees (e.g., a report that includes all employees and a respective entity 106 and/or all absent employees at the respective entity). In some embodiments, each supervisor is provided with an option to select a calendar view of a hierarchy associated with the respective supervisor. For example, in some embodiments, the hierarchy depicts each supervisee that directly and/or indirectly reports to the respective supervisor. In some embodiments, the hierarchy depicts each supervisee that directly and/or indirectly reports to the respective supervisor as well as the corresponding supervisor of the respective supervisor for which the report is being generated (e.g., the report includes the boss of the respective supervisor). In some embodiments, each supervisor is provided with an option to select a calendar view of employees of a particular work group (e.g., HR employees). In some embodiments, each supervisor is provided with an option to select a predetermined subset of employees of the respective entity 106. This predetermined subset of employees includes a selection of employees by the respective supervisor, a selection of employees by the respective entity 106, or a combination thereof. In some embodiments, the user interface 800 includes a search function to allow a supervisor or other viewer to view absences for a particular user or set of users. In some embodiments, the user interface 800 includes a filter function to allow a supervisor or other viewer to filter the data depicted in the absentee calendar.

Figure 8B:
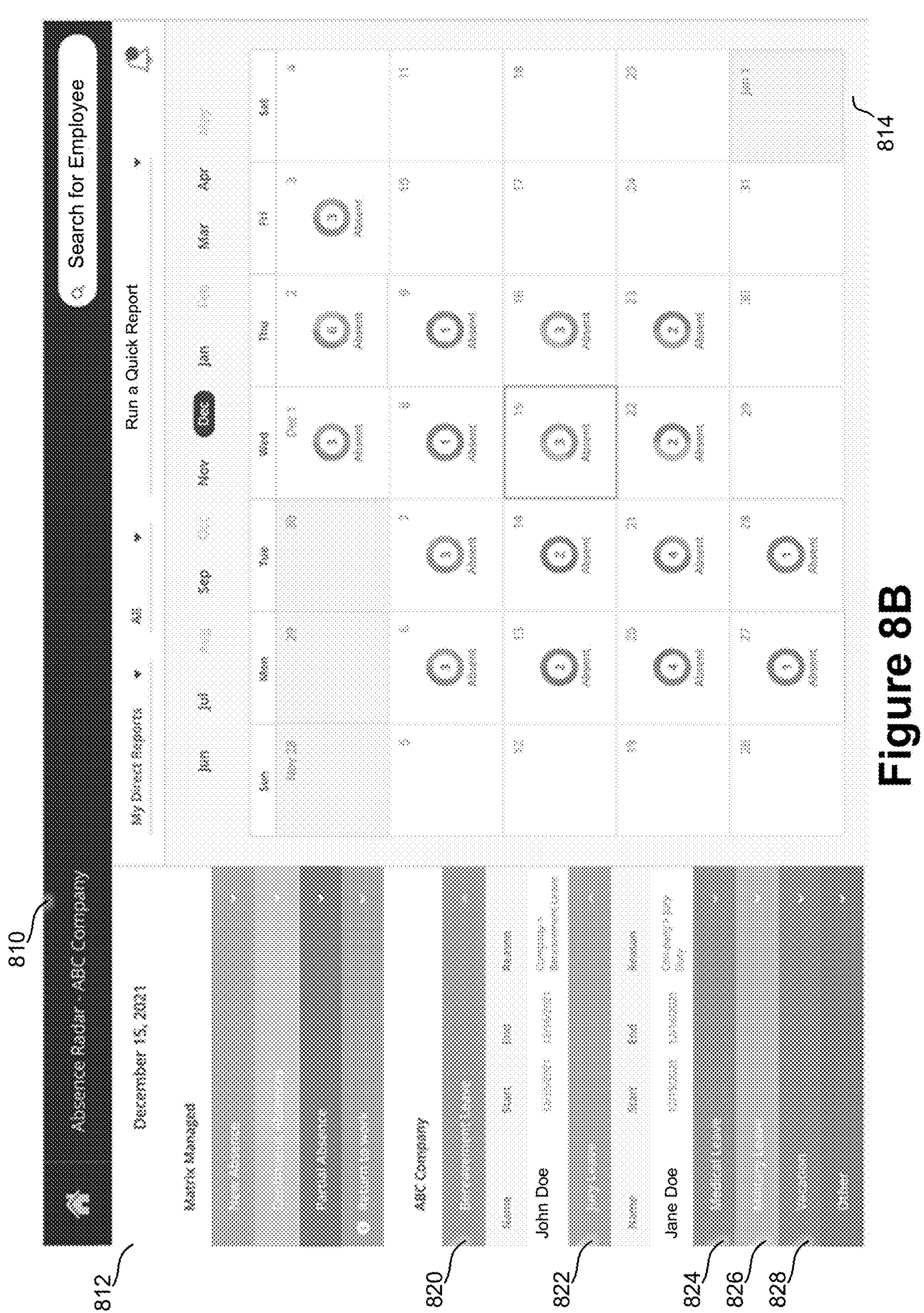
FIG. 8B illustrates another example user interface for displaying absentee information in accordance with some embodiments.

FIG. 8B illustrates a user interface 810 for displaying absentee information in accordance with some embodiments. The user interface 810 includes a listing portion 812 and a calendar portion 814. The calendar portion 814 includes absentee information for each day in a particular calendar period. The listing portion 812 includes a listing of different types of absences (e.g., bereavement leave 820, jury leave 822, medical leave 824, military leave 826, and vacation 828) with information about particular employees having that type of absence (e.g., "John Doe" and "Jane Doe" employees in FIG. 8B).

Figure 9A:
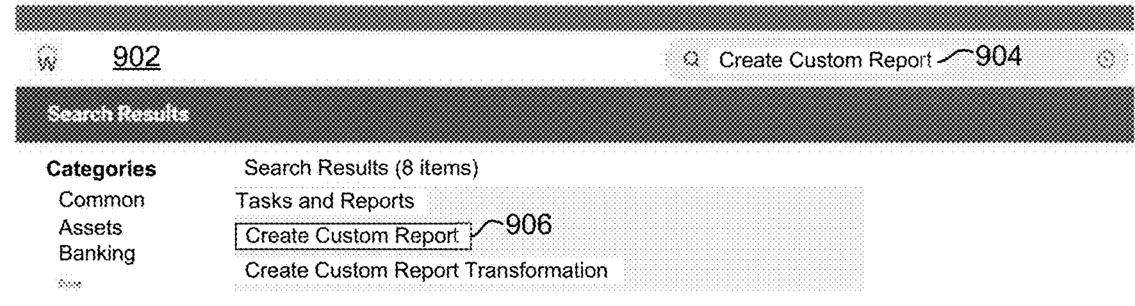
Figure 9B:
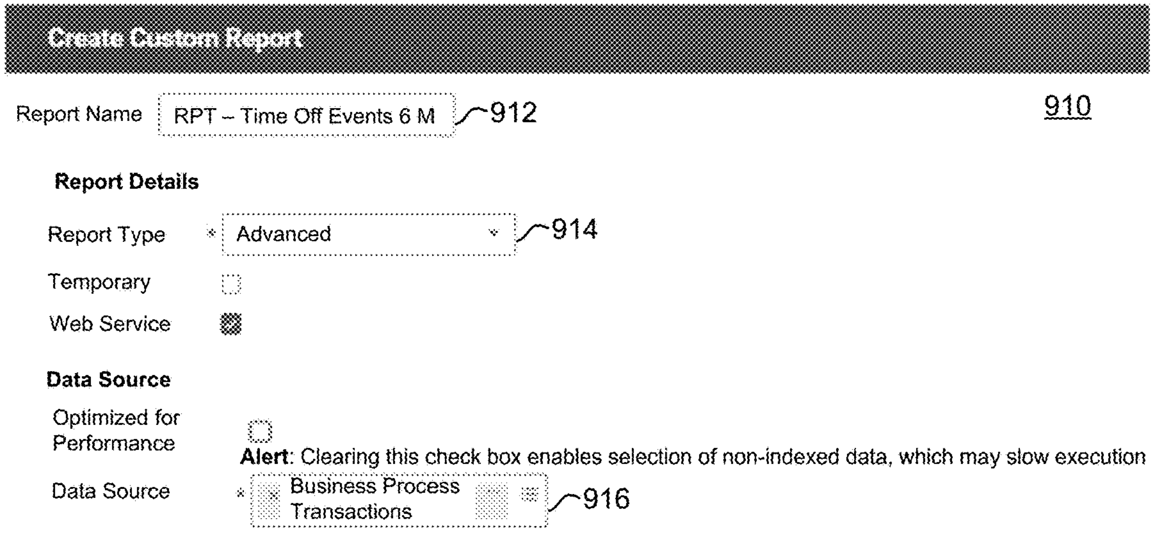
Figure 9C:
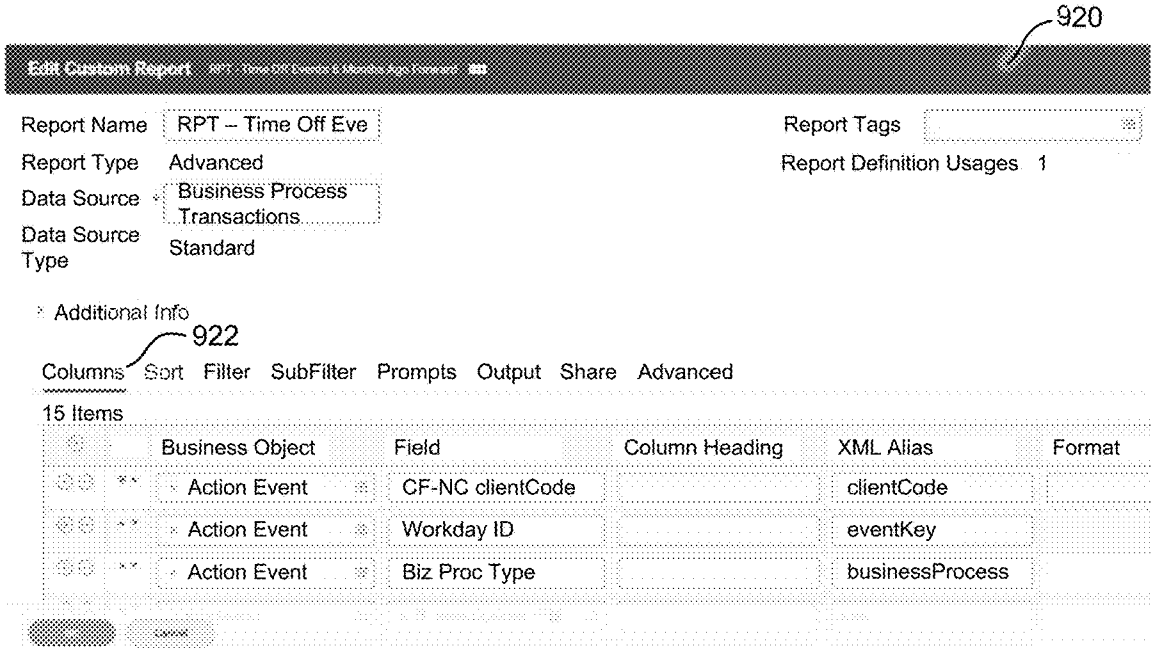
Figure 9D:
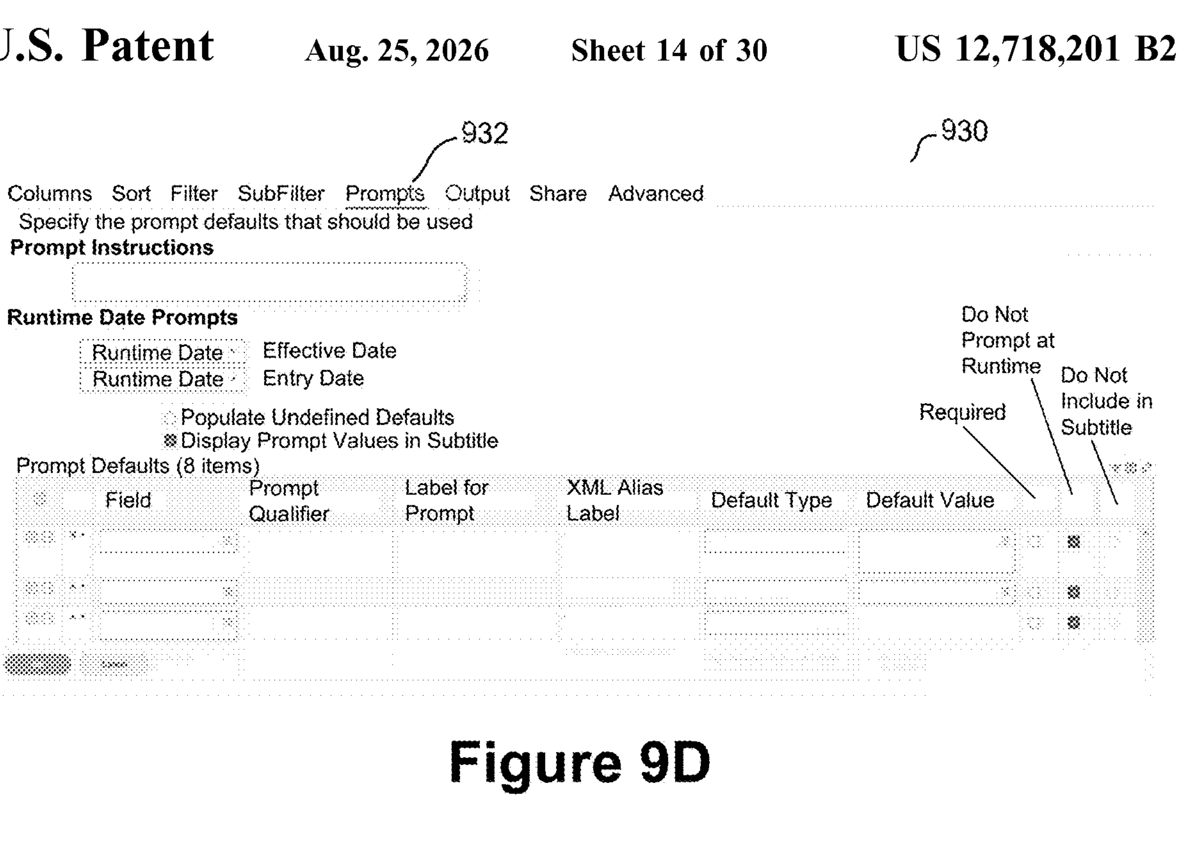
Figure 9E:
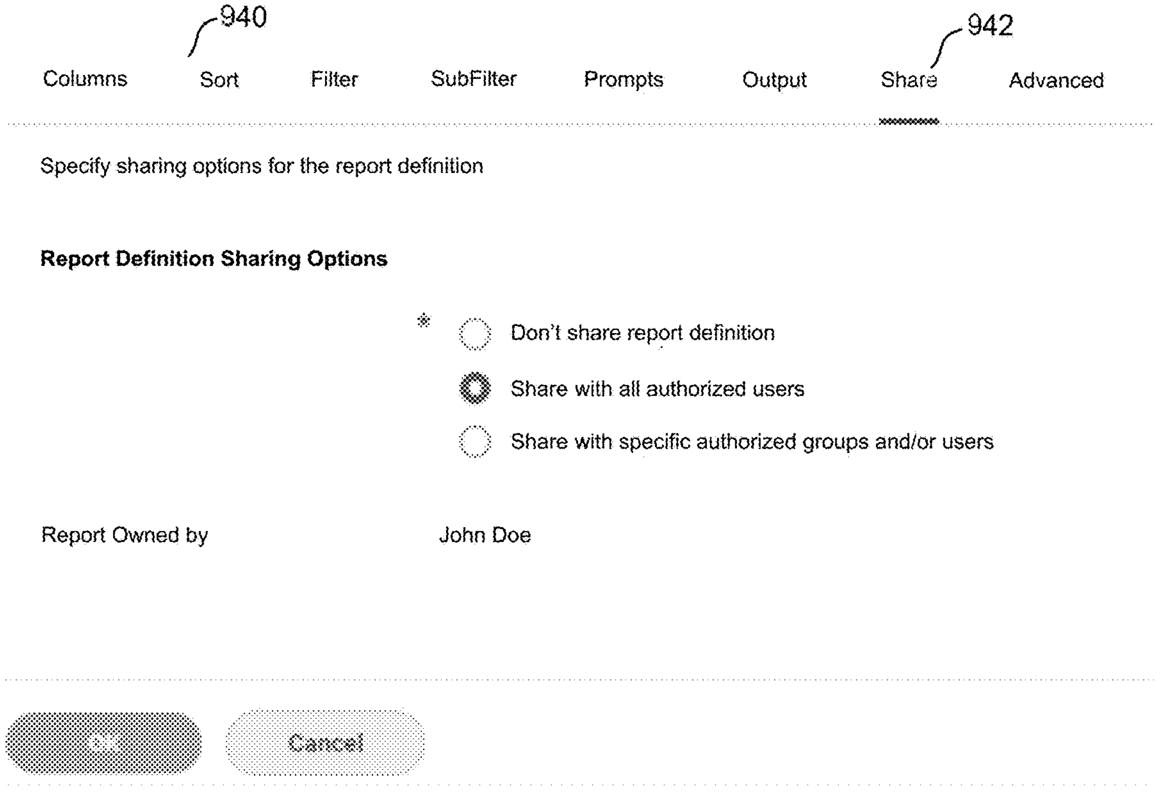
Figure 10A:
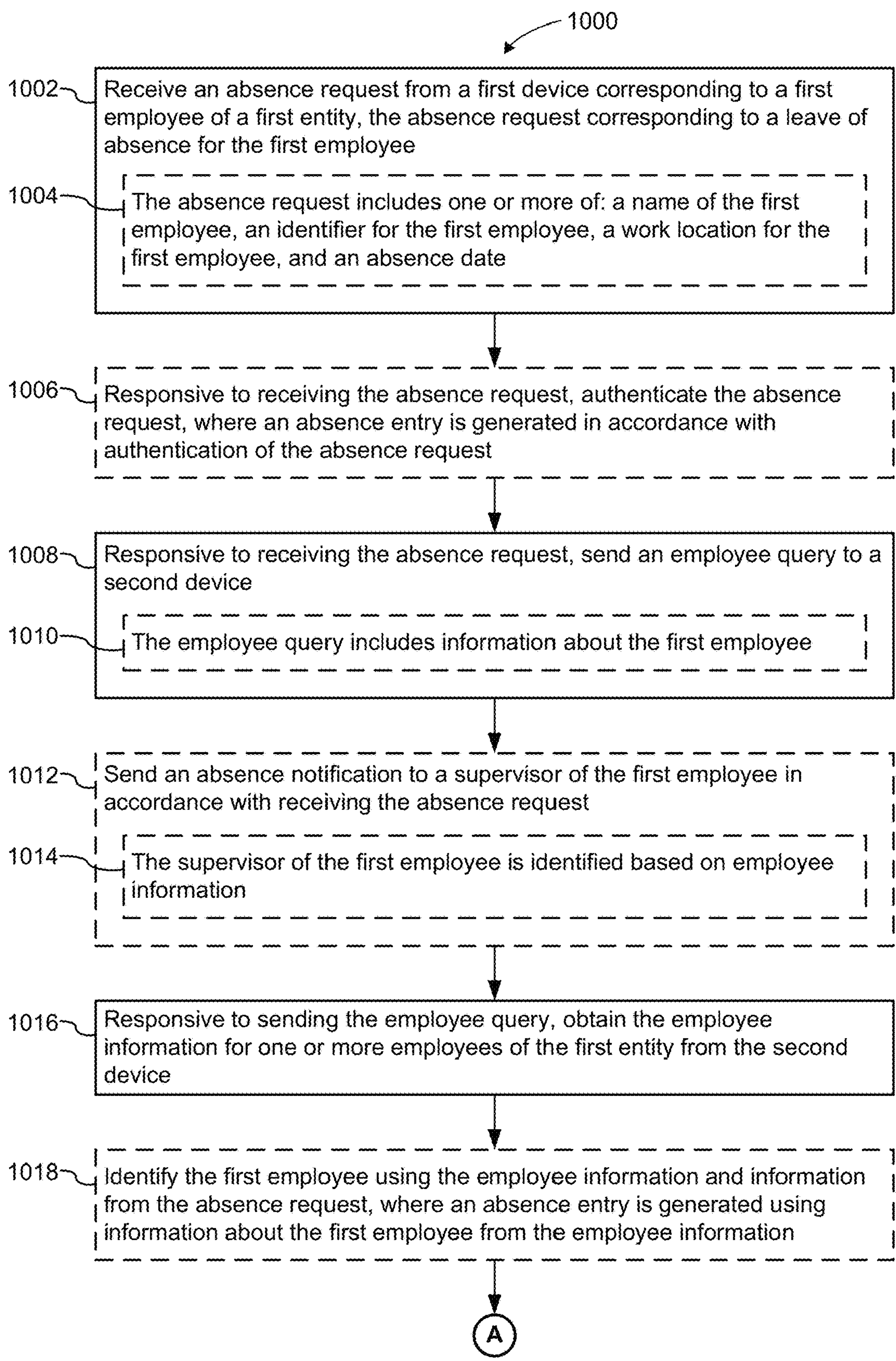
FIGS. 10A-10D are a flow diagram illustrating an example method for absentee management in accordance with some embodiments.
Figure 10B:
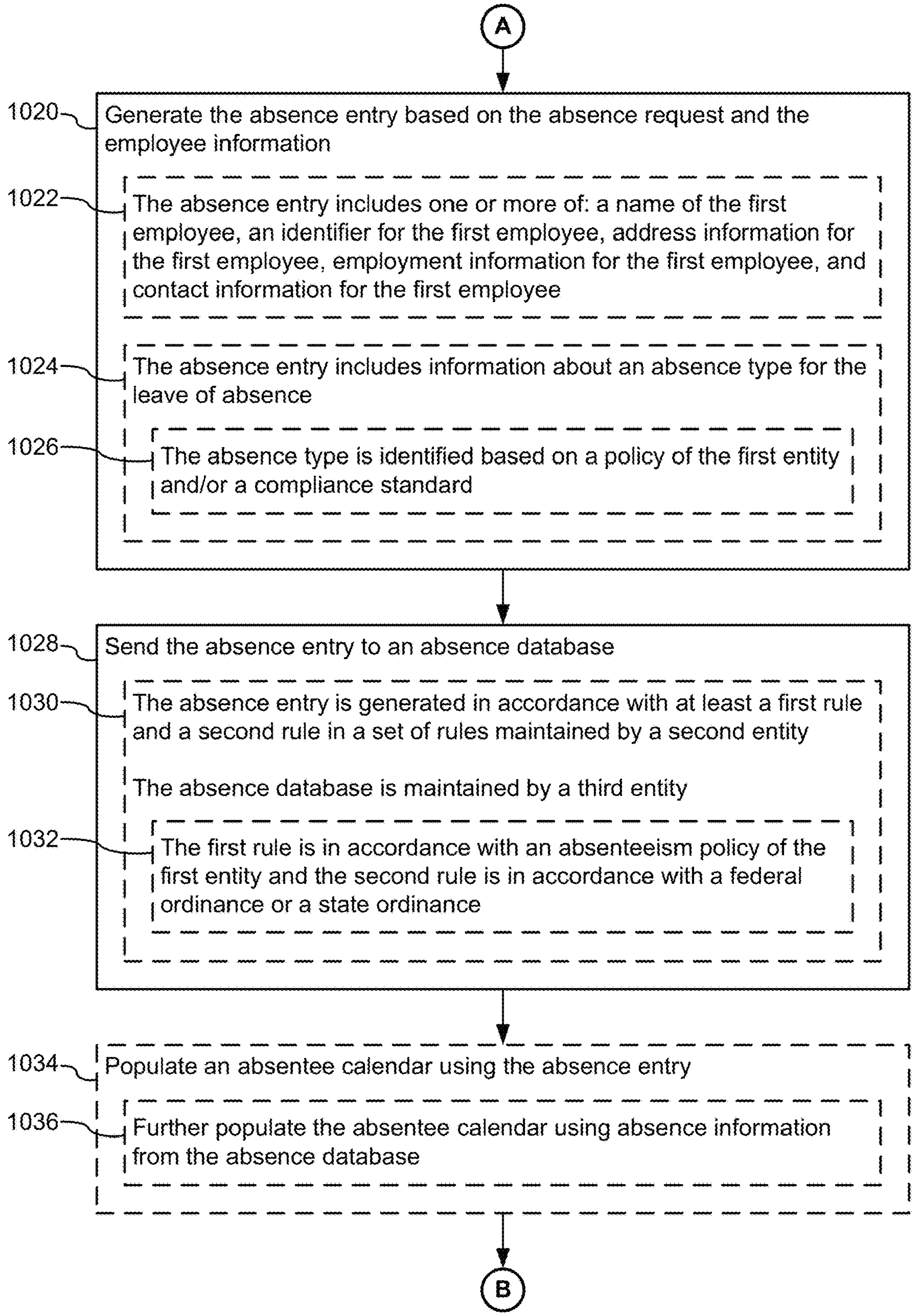
Figure 10C:
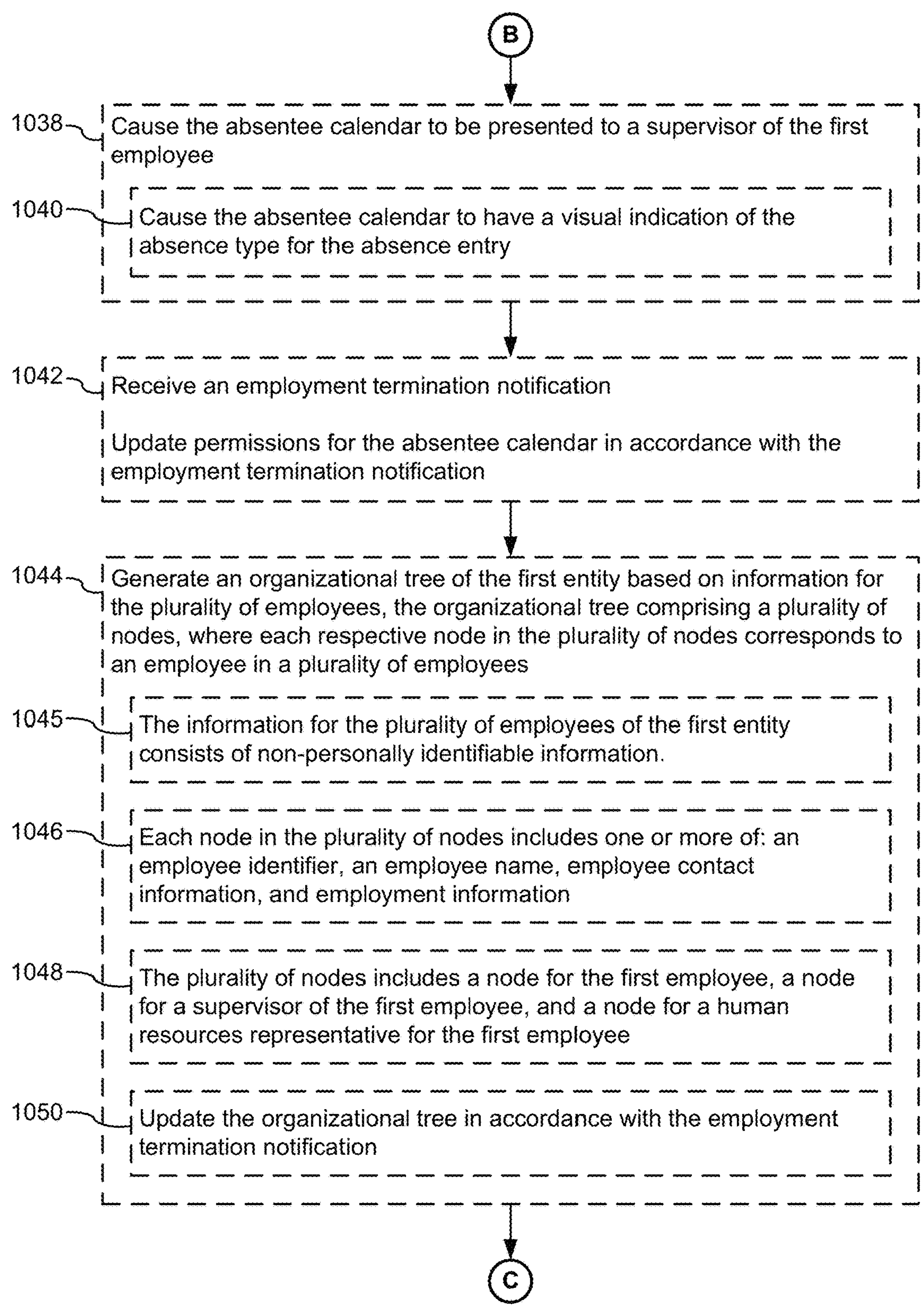
Figure 10D:
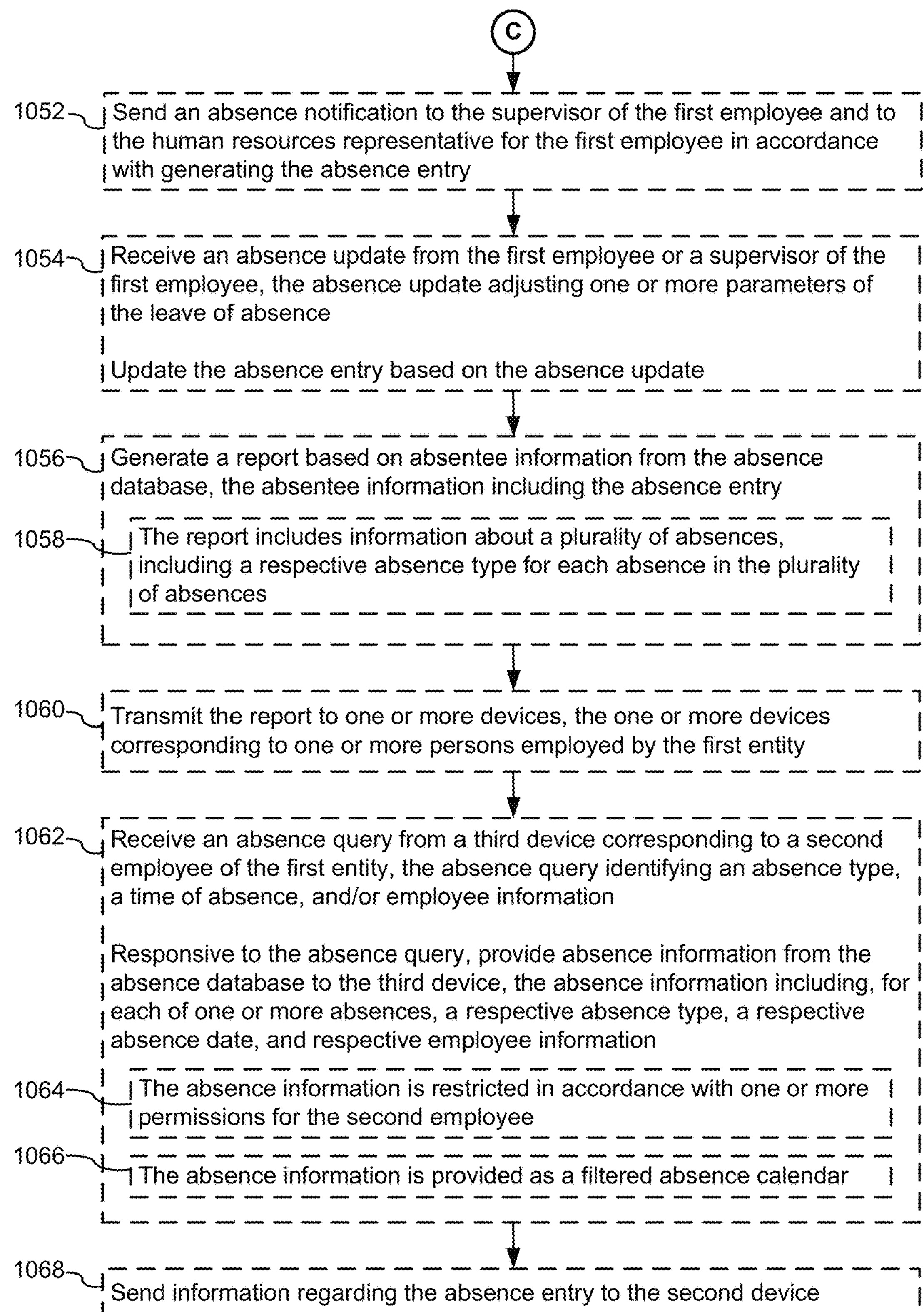

FIGS. 9A-9F illustrate example user interfaces for absentee reports in accordance with some embodiments. FIG. 9A shows a user interface 902 corresponding to a create custom report search 904. The user interface 902 includes an option 906 to create a custom report. FIG. 9B shows a user interface 910 for creating a custom report. The user interface 910 includes various fields and options for generating a custom report, including a report name field 912, a report type 914, and a data source 916. In some embodiments, the user generating the custom report is able to select various parameters for the report (e.g., temporary or permanent) as well as data sources for the report. FIG. 9C shows a user interface 920 for editing a custom report, including options to edit the report name, tags, and data sources. The user interface 920 includes a columns tab 922 for editing the report columns as shown in FIG. 9C. FIG. 9D shows a user interface 930 for editing a custom report that includes a prompts tab 932. The user interface 930 includes options for editing prompt instructions, prompt dates, fields and defaults. FIG. 9E shows a user interface 940 for editing a custom report that includes a share tab 942. The share tab 942 includes a plurality of sharing options for sharing the report with other users and/or groups. FIG. 9F shows a reporting user interface 950 for the custom report 952 created and edited as illustrated in FIGS. 9A-9E. The reporting user interface 950 includes a listing of absence entries for various employees (e.g., supervisees of the user running the report).

In FIGS. 6 through 9, one or more of the above-described options, filters, and/or views are selected by a respective supervisor through a menu (e.g., a table) of selections. One skilled in the art will note that the present disclosure is not limited thereto, as there exists other mechanism for selection of the above-described options, filters, and/or views, such as a button mechanism and/or a slider mechanism.

FIGS. 10A-10D are a flow diagram illustrating a method 1000 for absentee management in accordance with some embodiments. The method 1000 is performed at a computing system (e.g., the absentee management system 102 and/or the electronic devices 108) having one or more processors and memory. In some embodiments, the memory stores one or more programs configured for execution by the one or more processors. At least some of the operations shown in FIGS. 10A-10D correspond to instructions stored in a computer memory or a computer-readable storage medium (e.g., the memory 308 of the absentee management system 102 and/or the memory 408 of the electronic device 108). In some embodiments, the computing system is, or includes, a service system (e.g., the service system 500).

The system receives (1002) an absence request (e.g., the absence request 212) from a first device (e.g., the electronic device 108-1-1) corresponding to a first employee of a first entity, the absence request corresponding to a leave of absence for the first employee. In some embodiments, the absence request includes information about the reason for the absence request (e.g., the information shown in FIG. 6).

In some embodiments, the absence request includes (1004) one or more of: a name of the first employee, an identifier for the first employee, a work location for the first employee, and an absence date. In some embodiments, the absence request includes contact information for the first employee. In some embodiments, the absence request includes an identifier for an employer of the first employee. For example, the system pulls the relevant data for the first employee if they are filing a retro claim (e.g., the first employee is already absent from work, and is applying for that absence retrospectively). In this example, information such as entitlements (e.g., leave balances, salary, job title are pulled from the employee record from the system of record (e.g., the second device) in place on the first day of the absence. In some embodiments, e.g., to facilitate effective communication, the current supervisor and HR representative for the employee are used in this data set such that if any organizational changes have occurred between first day of absence and the time of filing, all communications will go to the employee's current supervisor and HR representative.

In some embodiments, the system authenticates (1006) the absence request in response to receiving the absence request, where an absence entry is generated in accordance with authentication of the absence request. In some embodiments, the absence request is authenticated using information from the first employee (e.g., a password and/or passcode). In some embodiments, the absence request is authenticated using information from the first device (e.g., an IP address and/or a MAC address). In some embodiments, the absence request is authenticated when the user begins the request (e.g., the user logs in to begin filling in a request form or interacting with a chatbot). In some embodiments, authentication of the absence request includes determining whether the first employee is a member of a particular security group.

In some embodiments, the absence request identifies the first entity and authenticating the absence request includes authenticating the absence request based on information from a database corresponding to the first entity. In some embodiments, the first entity is identified for the absence request based on information about the first employee included in the absence request (e.g., name, address, date of birth, and/or social security number (SSN) information). For example, the information about the first employee is used to search a services platform and/or one or more tenancies (e.g., in parallel) to determine that the first employee is an employee of the first entity.

In some embodiments, prior to receiving the absence request, the system receives a request to create an account for the first employee. In some embodiments, the request to create the account includes information about the first employee (e.g., name, address, date of birth, and/or social security number information). In some embodiments, the system identifies the first entity as the employer for the first employee based on the information about the first employee.

In some embodiments, the system queries two or more tenancies (e.g., each tenancy corresponding to a separate entity) in parallel to determine which entity is the employer for the first employee. For example, when a user is trying to create an account, the system asks for pieces of information (e.g., last name, home zip code, data of birth, and/or last 4 digits of SSN). In this example, the system first checks a services platform database (e.g., the data store 514). If the system does not find a match, it may then query multiple tenants in parallel (e.g., asynchronously and concurrently). If a match is found in one of the tenants, the system associates the user with the corresponding entity and allows the user to continue to create an account. In this way, the system is able to identify the correct employer for the user without having to contact each employer.

The system sends (1008) an employee query to a second device (e.g., the database(s) 104) in response to receiving the absence request. In some embodiments, the system parses the absence request to determine additional information needed to generate a corresponding absence entry. In some embodiments, the system sends the employee query to confirm information in the absence request (e.g., using employee data 204). In some embodiments, the system sends the employee query to the second device on a regular and/or periodic schedule in addition to, or alternatively to, sending the employee query in response to receiving the absence request. In some embodiments, the second device is owned/managed by a different entity than the entity that owns/manages the system. In some embodiments, the second device corresponds to a human capital management (HCM) system.

In some embodiments, the employee query includes (1010) information about the first employee (e.g., a name and/or identifier). In some embodiments, the information about the first employee is obtained from the absence request. In some embodiments, the information about the first employee is obtained during an authentication process for the first employee.

In some embodiments, the system sends (1012) an absence notification to a supervisor of the first employee in accordance with receiving the absence request. In some embodiments, the absence notification is specific to the first employee (e.g., seeks approval from the supervisor for the requested absence). In some embodiments, the absence notification is a listing of absences for supervisees of the supervisor (e.g., the listing 704). In some embodiments, the absence notification is an email or instant message.

In some embodiments, the supervisor of the first employee is identified (1014) based on employee information (e.g., the employee data 204). In some embodiments, the employee information is received from the second device. In some embodiments, the employee information includes reporting relationship information (e.g., from the reporting relationship store 360) for the first employee. In some embodiments, the reporting relationship information identifies the supervisor and/or includes contact information for the supervisor.

The system obtains (1016) the employee information for one or more employees of the first entity from the second device in response to sending the employee query. In some embodiments, the employee information consists of information for the first employee. For example, the employee query includes an identifier for the first employee and the employee information includes information responsive to the employee query (e.g., information for only the first employee). In some embodiments, the employee information includes information for a set of employees (e.g., a set of employees that match the employee query). In some embodiments, the employee information includes information for all, or nearly all (e.g., 80%, 90%, or 95%), of the employees for the first entity. In some embodiments, the employee information includes one or more calculated fields (e.g., available time off and/or year-to-date hours worked). In some embodiments, a first portion of the employee information (e.g., absence category information) is pushed to the system (e.g., hourly, daily, or in accordance with a data change) and a second portion of the employee information (e.g., absence dates) is pulled by the system in response to receiving the absence request. In some embodiments, each field in the employee information has a corresponding data type (e.g., numerical, alpha, date, or Boolean). In some embodiments, the employee information includes personally identifiable information (PII) for the first employee. For example, the PII is obtained and retained by the system only as required to generate the absence entry. Only obtaining PII in response to the employee query (as opposed to periodically) improves security and privacy of the system as it decreases the chances of the PII being exposed to malicious actors and other third parties. In some embodiments, at least two fields of employee information are required to access the PII data (e.g., the employee query is required to have at least two fields of employee information, such as last name and last four digit of the social security number).

In some embodiments, the system uses one or more outbound application programming interfaces (APIs) that can be configured for clients to transmit leave status interface (LSI) events to a corresponding tenant. An LSI may include continuous leave information sent to an entity's human capital management (HCM) system (e.g., Workday HCM) to put an employee out on leave and to return the employee from leave. For example, the system can send a number of different leave events to the APIs for an entity. In some embodiments, one or more of the APIs use a secure access protocol (e.g., OAuth 2.0). As another example, a background process may run (e.g., each day) that reads a transaction log of leave events for the entity and processes these events by sending specific simple object access protocol (SOAP) messages to the API to perform transitions on leave of absence and return to work information in an employee database. In some embodiments, authentication and/or authorization mechanisms are used as part of a security layer of the outbound API. For example, a tenant API may support X.509 authentication. In this case, the outbound API acts as the client and is required to present a valid SSL certificate for the X.509 mutual authentication process when communicating with the tenant. In some embodiments, once the X.509 certificate setup process is completed, the client issues a username token to be sent in the SOAP message security header. In some embodiments, a username token is added to the properties file that is read by the background process when constructing SOAP messages to send to the tenant. In some embodiments, each SOAP message includes an XML digital signature to verify its authenticity.

In some embodiments, an LSI API process signs a message containing the leave event data to be sent to the tenant with the private key of the same client SSL certificate that is used for the X.509 authentication process. For example, when the tenant API receives a SOAP message from the outbound API, it validates the XML digital signature of the message. If the signature is valid, the message is processed, otherwise an error code is returned. In some embodiments, a request-leave-of-absence API is used for creating a new leave event (e.g., in a particular tenant). For example, a SOAP payload is generated by the LSI API process. In some embodiments, a correct-leave-of-absence API is called to update the data for a leave of absence request. In some embodiments, a return-from-leave API is used for a leave event that contains data about when the employee will return from a leave of absence. In some embodiments, a correct-return-from-leave API is called to update the return from leave information for a particular leave. In some embodiments, a rescind-return-from-leave API is used to cancel an absence request and/or a return from leave event.

In some embodiments, the system identifies (1018) the first employee using the employee information and information from the absence request, where an absence entry is generated using information about the first employee from the employee information. In some embodiments, the absence entry does not include sufficient information to uniquely identify the first employee. In some embodiments, the information in the absence entry is verified using the employee information. In some embodiments, the information in the absence entry is supplemented using the employee information. In some embodiments, absence type(s) are identified for the requested leave of absence based on the information from the absence request and the employee information. In some embodiments, the first employee is identified based on a client device identifier, an employee identifier, a work location, and/or a date for the absence request. For example, the system communicates with a tenant in real time to download employee information for the user and allows the user to continue to file an intake based on eligibility information.

The system generates (1020) the absence entry based on the absence request and the employee information. In some embodiments, the absence entry includes one or more of identifying information for the first employee, identifying information for a supervisor of the first employee, location information for the first employee, and an absence type for the leave of absence. For example, the absence entry includes at least a subset of the information shown in FIGS. 7C and 9F. In some embodiments, the absence entry includes information about an absence type, a starting date, a return date, and a supervisor. In some embodiments, the absence entry corresponds to a reduced work schedule and/or a continuous leave.

In some embodiments, an absence claim is generated based on the absence request and the employee information. In some embodiments, the absence claim is transmitted to a third-party system (e.g., a claims examiner). For example, the absence claim is transmitted to an authority providing the associated benefits for approval and distribution of the associated benefits. For example, if the absence request corresponds to a disability leave benefit, an absence claim may be generated and transmitted to the authority for distributing disability leave benefits.

In some embodiments, receipt of the absence claim is received from the third-party system and, optionally, transmitted to the first entity (e.g., the second device). In this way, the first entity obtains claim information (e.g., is aware of the pending claim) without requiring manual delivery by the first employee. In some embodiments, benefit distribution information is received from the third-party system (from the benefit authority). For example, the benefit distribution information includes a payment amount, a payment schedule, a total benefit amount, a recipient name (or other identifier), and/or a recipient address. For example, information regarding a benefit payment from the third-party to the first employee is received from the third-party system.

In some embodiments, at least a portion of the benefit distribution information is (automatically) transmitted to the first entity (e.g., transmitted to the second device). For example, a distribution amount, a distribution date, a recipient name, and/or a recipient address may be transmitted to the first entity for storage (e.g., updating an employee database and/or a payroll database). In some embodiments, the at least a portion of the benefit distribution information is transmitted to an HR representative for the first employee. In this way, the first employee may direct questions regarding the benefit distribution to the first entity instead of, or in addition to, the third entity. The first employee does not need to manually provide the benefit distribution information to the first entity in order to be able to discuss specifics with the first entity. In some embodiments, the at least a portion of the benefit distribution information is used to manage benefit-related distributions and/or deductions by the first entity. In some embodiments, the at least a portion of the benefit distribution information is used to generate payroll, wage, and/or tax forms (e.g., a W-2 form).

In some embodiments, at least a portion of the benefit distribution information is transmitted to the first entity via an API (e.g., a payroll API). In some embodiments, the system provides a combination of payroll schedules for hourly verses salaried. For example, on any payroll schedule, e.g., weekly, bi-weekly, monthly and/or according to the entity payroll cut off schedule. For example, this better ensures employees get paid on time and via their standard methodology (e.g., direct deposit). The system can also provide human readable reports so that accounting processes, checks, and balances can be maintained against the data that is being automatically loaded into the payroll module. The format of the data can be configured to any nuance of how an entity may have constructed their data set.

In some embodiments, the system provides billing information to the first entity. In some embodiments, the billing information includes one or more of: a policy number, a coverage type, a class type, an age bracket, a billing rate, and a premium due. In some embodiments, the billing information is provided via a table or worksheet (e.g., as illustrated in FIG. 12). In some embodiments, the system obtains employee demographic and coverage information from the first entity. In some embodiments, the system consolidates and/or aggregates carrier billing based on the employee demographic and coverage information. In some embodiments, the system identifies and calculates billing offsets and/or adjustments. For example, the system identifies differences in 'In Force' numbers from the prior period and a corresponding net adjustment and/or adjustment in force. In some embodiments, the system provides one or more billing statements (e.g., monthly premium invoice statements). In some embodiments, the billing statement includes supporting data and calculations used to generate the billing statement. In some embodiments, the system provides self-administered billing.

In some embodiments, the system manages employee data (e.g., for use with managing and/or tracking absences, terminations, evidence of insurability, and/or benefits) using one or more worker objects. In some embodiments, the system generates a worker object corresponding to an employee (e.g., the first employee). In some embodiments, the system generates a respective worker object for each employee of the first entity. In some embodiments, the system generates a manager object for one or more managers (supervisors) at the first entity. In some embodiments, the worker object includes a plurality of fields with information about the employee (e.g., location, tax ID, address, name, date of birth, contact information, hire date, title, pay rate, termination date, benefits, and/or other employee information). In some embodiments, the system accesses the worker object as its primary object and returns one row per worker. In some embodiments, a worker object is generated for all active and, optionally, terminated workers. For example, for active workers, all fields are as of the current date or effective date, if specified. As another example, for terminated workers, all fields are as of the last day of work. In some embodiments, the data source can be used to build reports for active and terminated workers.

In some embodiments, the system manages absence events using action event objects. In some embodiments, an action event object is generated for the absence entry. In some embodiments, an action event object is generated for a time off request/entry. In some embodiments, an action event object is generated for a termination event. In some embodiments, the action event object includes one or more of: an event ID, a corresponding worker object, an employee ID, event location, leave type, leave dates, a manager ID, and/or other absence information.

In some embodiments, the absence entry includes (1022) one or more of: a name of the first employee, an identifier for the first employee, address information for the first employee, employment information for the first employee (e.g., work location, work function, and/or work history information), and contact information for the first employee.

In some embodiments, the absence entry includes (1024) information about an absence type for the leave of absence (e.g., an absence type as shown in FIG. 7C). For example, the absence types may include bereavement leave, jury leave, medical leave (e.g., short-term disability leave and/or long-term disability leave), military leave, and/or vacation time. In some embodiments, the absence types are based on a location of the first employee (e.g., a state or country of residence and/or a state or country of a primary worksite).

In some embodiments, the absence type is identified (1026) based on a policy of the first entity and/or a compliance standard. For example, the absence type is identified by comparing the absence request information with requirements for various absence types. In some embodiments, the absence request generation process includes assistance (e.g., a guided user experience) for identifying the appropriate absence type. In some embodiments, the absence type is identified based on the employee information (e.g., by comparing employee information for the first employee with requirements for each absence type). In some embodiments, the absence entry includes an absence type and/or absence code.

The system sends (1028) the absence entry to an absence database (e.g., for storage as part of the absence data 206). For example, the system sends the absence entry to a database managed by a separate entity. In some embodiments, the absence database is managed by a same entity as the employee information (e.g., the employee data 204). In some embodiments, the system provides an API for the absence database (e.g., the services platform component 103 includes an API for the database(s) shown in FIG. 2).

In some embodiments, the absence entry is generated (1030) in accordance with at least a first rule and a second rule in a set of rules maintained by a second entity, and the absence database is maintained by a third entity. In some embodiments, the first and second rules correspond to particular absence types (e.g., requires for obtaining a leave of absence for a particular absence type). In some embodiments, a first subset of the absence types include rule(s) generated in accordance with a government ordinance and a second subset of absence types include rule(s) generated in accordance with a company policy.

In some embodiments, the first rule is (1032) in accordance with an absenteeism policy of the first entity (e.g., a policy regarding paid time off) and the second rule is in accordance with a federal ordinance or a state ordinance (e.g., an ordinance regarding paid family leave).

In some embodiments, the system populates (1034) an absentee calendar (e.g., the absentee calendar 210) using the absence entry. In some embodiments, the absentee calendar is populated in response to a request from a user (e.g., a supervisor of the first employee). In some embodiments, the absentee calendar is populated in accordance with generation of the absence entry (e.g., generated in real time). In some embodiments, the absentee calendar is populated on a regular/periodic basis (e.g., hourly, daily, or weekly).

In some embodiments, the system further populates (1036) the absentee calendar using absence information from the absence database. For example, the absentee calendar is populated using the absence data 206. In some embodiments, the absentee calendar is populated in accordance with an organizational tree (e.g., generated form the employee data 204). In some embodiments, a different absentee calendar is populated for each supervisor of a set of supervisors at the first entity. In some embodiments, the absentee calendar corresponds to one or more user interfaces, such as the user interfaces shown in FIGS. 8A and 8B.

In some embodiments, the system causes (1038) the absentee calendar to be presented to a supervisor of the first employee. For example, the system causes display of a user interface (e.g., the user interface 800 or 810) for the supervisor. In some embodiments, the absentee calendar is presented to the supervisor in response to a request from the supervisor. In some embodiments, the absentee calendar is presented to the supervisor in response to the supervisor activating a button or link (e.g., the button 760).

In some embodiments, the system causes (1040) the absentee calendar to have a visual indication of the absence type for the absence entry. For example, each absence type corresponds to a respective color on the absentee calendar. In some embodiments, the absentee calendar includes a visual indication of absent types for each day, week, and/or month (e.g., the graphic 804).

In some embodiments, the system receives (1042) an employment termination notification, and updates permissions for the absentee calendar in accordance with the employment termination notification. For example, the system receives an employment termination notification regarding the supervisor leaving the first entity and, in response, removes access permissions for the supervisor to view/interact with the absentee calendar. In some embodiments, the system updates an organizational tree in response to the termination notification. In some embodiments, the system updates absence information in accordance with the termination notification (e.g., removes absence entries for the terminated employee and/or identifies new person(s) at the first entity to approve/deny pending approval requests). In some embodiments, the employment termination notification includes an employee identifier and an employee termination date. In some embodiments, the employee termination date is determined based on the employment termination notification.

In some embodiments, the system generates (1044) an organizational tree of the first entity based on the information for the plurality of employees, the organizational tree comprising a plurality of nodes, where each respective node in the plurality of nodes corresponds to an employee in a plurality of employees. In some embodiments, the system verifies the organizational tree in accordance with receiving the absence request and/or generating the absence entry. In some embodiments, the system updates/verifies the organizational tree in accordance with generating the absence entry (e.g., to identify the correct supervisor for the first employee).

In some embodiments, the information for the plurality of employees of the first entity consists of (1045) non-personally identifiable information (e.g., hierarchy data for the first entity). For example, the system obtains non-PII data on the plurality of employees (e.g., on a periodic basis) to generate the organizational tree. For example, the system obtains the non-PII data on a daily, weekly, or monthly basis. As a further example, the system only obtains PII data for a particular employee (e.g., the first employee) in response to a corresponding absence request. In this way, unnecessary PPI is not retained by the system. Only obtaining PII data in response to a particular request improves security of the employee data and protects the privacy of the employees. In some embodiments, PII data is masked in the information for the plurality of employees of the first entity.

In some embodiments, the system protects the employees' PII and/or protected health information (PHI) by dynamically accessing this information when it is needed for a business purpose. For example, a real time event-based trigger launches within the services platform that subsequently couples to the entity (e.g., employee database) to securely access the required information. This has the additional benefit of ensuring that the latest employee information is utilized for the absence entry (as well as payments, job protection, and/or benefits eligibility).

In some embodiments, each node in the plurality of nodes includes (1046) one or more of: an employee identifier, an employee name, employee contact information, and employment information (e.g., hire date, employment type, and/or available benefits). In some embodiments, the employment information includes information about a department, supervisor, workgroup and/or work location for the employee. In some embodiments, each node includes a portion of the employee information corresponding to the respective employee represented by the node.

In some embodiments, the plurality of nodes includes (1048) a node for the first employee, a node for a supervisor of the first employee, and a node for a human resources representative for the first employee. In some embodiments, the respective nodes for the supervisor, the first employee and the HR representative are linked to indicate the work (reporting) relationships.

In some embodiments, the system updates (1050) the organizational tree in accordance with the employment termination notification. For example, the system removes a node corresponding to the terminated employee (as well as any associated links). In some embodiments, the system generates one or more new links in accordance with the termination notification (e.g., based on a new reporting relationship as a result of a previous supervisor leaving the organization).

In some embodiments, the system sends (1052) an absence notification to the supervisor of the first employee and to the human resources representative for the first employee in accordance with generating the absence entry. In some embodiments, the absence notification is sent automatically (e.g., without receiving a request from the supervisor or the HR representative). In some embodiments, the supervisor and HR representative receive a same notification. In some embodiments, the supervisor and the HR representative receive different notifications (e.g., with individualized information).

In some embodiments, the system receives (1054) an absence update from the first employee or a supervisor of the first employee, the absence update adjusting one or more parameters of the leave of absence, and updates the absence entry based on the absence update. In some embodiments, the absence update includes approval of the leave of absence (e.g., as illustrated by the status change 720 in FIG. 7A). In some embodiments, the absence update includes adjustments to a time or date of the absence, a type of absence, and/or a reason for the absence. In some embodiments, the absence update results in a different absence type being assigned (by the system) to the absence entry. For example, the update causes the absence to meet the requirements of a particular absence type and/or cease the meet the requirements of another absence type.

In some embodiments, the absence update is a transition from one leave type to another (e.g., from a pregnancy leave to a newborn leave). In some embodiments, the system uses different leave ID numbers for the two types of leave and a same intake ID. In some embodiments, the system closes the first leave and generates a new leave with the new leave type. In some embodiments, an actual last day of leave value is generated via a leave status interface (LSI). For example, the actual last day of leave value is generated on the LSI when the first leave is closed with a reason of "transitioned to another leave." In some embodiments, the LSI captures codes related to the new leave that is opened as part of the claim transition. In some embodiments, the LSI provides a return from leave (RFL) date that is effective the approved through date plus one calendar day. For example, this generates when the first leave is closed with a reason of "Transition to another leave." In some embodiments, the return to work (RTW) date that is provided is a placeholder date which is equal to the last day of leave for the initial leave claim plus one calendar day. In some embodiments, the transition activity does not generate an RFL for the first leave. For example, the first entity receives an initial leave of absence (LOA) record when the first employee goes out on leave, as well as a second LOA record when the second leave is initiated and then finally a RFL record when the employee returns to work after the second leave.

In some embodiments, the system generates (1056) a report (e.g., the absence report 702) based on absentee information (e.g., the absence data 206) from the absence database, the absentee information including the absence entry. In some embodiments, the report is a custom report (e.g., generated via the user interfaces shown in FIGS. 9A-9E). In some embodiments, the report is generated automatically (e.g., without a specific request from a user). In some embodiments, the report is generated in accordance with the generation of the absence entry. In some embodiments, the report is generated on a regular/periodic basis (e.g., daily, weekly, or monthly). In some embodiments, the report is generated in response to a user request (e.g., a view request 220). In some embodiments, the report is a default report (e.g., a quick report). In some embodiments, the report corresponds to a particular time period (e.g., a current month or a 6-month period). In some embodiments, the report corresponds to all current and future absences stored in an absence database and corresponding to a particular set of employees (e.g., supervisees of a particular supervisor).

In some embodiments, the report includes (1058) information about a plurality of absences, including a respective absence type for each absence in the plurality of absences.

For example, the report includes absences for multiple supervisees of a particular supervisor. In some embodiments, the report includes information about one or more absences for the first employee and one or more absences for a second employee. In some embodiments, the report includes instructions (e.g., the instructions 750). In some embodiments, the report includes an absence listing (e.g., the listing 704) and/or an absence matrix (e.g., as illustrated in FIG. 7C).

In some embodiments, the system transmits (1060) the report to one or more devices, the one or more devices corresponding to one or more persons employed by the first entity. For example, the system sends the report to direct and indirect supervisors and/or managers for the first employee. In some embodiments, the system transmits a report to each supervisor, manager, and/or HR representative associated with the first employee. In some embodiments, the system transmits a different report to each person (e.g., based on their relationship with the first employee, their other supervisees, and/or respective user preferences). In some embodiments, the system transmits different versions of the report based on which security group(s) the recipient is a member of. For example, a security group for HR representatives permits reports including some PII not permitted to a security group for supervisors. In some embodiments, interactivity of the report (e.g., edit permissions) is based on permissions (e.g., security groups) of the recipient.

In some embodiments, the system receives (1062) an absence query (e.g., a view request 220) from a third device corresponding to a second employee of the first entity, the absence query identifying an absence type, a time of absence, and/or employee information; and, responsive to the absence query, the system provides absence information from the absence database to the third device, the absence information including, for each of one or more absences, a respective absence type, a respective absence date, and respective employee information. In some embodiments, the query is received via a search field in a user interface (e.g., the search field of user interface 800). In some embodiments, the system provides the absence information as an absentee calendar and/or an absentee listing. For example, an employee may enter leave information (e.g., corresponding to personal leave and/or non-statutory leave) into the absence database without submitting an absence request to the system. In this example, the system queries the absence database to obtain the leave information. The system can then report the leave information via an absence report and/or calendar.

In some embodiments, the absence information is restricted (1064) in accordance with one or more permissions for the second employee. For example, the second employee may be a supervisor or HR representative. In some embodiments, the absence information responsive to the absence query is filtered to only include absence information for supervisees of the second employee. In some embodiments, the absence information is restricted to particular absence types, employees, and/or dates/times.

In some embodiments, the absence information is provided (1066) as a filtered absentee calendar. For example, an absentee calendar includes absence information for a plurality of days, weeks, or months (e.g., as illustrated in FIGS. 8A and 8B).

In some embodiments, the system sends (1068) information regarding the absence entry to the second device. For example, after generating the absence entry, the system sends the information regarding the absence entry (e.g., leave of absence dates, absence type, and/or benefit type) to the second device (e.g., for storage in an HR or other employee database of the first entity). In some embodiments, the system translates and/or interprets the absence entry to produce absence information and provides the absence information to the second device (e.g., to update an employee database). In some embodiments, the system provides absence information to the first entity via one or more APIs. In some embodiments, the logic of how each entity wants that data presented and when, is controlled by configuration within that supports a wide range of client configurability.

In some embodiments, the system closes the absence entry in accordance with the first employee exhausting a corresponding entitlement, a leave ending (e.g., a return to work), a leave being denied, and/or a transition to another leave.

Figure 11A:
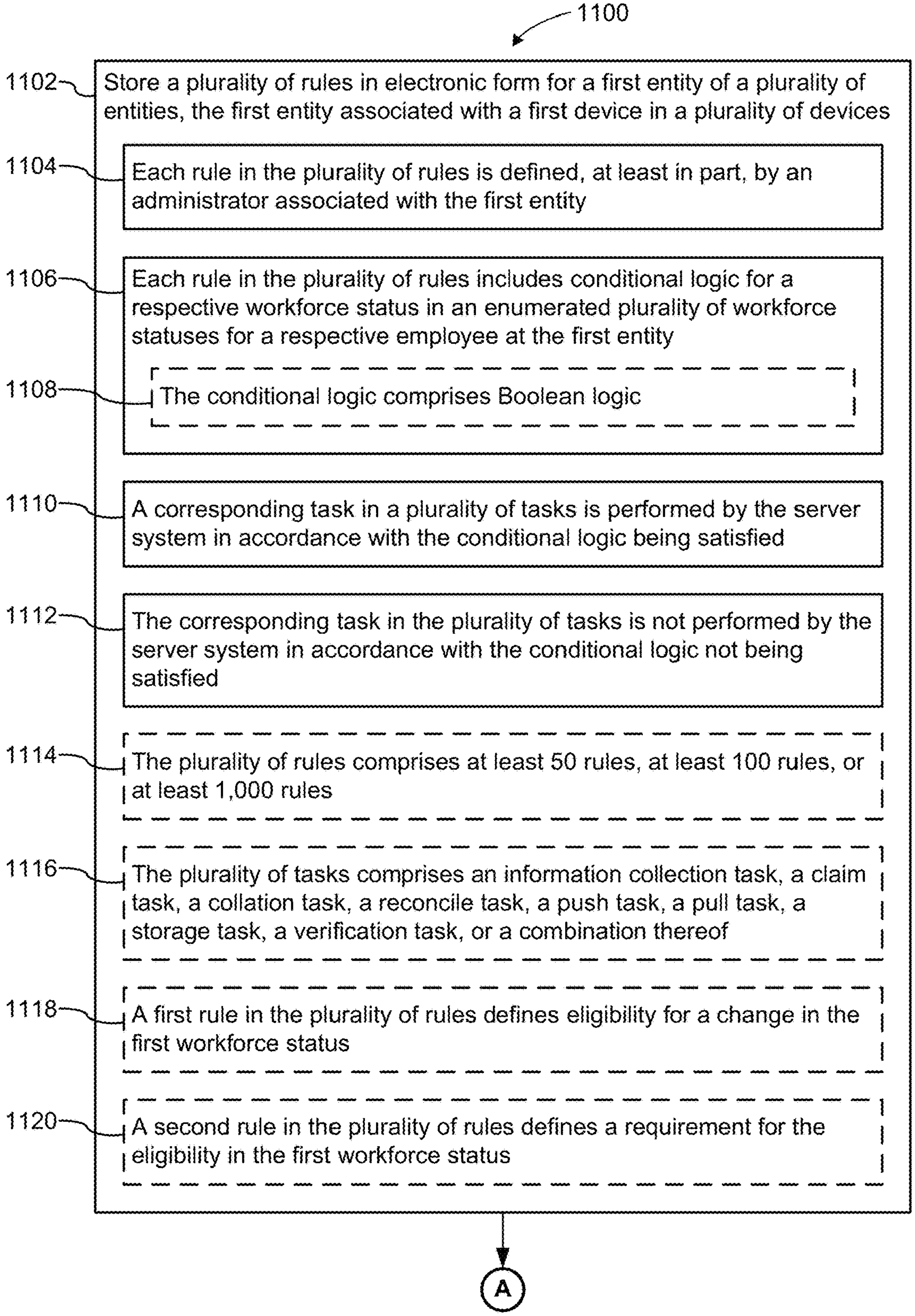

FIGS. 11A-11C are a flow diagram illustrating a method 1100 for absentee management in accordance with some embodiments. The method 1100 is performed at a computing system (e.g., the absentee management system 102 and/or the electronic devices 108) having one or more processors and memory. In some embodiments, the memory stores one or more programs configured for execution by the one or more processors. At least some of the operations shown in FIGS. 11A-11C correspond to instructions stored in a computer memory or a computer-readable storage medium (e.g., the memory 308 of the absentee management system 102 and/or the memory 408 of the electronic device 108). In some embodiments, the computing system is, or includes, a service system (e.g., the service system 500).

The system stores (1102) a plurality of rules in electronic form for a first entity (e.g., a first company or organization) of a plurality of entities, the first entity associated with a first device in a plurality of devices. Each rule in the plurality of rules is defined (1104), at least in part, by an administrator associated with the first entity. For example, an administrator defines absence rules that comply with company policy and/or government ordinances. Each rule in the plurality of rules includes (1106) conditional logic for a respective workforce status in an enumerated plurality of workforce statuses for a respective employee at the first entity. For example, each rule includes conditional logic to determine if a particular employee and/or absence request complies with requirements for a particular policy and/or ordinance. In some embodiments, the conditional logic comprises (1108) Boolean logic.

A corresponding task in a plurality of tasks is performed (1110) by the system in accordance with the conditional logic being satisfied. For example, the system assigns an absence type, generates an absence entry, and/or approves an absence request in accordance with the conditional logic being satisfied. The corresponding task in the plurality of tasks is not performed (1112) by the system in accordance with the conditional logic not being satisfied. For example, an absence entry is not generated if the conditional logic is not satisfied (e.g., if the absence request does not comply with a company policy or government ordinance).

In some embodiments, the plurality of rules comprises (1114) at least 50 rules, at least 100 rules, or at least 1,000 rules. In some embodiments, the number of rules depends on a number of applicable policies and/or ordinances. In some embodiments, the number of rules depends on a number of requirements for a company policy and/or government ordinance.

In some embodiments, the plurality of tasks comprises (1116) an information collection task, a claim task, a collation task, a reconcile task, a push task, a pull task, a storage task, a verification task, or a combination thereof. For example, a task includes pushing absence information to an absence database and/or pulling employee information from an employee database. As another example, a task includes verifying a user, storing an absence entry, and/or editing an absence entry.

In some embodiments, a first rule in the plurality of rules defines (1118) eligibility for a change in the first workforce status. In some embodiments, a second rule in the plurality of rules defines (1120) a requirement for the eligibility in the first workforce status. For example, a rule defines eligibility for an employee transitioning to, or extending, short-term disability leave. As another example, a rule defines eligibility for an employee transitioning to, or adjusting timing of, a paid family leave.

The system receives (1122) a request for information (e.g., a view request 220) for a first workforce status in the enumerated plurality of workforce statuses from a second device in the plurality of devices, the second device associated with a first employee of the first entity, the first workforce status associated with a second employee at the first entity. In some embodiments, the request for information is a request for information about a particular absence type and/or employees requesting the particular absence type. For example, the second employee is a supervisor requesting information about supervisees that are currently on leave from the company. In some embodiments, the request for information is received from a second entity (e.g., a regulating or supervising entity). In some embodiments, the request for information comprises a query. In some embodiments, the query is received via a user interface search element.

In some embodiments, the enumerated plurality of workforce statuses comprises (1124) one or more of: one or more administrative statuses, one or more benefit statuses, one or more stock purchase plan statuses, one or more digital security statuses, one or more physical security statuses, one or more facility statuses, one or more performance review statuses, one or more absentee statuses, one or more payroll statuses, and one or more invoice statuses.

In some embodiments, the first workforce status is (1126) a performance status, a maternity leave status, a short-term disability status, a longer-term disability status, a sick leave status, a fostering or adopting status, an employer program status, a surrogacy status, a parental status, a pre-natal leave status, a newborn baby bonding leave status, a caregiver leave status, a military service leave status, a paid time off (PTO) leave status, a vacation status, or a combination thereof; and the eligibility of the first workforce status is at least a total number of days entitled to be absent from work within a period of time.

In some embodiments, the first entity is (1128) a federal government entity, a state government entity, a county government entity, a municipal government entity, or an insurance entity. In some embodiments, the first entity is a company or other type of organization (e.g., having an employer absence policy).

In some embodiments, the request for information comprises (1130) personal identifiable information for the first employee. In some embodiments, the request for information includes an employee name and/or identifier. In some embodiments, the request for information includes a range of names and/or identifiers.

In some embodiments, the request for information is received (1132) from a federal government entity, a state government entity, a county government entity, a municipal government entity, or the first entity.

In some embodiments, receiving the request for information includes (1134) authenticating the request for information in accordance with a login operation protocol. For example, the request for information is authenticated prior to the system requesting workforce status information or generating a response to the request. In some embodiments, the request is authenticated using a password or passcode associated with the second employee. In some embodiments, the authentication includes determining permissions for the second employee. In some embodiments, the authentication includes determining whether the second employee has permission to view the information responsive to the request.

The system receives (1136) a workforce status feed from a third device in the plurality of devices in response to the request for information, the third device associated with a second entity distinct from the first entity, the workforce status feed comprising a plurality of data elements associated with at least a subset of workforce statuses in the enumerated plurality of workforce statuses. In some embodiments, the system pulls workforce status information from the third device in response to the request for information. In some embodiments, the system analyzes/filters the workforce status feed from the third device in response to the request for information.

In some embodiments, the workforce status feed comprises (1138) a plurality of employee records (e.g., the employee data 204), each respective employee record in the plurality of employee records corresponding to an employee in a plurality of employees for the first entity, where each respective record in the plurality of employee records includes (i) a name of the corresponding employee and (ii) a name of a least one other employee in the plurality of employees to which the corresponding employee shares a reporting relationship.

The system generates (1140) a report (e.g., the absence report 702) comprising a notification of the first workforce status in response to receiving the workforce status feed, where the report is configured for displaying at a display of a respective device in the plurality of devices. In some embodiments, the report includes a subset of data from the workforce status feed determined to be responsive to the request for information. In some embodiments, the report is a custom report (e.g., as described above with respect to FIGS. 9A-9F). In some embodiments, the report includes evidence of insurance (EOI) information for a set of employees. In some embodiments, the report includes insurance information, including plan class, benefit plan, and/or coverage information.

In some embodiments, the report comprises (1142) a calendarization of the period of time. In some embodiments, the report includes a snapshot of an absence calendar. In some embodiments, the report includes a link to an absence calendar. In some embodiments, the report includes one or more user interfaces with calendar information (e.g., the user interface 800).

In some embodiments, the report comprises (1144) a name of the second employee, an address associated with the second employee, a date of birth of the second employee, a group number associated with the second employee, a plan classification associated with the second employee, a policy, an event type, an event date, a respective workforce status, an approval status, a document associated with the second employee, an application identifier associated with the second employee, a period of time associated with the second employee, an application date associated with the second employee, a queue number, a last update date, or a combination thereof. In some embodiments, the report includes information about a set of employees. In some embodiments, the report includes information about only the second employee.

In some embodiments, the system generates (1148) an organizational tree of the first entity based on the workforce status feed, the organizational tree comprising a plurality of nodes, where each respective node in the plurality of nodes corresponds to an employee in the plurality of employees. In some embodiments, the organizational tree is the same as, or has the same features and properties as, described previously with respect to FIG. 10C.

It should be understood that the particular order in which the operations in FIGS. 10A-10D and 11A-11C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 1000) are also applicable in an analogous manner to method 1100 described above.

Figure 13:
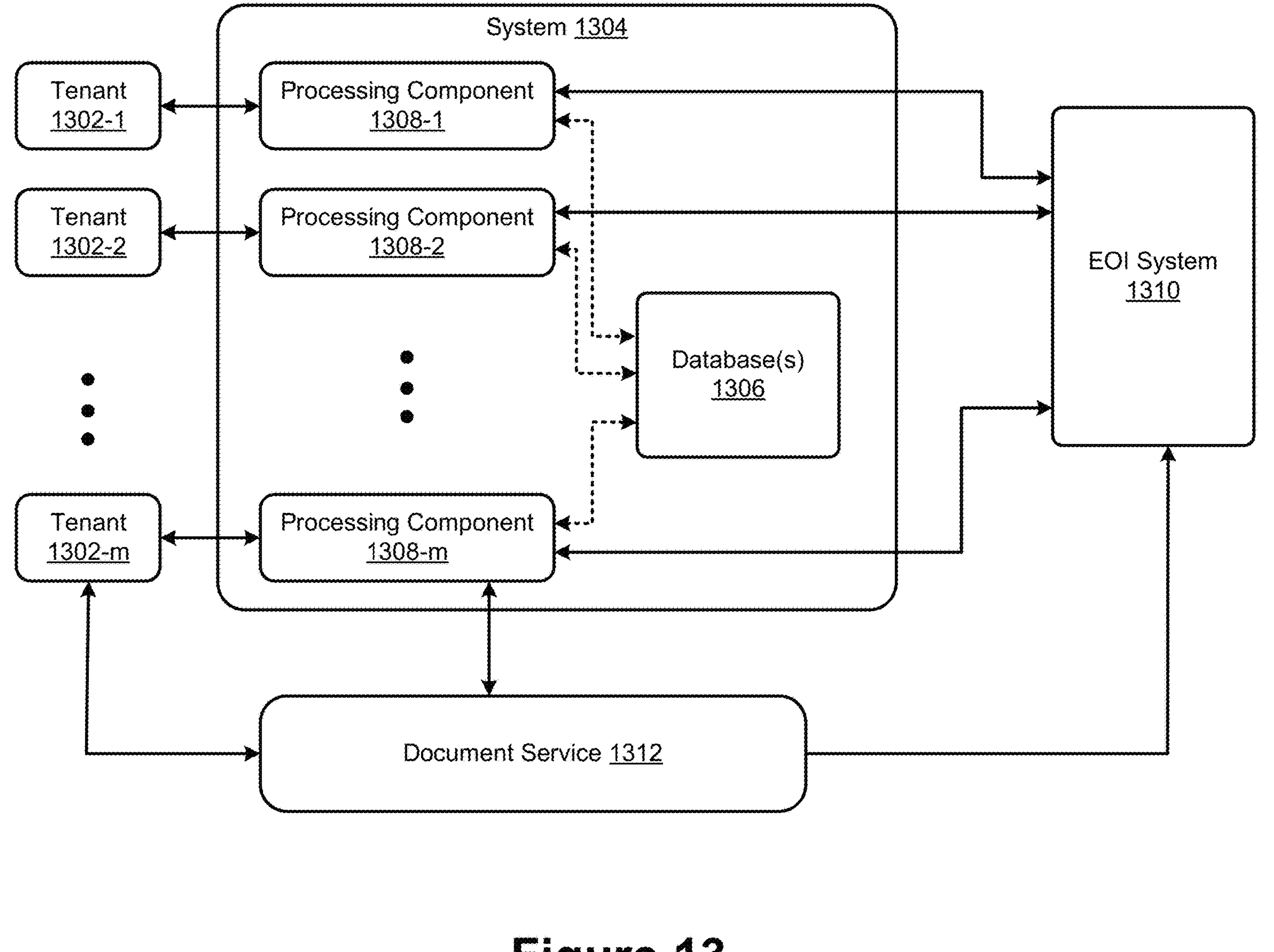
FIG. 13 illustrates an example evidence of insurability (EOI) system in accordance with some embodiments.

FIG. 13 illustrates an evidence of insurability (EOI) system 1304 in accordance with some embodiments. In some embodiments, the EOI system 1304 is a component of the services platform 103. In some embodiments, the EOI system 1304 includes one or more servers and/or other computing devices. For example, the EOI system 1304 may be a cloud computing system (e.g., a distributed computing system). The EOI system 1304 is communicatively coupled to a plurality of tenants 1302 (e.g., tenant 1302-1 through tenant 1302-*m*). In some embodiments, each tenant corresponds to a distinct organization or entity. In some embodiments, each tenant includes an employee database. In some embodiments, the plurality of tenants 1302 communicate with the EOI system 1304 via encrypted communication channels (e.g., using a shared hash or other form of authentication). In some embodiments, the EOI system 1304 receives EOI requests and employee information from the plurality of tenants 1302 and provides insurability information to the plurality of tenants 1302. In some embodiments, the EOI system 1304 and the plurality of tenants 1302 communicate via an application programming interface (API). For example, the EOI system 1304 uses GET commands to obtain EOI requests and PUT commands to provide the tenants with insurability information.

The EOI system 1304 includes a plurality of processing components 1308. In some embodiments, each processing component is communicatively coupled to a respective tenant (e.g., the processing component 1308-1 is coupled to the tenant 1302-1). In some embodiments, two or more processing components are coupled to a single tenant. In some embodiments, two or more tenants are coupled to a single processing component. In some embodiments, each processing component represents a dedicated processing function. In some embodiments, the processing components do not share data with one another (e.g., to prevent data leakage between tenants). The plurality of processing functions 1308 are communicatively coupled to one or more databases 1306. In some embodiments, the database(s) 1306 are remote from the plurality of processing functions 1308. In some embodiments, each processing component is configured to communicate with the EOI system 1310 for the purposes of submitting the EOI applications and extracting status changes. In some embodiments, the processing components communicate with the EOI system 1310 indirectly (e.g., via one or more third-party systems). For example, the EOI applications may be presented to the applicant for signature prior to submission. The signature process may involve a third-party service that is distinct from the EOI system 1304 and the EOI system 1310. As determinations are made on EOI applications received, the results can be passed back to the processing component in real-time (or via periodic batch processing).

The EOI system 1304 is communicatively coupled to (e.g., via one or more networks) to an EOI system 1310 (e.g., including an EOI engine). In accordance with some embodiments, each processing component is communicatively coupled to the EOI system 1304. In some embodiments, the EOI system 1304 communicates with the EOI system 1310 via an API. As an example, the EOI system 1304 submits EOI applications to the EOI system 1310 and receives EOI decisions from the EOI system 1310 (e.g., via detecting changes in EOI status). As another example, the EOI system 1304 provides the EOI applications to a service (e.g., a third-party service) for applicant signature and subsequent submission to the EOI system 1310.

In some embodiments, the tenants 1302, the EOI system 1304, and the EOI system 1310 are communicatively coupled to a document service 1312. In some embodiments, the document service 1312 receives the EOI information (and/or the EOI application) from the processing components 1308 and provides the EOI application to the corresponding tenant for approval (e.g., signature by the corresponding worker). In some embodiments, the document service 1312 generates the EOI applications based on the EOI information received from the processing components 1308. In some embodiments, the document service 1312 provides approved EOI applications to the EOI system 1310 (e.g., via e-mail). In some embodiments, the document service 1312 is provided by a third-party that is distinct from the EOI system 1304 and the EOI system 1310. In some embodiments, the document service 1312 is a component of the EOI system 1304 or the EOI system 1310.

Figure 14C:
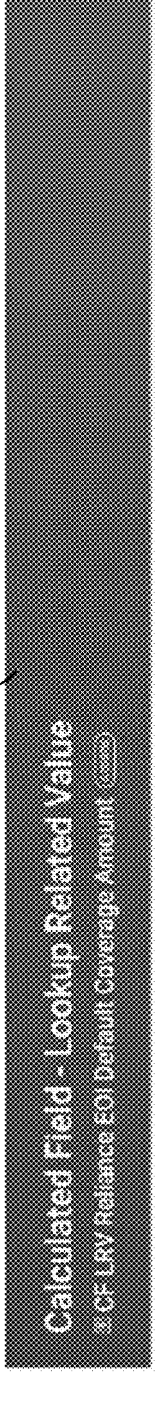
Figure 14D:
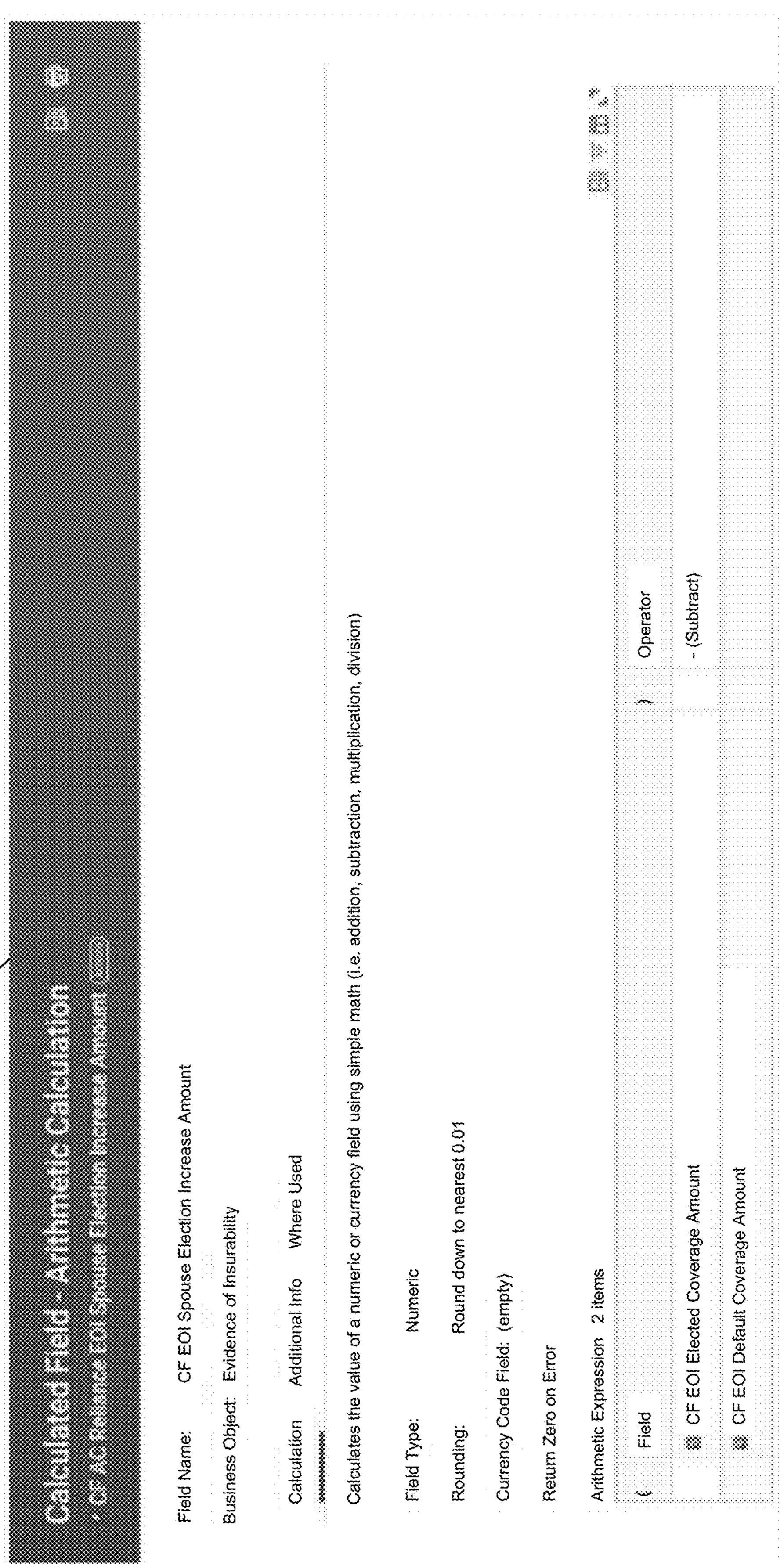

FIGS. 14A-14D illustrate example user interfaces for EOI management in accordance with some embodiments. FIG. 14A shows a custom report user interface 1402 for generating an EOI report. In some embodiments, the EOI report includes information about an employee (or worker), such as name, contact information, date of birth, and spousal information. In some embodiments, the EOI report includes information about a plan or policy, such as a benefit plan, default coverage, elected coverage, a plan class, a policy information, and a group number. In some embodiments, the EOI report includes event information such as an event date and event type. In some embodiments, EOI report includes status information and/or decision information (e.g., indicating approved or denied and/or a decision date). In some embodiments, the EOI report is populated from an EOI database (e.g., a database 1306). In some embodiments, the EOI report is populated via a web service coupled to the EOI database. FIG. 14B shows a filtering user interface 1412 for filtering an EOI report (e.g., an EOI report generated via the custom report user interface 1402). As shown in FIG. 14B, the EOI report can be filtered via operators on any of the fields in the EOI report. FIGS. 14C and 14D show user interfaces for generating calculated fields (e.g., for use in the EOI report). The user interface 1422 in FIG. 14C shows an example calculated field involving a lookup of a related value and the user interface 1432 in FIG. 14D shows an example calculated field involving an arithmetic calculation. In some embodiments, the calculations for the calculated fields include an expression evaluation, a true/false condition, and/or an instance extraction. Examples of calculated fields include pay information, spousal information (e.g., dependency, date of birth, and/or contact information), coverage information, election amounts, and plan identifiers.

Figure 15A:
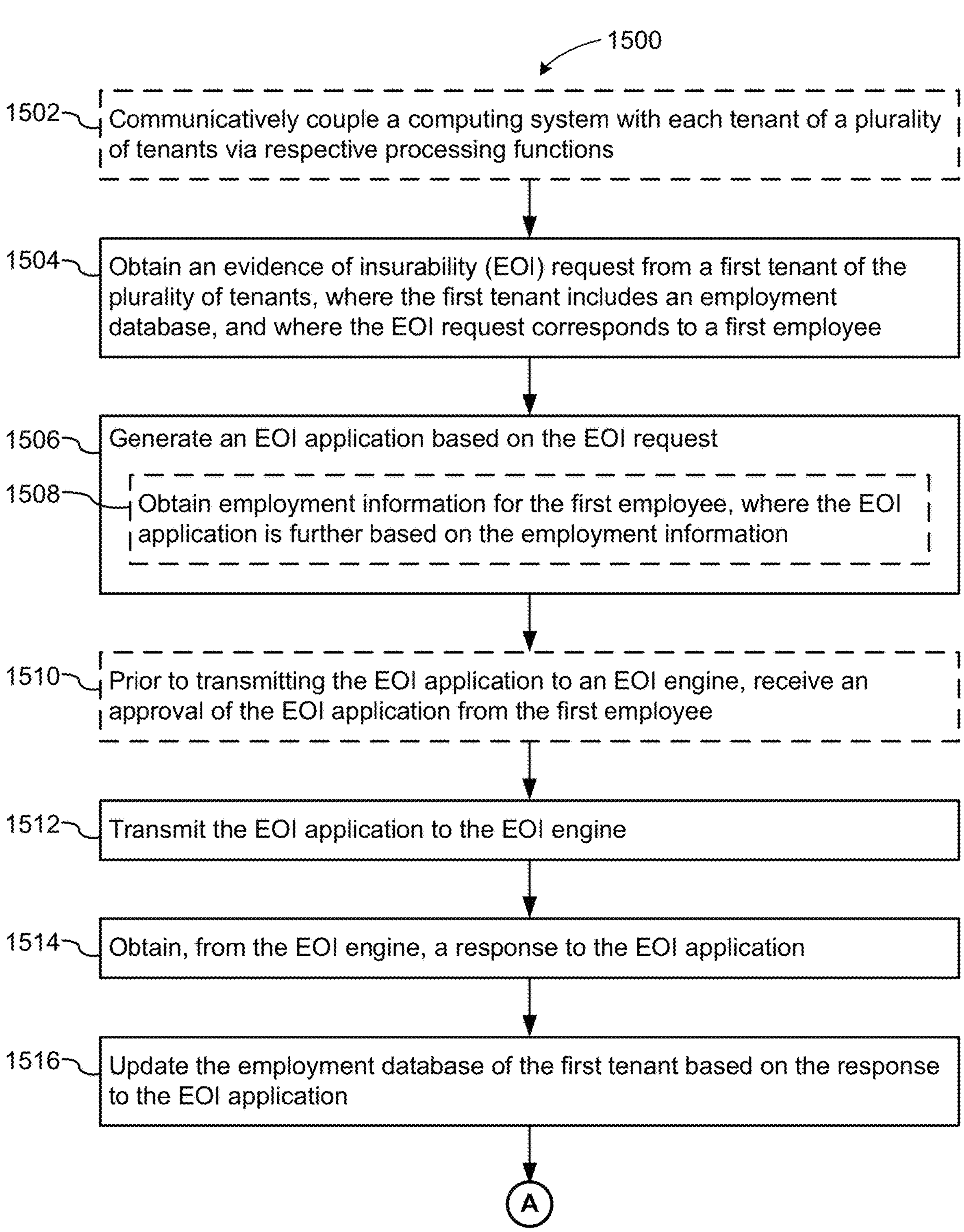
FIGS. 15A-15B are a flow diagram illustrating an example method for insurability management in accordance with some embodiments.
Figure 15B:
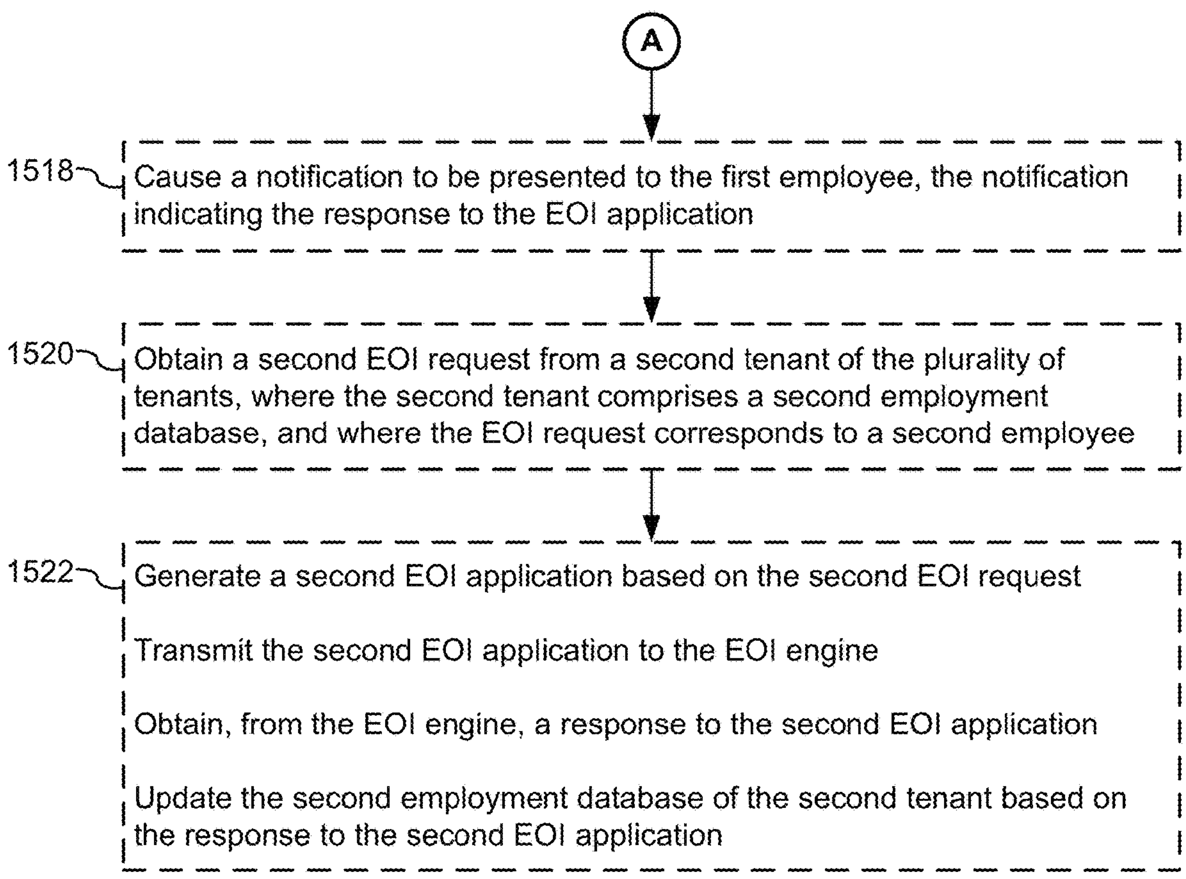

FIGS. 15A-15B are a flow diagram illustrating a method 1500 for insurability management in accordance with some embodiments. The method 1500 is performed at a computing system (e.g., the absentee management system 102 and/or the EOI system 1304) having one or more processors and memory. In some embodiments, the memory stores one or more programs configured for execution by the one or more processors. At least some of the operations shown in FIGS. 15A-15B correspond to instructions stored in a computer memory or a computer-readable storage medium (e.g., the memory 308 of the absentee management system 102 and/or the memory 408 of the electronic device 108). In some embodiments, the computing system is, or includes, a service system (e.g., the service system 500). In some embodiments, the computing system is, or includes, an EOI system (e.g., the EOI system 1304).

In some embodiments, the system is communicatively coupled (1502) to each tenant of a plurality of tenants (e.g., the tenants 1302) via respective processing functions (e.g., the processing components 1308). In some embodiments, the system includes a micro-services architecture (e.g., includes a distinct set of processing functions for each tenant). In some embodiments, each tenant of the plurality of tenants corresponds to a different organization. For example, each tenant corresponds to a different company, government, or other type of organizational entity.

The system obtains (1504) an evidence of insurability (EOI) request from a first tenant (e.g., the tenant 1302-1) of the plurality of tenants, where the first tenant includes an employment database (e.g., the employee data 204), and where the EOI request corresponds to a first employee. In some embodiments, the EOI request is obtained in response to an application programming interface (API) call to the employment database. For example, the EOI request is obtained via a GET command. In some embodiments, the computing system queries the employment database (e.g., on a periodic or regular basis) to determine whether an EOI requests are pending (e.g., via batch processing). In some embodiments, the first tenant notifies the computing system that a new EOI request is pending. In some embodiments, the EOI request is obtained via a report populated using information from the employment database. In some embodiments, obtaining the EOI request includes obtaining an encrypted communication from the first tenant, and the system decrypts the encrypted communication to obtain the EOI request.

The system generates (1506) an EOI application based on the EOI request. For example, the processing component 1308-1 generates an EOI application based on an EOI request from the tenant 1302-1. In some embodiments, the system generates the EOI application in coordination with a signatory service (e.g., a third-party service). In some embodiments, the EOI application is generated by the third-party service and the system is notified (e.g., via a pull or push notification) that the EOI application has been generated. In some embodiments, the EOI application is, or includes, a set of structured data. In some embodiments, generating the EOI application includes converting information from the EOI request to structured data (e.g., reformatting and/or translating the information).

In some embodiments, the system obtains (1508) employment information for the first employee, and the EOI application is further based on the employment information. For example, the system obtains the employment information from an employment database (e.g., the employee data 204). Example employment information includes benefits information for the first employee. In some embodiments, the system transmits the employment information to the third-party service and the third-party service generates the EOI application based on the employment information.

In some embodiments, prior to transmitting the EOI application to an EOI engine (e.g., the EOI system 1310), the system receives (1510) an approval of the EOI application from the first employee. For example, after generating the EOI application, the system transmits the EOI application to the corresponding tenant for review and approval by the first employee. In some embodiments, the approval is received via a third-party system or service (e.g., a signatory authority) that is distinct from the computing system and the first tenant.

The system transmits (1512) the EOI application to the EOI engine. For example, the EOI system 1304 transmits the EOI application to the EOI system 1310 via an API of the EOI system 1310. In some embodiments, a third-party service obtains an approval (e.g., a signature) from the first employee and provides the approved EOI application to the EOI engine (e.g., via an e-mail address). In some embodiments, the computing system communicates with the EOI engine via a web service. In some embodiments, the EOI engine is associated with a medical underwriter.

The system obtains (1514), from the EOI engine, a response to the EOI application. For example, the system dynamically queries medical underwriting data to fetch a worker's EOI status changes in real-time. In some embodiments, the EOI engine transmits the response to the system in accordance with a decision for the EOI application. In some embodiments, the EOI application includes multiple coverage requests, and an independent decision is assigned to each coverage request. In some embodiments, obtaining the response to the EOI application includes: (i) receiving first EOI information from the EOI engine at a first time; (ii) receiving second EOI information from the EOI engine at a second time; (iii) identifying a difference between the first EOI information and the second EOI information; and (iv) determining the response to the EOI application based on the identified difference.

The system updates (1516) the employment database of the first tenant based on the response to the EOI application (e.g., in response to decisions on coverage requests within the EOI application). In some embodiments, the employment database is updated automatically, without further user input, in response to obtaining the response to the EOI application. In some embodiments, the employment database is updated in real time in response to obtaining the response to the EOI application. This real-time synchronization provides the ability to keep both the systems synchronized and removes lag that would typically be experienced when relying upon regularly scheduled file exchanges with a tenant. As an example, the response to the EOI application may include an approval of one or more coverage requests within the EOI application and/or a denial of one or more coverage requests within the EOI application. In some embodiments, the employment database is updated via an API call to the employment database. For example, the employment database is updated via PUT command. In some embodiments, the employment database is updated in response to obtaining the response to the EOI application (e.g., in real time). In some embodiments, the employment database is updated on a periodic/regular interval (e.g., via batch processing). In some embodiments, updating the employment database of the first tenant includes updating one or more coverage records. In some embodiments, updating the employment database of the first tenant includes updating one or more payroll records.

In some embodiments, the EOI application decision is obtained as part of a custom report that is populated using information from the employment database. For example, the custom report is enabled as a web service. In some embodiments, the report includes a set of employee fields (e.g., name, contact information, date of birth, spousal information, and other information about an employee), a set of event fields (e.g., event date, event type), and/or a set of coverage fields (e.g., plan class, plan policy, group number, benefit plan, default coverage, and/or elected coverage). In some embodiments, the report includes a set of calculated fields (e.g., compensation information, dependents information, and/or coverage information). In some embodiments, the report is filtered (e.g., by event date, benefit plan, status, and/or employee).

In some embodiments, the system causes (1518) a notification to be presented to the first employee, the notification indicating the response to the EOI application. In some embodiments, the notification is transmitted to the first tenant. In some embodiments, the notification is transmitted to a client device of the first employee.

In some embodiments, the system obtains (1520) a second EOI request from a second tenant (e.g., the tenant 1302-2) of the plurality of tenants, where the second tenant comprises a second employment database, and where the EOI request corresponds to a second employee.

In some embodiments, the system (1522): (i) generates a second EOI application based on the second EOI request; (ii) transmits the second EOI application to the EOI engine; (iii) obtains, from the EOI engine, a response to the second EOI application; and (iv) updates the second employment database of the second tenant based on the response to the second EOI application. In some embodiments, the system obtains data corresponding to the second EOI application (e.g., from the second EOI request and optionally employment data) and provides the data to a third-party system or service to generate the second EOI application based on the data. In some embodiments, the generated second EOI application is provided by the third-party system/service to the second tenant (e.g., provided to a worker corresponding to the second tenant) for approval. In some embodiments, in response to receiving an approval from the second tenant, the third-party system/service transmits the second EOI application to the EOI engine.

As an example, an employee (or their partner/spouse) submits an EOI request, and the system generates an EOI application based on information from the EOI request and employee information from the employer organization. In this example, the EOI application is sent to the employee for review and approval and the employee signs the EOI application (e.g., via a third-party service) to indicate approval. The EOI application is sent to an EOI system (e.g., managed by a medical underwriter) and upon a decision being made on coverage requests within the EOI application at the EOI system, the decision is communicated to the system. In this example, the system automatically updates an employee database (e.g., a database with coverage and/or payroll records) of the employer organization and notifies the employee of the decision.

Evidence of insurability can be a tedious process that involves many steps to communicate information with a group insurance carrier. Conventional attempts to communicate EOI data to medical underwriting teams can be error-prone and time-consuming. Moreover, the results of the coverage request may need to be incorporated into an employee database to reflect the decision. This step has conventionally required multiple manual entries by an administrator. The systems and methods described herein eliminate steps in the process and can provide more accurate and/or quicker results. Moreover, the systems and methods described herein enable increased scalability for handling EOI requests.

Additionally, the systems described herein may automatically update payroll and coverage records directly in the associated tenant (e.g., using the results obtained through regularly polled EOI determination data). This may be performed through an EOI API by dynamically querying medical underwriting data to fetch any worker's EOI status changes in real-time. As updates are received, the resulting data is communicated back to the tenant. For example, the systems may extract pending EOI events from a tenant using a custom report which is set up and configured prior to deployment. The custom report may be deployed to each tenant (e.g., development, stage and, production) using a deployment process that reduces the need for manual setup. This real-time synchronization provides the ability to keep both systems synchronized and removes the delay that would typically be experienced when relying upon regularly scheduled file exchanges.

The operations described above with reference to FIGS. 10A-10D, 11A-11C, and 15A-15B are, optionally, implemented by components depicted in FIGS. 1-4 and 13. In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Plural instances may be provided for components, operations or structures described herein as a single instance. Finally, boundaries between various components, operations, and data stores are somewhat arbitrary, and particular operations are illustrated in the context of specific illustrative configurations. Other forms of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first entity could be termed a second entity, and, similarly, a second entity could be termed a first entity, without changing the meaning of the description, so long as all occurrences of the "first entity" are renamed consistently and all occurrences of the "second entity" are renamed consistently. The first entity, and the second entity are both entities, but they are not the same entity.

The terminology used herein is for the purpose of describing particular embodiments only and is not intended to be limiting of the claims. As used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of +20%, +10%, +5%, or +1% of a given value. Where particular values are described in the application and claims, unless otherwise stated, the term "about" means within an acceptable error range for the particular value. The term "about" can have the meaning as commonly understood by one of ordinary skill in the art. The term "about" can refer to +10%. The term "about" can refer to +5%.

The foregoing description included example systems, methods, techniques, instruction sequences, and computing machine program products that embody illustrative embodiments. For purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions below are not intended to be exhaustive or to limit the embodiments to the precise forms disclosed. Many modifications and variations are possible in view of the above teachings. The embodiments are chosen and described in order to best explain the principles and their practical applications, to thereby enable others skilled in the art to best utilize the embodiments and various embodiments with various modifications as are suited to the particular use contemplated.

In the interest of clarity, not all of the routine features of the embodiments described herein are shown and described. It will be appreciated that, in the development of any such actual embodiment, numerous embodiment-specific decisions are made in order to achieve the designer's specific goals, such as compliance with use case- and business-related constraints, and that these specific goals will vary from one embodiment to another and from one designer to another. Moreover, it will be appreciated that such a design effort might be complex and time-consuming, but nevertheless be a routine undertaking of engineering for those of ordering skill in the art having the benefit of the present disclosure.

Furthermore, when a reference number is given an "it" denotation, the reference number refers to a generic component, set, or embodiment. For instance, a device termed "device i" refers to the $i^{th}$ device in a plurality of devices (e.g., a device 108-1 in a plurality of devices 108).

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a non-transitory computer readable storage medium. For instance, the computer program product could contain the program modules shown in any combination of FIGS. 1, 3A-3B, and 4. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method performed at a server system, the server system comprising one or more processors and memory storing one or more programs that, when executed by the one or more processors, cause the server system to perform the method, the method comprising, for each respective entity in a plurality of entities comprising at least three entities:

receiving, via one or more communication networks, an absence request from a first device corresponding to a first employee of the respective entity, the absence request comprising (i) an identifier associated with the first employee, and (ii) a first data set authored, at least in part, by the first employee and associated with a leave of absence for the first employee;

responsive to receiving the absence request, evaluating the first data set to identify (i) a classification, in an enumerated plurality of classifications, of the leave of absence, and (ii) one or more supervisors directly or indirectly supervising the first employee;

further evaluating the first data set against a predetermined threshold data set associated with the classification of the leave of absence to identify a second data set collectively satisfying the predetermined threshold data set with the first data set;

generating an employee query configured to, at least in part, obtain the second data set;

transmitting, via the one or more communication networks, the employee query to a second device, the second device configured to store a corresponding data set for each respective employee associated one or more entities in a first subset of the plurality of entities, the plurality of entities comprising the respective entity;

responsive to transmitting the employee query, obtaining, via the one or more communication networks, a third data set comprising (i) some or all of the second data set, and (ii) at least in part, a confirmation of some or all of the first data set from the second device;

generating, without human interference from the first employee or the one or more supervisors, an absence entry based on the absence request and the third data set;

transmitting, via the one or more communication networks, the absence entry to a third device configured to store an absence database comprising one or more absence requests for each respective employee associated a second subset of the plurality of entities comprising the respective entity;

generating, without human interference from the first employee or the one or more supervisors, one or more instructions to display a corresponding notification, for a respective supervisor in the one or more supervisors, of each employee that directly or indirectly reports to the first supervisor having the classification that is in the enumerated plurality of classifications using the absence database; and transmit, in electronic form, to the corresponding remote device for each respective supervisor in the one or more supervisors, the one or more instructions to display a corresponding notification.

2. The method of claim 1, wherein the absence entry comprises information about an absence type for the leave of absence.

3. The method of claim 2, the absence type is identified based on a policy of the respective entity and/or a compliance standard associated with the leave of absence.

4. The method of claim 2, further comprising:

populating an absentee calendar based on the absence entry; and causing the absentee calendar to have a visual indication of the absence type for the absence entry.

5. The method of claim 1, further comprising:

populating an absentee calendar using the absence entry; and causing the absentee calendar to be presented at a fourth device to a supervisor in the one or more supervisors of the first employee.

6. The method of claim 5, further comprising:

receiving an employment termination notification; and updating one or more permissions for the absentee calendar in accordance with the employment termination notification.

7. The method of claim 1, further comprising identifying the first employee using the third data set and the absence request.

8. The method of claim 1, further comprising, responsive to receiving the absence request, authenticating the absence request, wherein the absence entry is generated in accordance with authentication of the absence request.

9. The method of claim 1, wherein the first data set comprises one or more of: a name of the first employee, an identifier for the first employee, a work location for the first employee, and an absence date.

10. The method of claim 1, wherein the first data set comprises one or more of: a name of the first employee, an identifier for the first employee, address information for the first employee, employment information for the first employee, and contact information for the first employee.

11. The method of claim 1, wherein the employee query includes information about the first employee different from the first data set.

12. The method of claim 1, further comprising transmitting, via the one or more communication networks, an absence notification to a fourth device associated with a supervisor of the first employee in accordance with receiving the absence request.

13. The method of claim 1, further comprising:

receiving information for a plurality of employees of the respective entity from the second device; and generating an organizational tree of the respective entity based on the information for the plurality of employees, the organizational tree comprising a plurality of nodes, wherein each respective node in the plurality of nodes corresponds to an employee in the plurality of employees.

14. The method of claim 1, further comprising:

receiving, via the one or more communication networks, an absence update from the second device associated the first employee or a fourth device associated with a supervisor in the one or more supervisors of the first employee, the absence update comprising a request for adjusting one or more parameters of the leave of absence; and updating the absence entry based on the absence update.

15. The method of claim 1, further comprising:

generating a report based on absentee information from the absence database, the absentee information including the absence entry; and transmitting, via the one or more communication networks, the report to a fifth device corresponding to a second employee of the respective entity.

16. The method of claim 1, further comprising:

receiving, via the one or more communication networks, an absence query from a fifth device corresponding to a second employee of the respective entity, the absence query identifying an absence type, a time of absence, and/or employee information; and responsive to the absence query, providing, via the one or more communication networks, absence information from the absence database to the third device, the absence information including, for each of one or more absences, a respective absence type, a respective absence date, and respective employee information.

17. The method of claim 1, wherein:

the absence entry is generated in accordance with at least a first rule and a second rule in a set of rules defined by a first entity different from the respective entity; and the absence database is maintained by a second entity different from the respective entity.

18. The method of claim 1, the transmitting the absence entry further comprises transmitting the absence entry to the second device.

19. The method of claim 1, wherein the first data set comprises personally identifiable information, and wherein the confirmation of some or all of the first data some comprises a confirmation of the personally identifiable information.

20. The method of claim 1, wherein the receiving, the evaluating, the further evaluating, the generating the employee query, the transmitting the employee query, the obtaining the third data set, the generating the absence entry, the transmitting the absence entry, the generating the one or more instructions, and the communicating the one or more instructions is performed in real time.

21. The method of claim 1, wherein the method further comprises, prior to the evaluating the first data set, evaluating the absence request against a security protocol comprising an authentication portion and an access portion different from the authentication portion.

22. The method of claim 1, wherein the confirmation of some or all of the first data set comprises a first confirmation of a first data element, in the first data set, authored by the first employee, a second confirmation of a second data element, different from the first data element in the first data set, authored by the first employee, and a third confirmation of a third data element determined, by the one or more processors, from the first data set.

23. The method of claim 1, wherein the third data set comprises masked data.

24. The method of claim 1, wherein each data field in the third data set comprises a corresponding numerical data type, a corresponding alphabetic data type, a corresponding date data type, a corresponding Booklean logic data type, or a combination thereof.

25. The method of claim 1, wherein the employee query comprises an indication of an event associated with the absence request, and the obtaining the third data set comprises accessing a portion of the corresponding data set at the second device in accordance with the indication of the event.

26. The method of claim 1, wherein the evaluating the first data set comprises determining a corresponding node, in a plurality of nodes of an organizational tree of the respective entity, wherein the plurality of nodes collectively represents the respective employees of the respective entity, and determining each supervisor in the one or more supervisors that directly or indirectly supervisors the first employee in accordance with a reporting relationship defined by the corresponding node of the first employee and a respective node of a corresponding supervisor in the one or more supervisors.

27. A non-transitory computer-readable storage medium storing instructions, which when executed by a computing system, cause the computing system to:

receive, via one or more communication networks, an absence request from a first device corresponding to a first employee of the respective entity, the absence request comprising (i) an identifier associated with the first employee, and (ii) a first data set authored, at least in part, by the first employee and associated with a leave of absence for the first employee;

responsive to receiving the absence request, evaluate the first data set to identify (i) a classification, in an enumerated plurality of classifications, of the leave of absence, and (ii) one or more supervisors directly or indirectly supervising the first employee;

further evaluate the first data set against a predetermined threshold data set associated with the classification of the leave of absence to identify a second data set collectively satisfying the predetermined threshold data set with the first data set;

generate an employee query configured to, at least in part, obtain the second data set;

transmit, via the one or more communication networks, the employee query to a second device, the second device configured to store a corresponding data set for each respective employee associated one or more entities in a first subset of the plurality of entities, the plurality of entities comprising the respective entity;

responsive to transmitting the employee query, obtain, via the one or more communication networks, a third data set comprising (i) some or all of the second data set, and (ii) at least in part, a confirmation of some or all of the first data set from the second device;

generate, without human interference from the first employee or the one or more supervisors, an absence entry based on the absence request and the third data set;

transmit, via the one or more communication networks, the absence entry to a third device configured to store an absence database comprising one or more absence requests for each respective employee associated a second subset of the plurality of entities comprising the respective entity;

generate, without human interference from the first employee or the one or more supervisors, one or more instructions to display a corresponding notification, for a respective supervisor in the one or more supervisors, of each employee that directly or indirectly reports to the first supervisor having the classification that is in the enumerated plurality of classifications using the absence database; and transmit, in electronic form, to the corresponding remote device for each respective supervisor in the one or more supervisors, the one or more instructions to display a corresponding notification.

28. A computing system comprising:

one or more processors; and memory coupled to the one or more processors, the memory storing one or more programs configured to be executed by the one or more processors, the one or more programs comprising one or more instructions for:

receiving, via one or more communication networks, an absence request from a first device corresponding to a first employee of the respective entity, the absence request comprising (i) an identifier associated with the first employee, and (ii) a first data set authored, at least in part, by the first employee and associated with a leave of absence for the first employee;

responsive to receiving the absence request, evaluating the first data set to identify (i) a classification, in an enumerated plurality of classifications, of the leave of absence, and (ii) one or more supervisors directly or indirectly supervising the first employee;

further evaluating the first data set against a predetermined threshold data set associated with the classification of the leave of absence to identify a second data set collectively satisfying the predetermined threshold data set with the first data set;

generating an employee query configured to, at least in part, obtain the second data set;

transmitting, via the one or more communication networks, the employee query to a second device, the second device configured to store a corresponding data set for each respective employee associated one or more entities in a first subset of the plurality of entities, the plurality of entities comprising the respective entity;

responsive to transmitting the employee query, obtaining, via the one or more communication networks, a third data set comprising (i) some or all of the second data set, and (ii) at least in part, a confirmation of some or all of the first data set from the second device;

generating, without human interference from the first employee or the one or more supervisors, an absence entry based on the absence request and the third data set;

transmitting, via the one or more communication networks, the absence entry to a third device configured to store an absence database comprising one or more absence requests for each respective employee associated a second subset of the plurality of entities comprising the respective entity;

generating, without human interference from the first employee or the one or more supervisors, one or more instructions to display a corresponding notification, for a respective supervisor in the one or more supervisors, of each employee that directly or indirectly reports to the first supervisor having the classification that is in the enumerated plurality of classifications using the absence database; and transmitting, in electronic form, to the corresponding remote device for each respective supervisor in the one or more supervisors, the one or more instructions to display a corresponding notification.

* * * * *